United States Patent
Mihota

(10) Patent No.: US 8,995,935 B2
(45) Date of Patent: Mar. 31, 2015

(54) WIRELESS COMMUNICATION DEVICE, WIRELESS TRANSMISSION SYSTEM AND WIRELESS TRANSMISSION METHOD

(75) Inventor: Norihito Mihota, Saitama (JP)

(73) Assignee: Sony Corporation, Tokyo (JP)

( * ) Notice: Subject to any disclaimer, the term of this patent is extended or adjusted under 35 U.S.C. 154(b) by 182 days.

(21) Appl. No.: 12/805,955

(22) Filed: Aug. 26, 2010

(65) Prior Publication Data

US 2011/0076944 A1  Mar. 31, 2011

(30) Foreign Application Priority Data

Sep. 29, 2009  (JP) ................................. 2009-223681

(51) Int. Cl.
*H04B 1/66* (2006.01)
*H04L 27/02* (2006.01)
*H04L 27/18* (2006.01)

(52) U.S. Cl.
CPC ............... *H04L 27/02* (2013.01); *H04L 27/18* (2013.01); *Y02B 60/50* (2013.01)
USPC ......................................... 455/102; 455/108

(58) Field of Classification Search
CPC .. H04B 10/1143; H04B 10/541; H04B 10/11; H04B 1/406; H04B 10/516; H04B 1/40; H04B 7/0682; H04B 7/0697; H04B 17/0062; H04B 1/04; H04B 1/0483; H04B 1/71635; H04B 7/0604; H04B 7/24; Y02B 60/50; H04L 27/02; H04L 27/18
USPC ...................... 455/91–129; 375/220, 295–315
See application file for complete search history.

(56) References Cited

U.S. PATENT DOCUMENTS

| | | | | |
|---|---|---|---|---|
| 5,148,128 A | * | 9/1992 | Mazumder | 375/308 |
| 5,754,948 A | | 5/1998 | Metze | |
| 5,915,210 A | * | 6/1999 | Cameron et al. | 455/102 |
| 6,735,426 B1 | * | 5/2004 | Pau | 455/255 |
| 7,016,657 B2 | * | 3/2006 | Boariu | 455/102 |
| 7,894,851 B2 | * | 2/2011 | Rofougaran | 455/552.1 |
| 7,917,102 B2 | * | 3/2011 | Kobayashi et al. | 455/103 |
| 2002/0154705 A1 | * | 10/2002 | Walton et al. | 375/267 |
| 2004/0090326 A1 | * | 5/2004 | Chin et al. | 340/539.22 |
| 2004/0259556 A1 | * | 12/2004 | Czys | 455/447 |
| 2006/0194611 A1 | * | 8/2006 | Pasternak | 455/553.1 |
| 2007/0133493 A1 | * | 6/2007 | Maruhashi et al. | 370/342 |
| 2007/0135073 A1 | * | 6/2007 | Smentek et al. | 455/318 |
| 2009/0156135 A1 | * | 6/2009 | Kamizuma et al. | 455/73 |
| 2009/0163153 A1 | * | 6/2009 | Senda et al. | 455/101 |
| 2011/0075581 A1 | * | 3/2011 | Mihota | 370/252 |

FOREIGN PATENT DOCUMENTS

| | | |
|---|---|---|
| JP | 10-256478 A | 9/1998 |
| JP | 2005-204221 A | 7/2005 |
| JP | 2005-223411 A | 8/2005 |

\* cited by examiner

*Primary Examiner* — Lana N Le
(74) *Attorney, Agent, or Firm* — Rader, Fishman & Grauer PLLC

(57) ABSTRACT

Disclosed herein is a wireless communication device, including: a plurality of communication units for transmission adapted to modulate and transmit a transmission subject signal; the communication units for transmission including a communication unit or units for transmission which adopt a method which modulates the amplitude and a communication unit or units for transmission which adopt a modulation method which modulates at least the phase or the frequency and requires transmission power lower than that of the method which modulates the amplitude.

7 Claims, 36 Drawing Sheets

FIG.4A
$$L \text{ [dB]} = 10 \log_{10}((4\pi d/\lambda)^2) \quad \cdots (A)$$
$$d_2/d_1 = 10^{(DU/20)} \quad \cdots (B)$$
FIG.4B
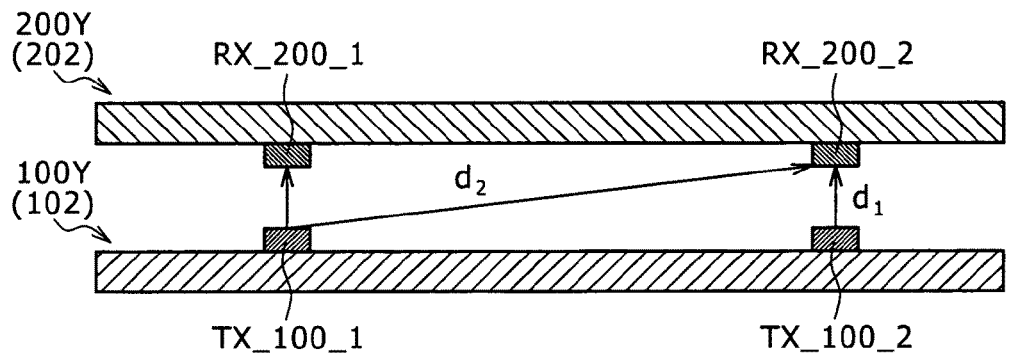
FIG.4C
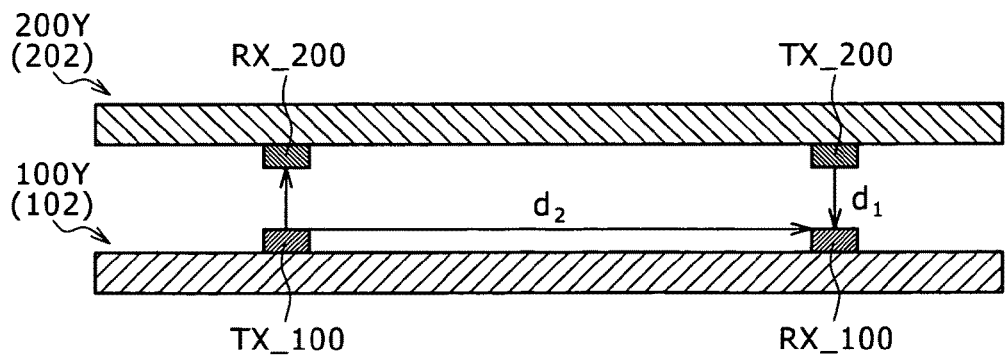

Vo : OUTPUT SIGNAL OF RECEPTION-SIDE LOCAL OSCILLATOR 8404
*FREE-RUNNING OUTPUT

Vout : OUTPUT SIGNAL OF RECEPTION-SIDE LOCAL OSCILLATOR 8404
*INJECTION-LOCKED OUTPUT Sinj : INJECTION SIGNAL $\theta - \varphi$ : THE AMOUNT OF PHASE SHIFT FOR SYNCHRONOUS DETECTION (WHEN MODULATION AXIS AND REFERENCE CARRIER AXIS ARE IN PHASE)

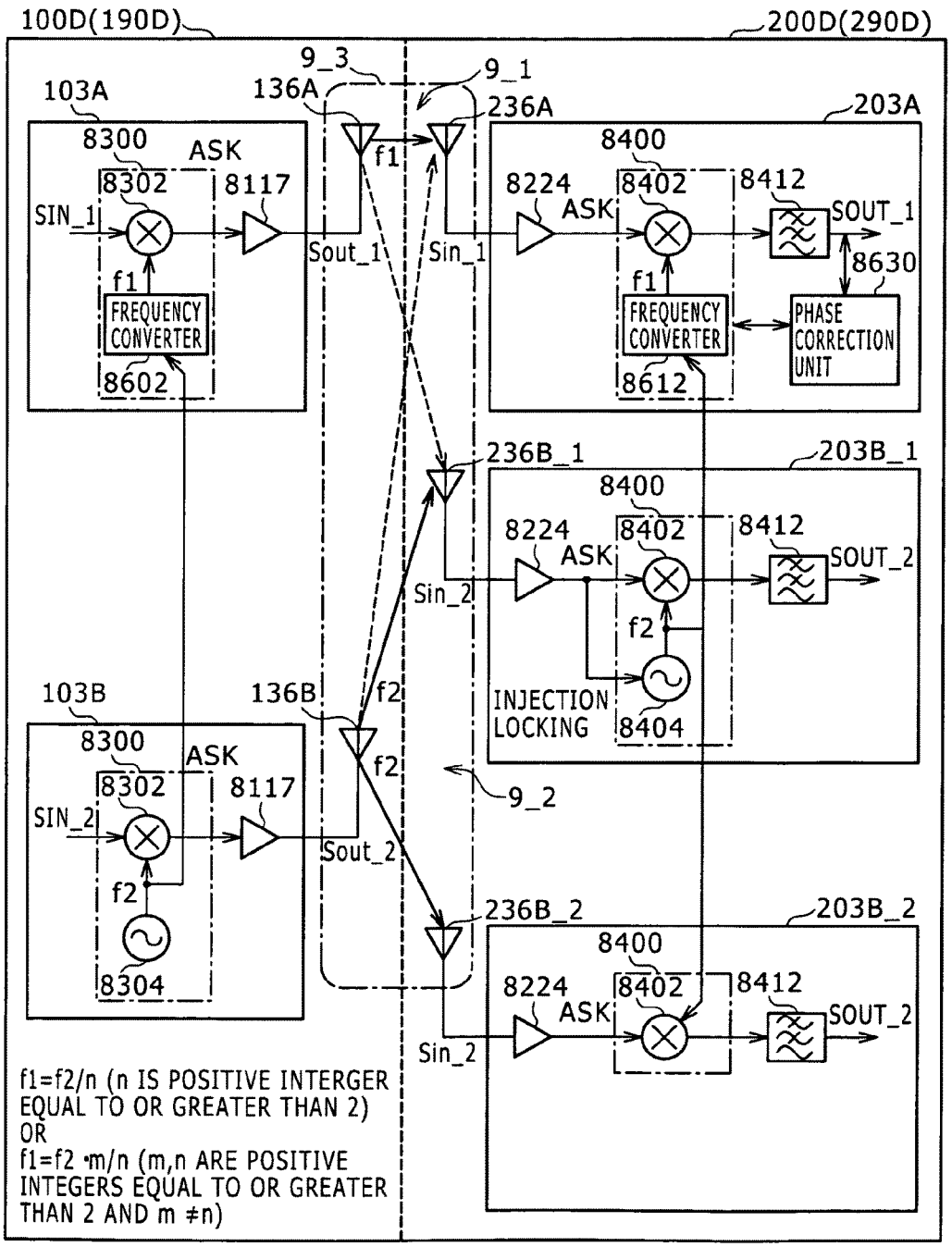

PSK $P_{PSK} = a^2/2 \cdots \text{(B-1)}$

ASK
MODULATION
INDEX
100%

$P_{ASK100\%} = ((2a)^2/2 + 0)/2 = a^2 \cdots \text{(B-2)}$

ASK
MODULATION
INDEX
50%

$P_{ASK50\%} = ((3a)^2/2 + (a)^2/2)/2 = 5a^2/2 \cdots \text{(B-3)}$

\*OPPOSING ARRANGEMENT & SPACE DIVISION MULTIPLEXING

WIRELESS COMMUNICATION DEVICE, WIRELESS TRANSMISSION SYSTEM AND WIRELESS TRANSMISSION METHOD

BACKGROUND OF THE INVENTION

1. Field of the Invention

This invention relates to a wireless communication device, a wireless transmission system and a wireless communication method.

2. Description of the Related Art

As a technique for implementing a high-speed signal transmission between different electronic apparatus disposed in a comparatively short range (for example, within several centimeters to ten and several centimeters), or within an electronic apparatus, for example, a LVDS (Low Voltage Differential Signaling) is known. However, together with further increase of the amount of transmission information and further increase of the speed of transmission recently, increase of power consumption, increase of an influence of signal distortion by reflection and so forth, increase of unnecessary radiation and so forth have become problems. For example, the LVDS reaches a limit where a signal such as a video signal (including an image pickup signal), a computer image or the like is transmitted at a high speed (on the real time basis) in an apparatus.

As a countermeasure against the problem of increase of the speed of transmission data, it seems a possible idea to increase the number of wiring lines to decrease the transmission speed per one signal line by parallel transmission of signals. However, the countermeasure just described gives rise to increase of the number of input and output terminals. As a result, complication of a printed board or a cable wiring scheme, increase of the size of a semiconductor chip and so forth are required. Further, since a large amount of data is transmitted at a high speed along a wiring system, a problem of electromagnetic field interference occurs.

All of the problems involved in the LVDS or the technique of increasing the number of wiring lines are caused by transmission of a signal through an electric wiring line. Therefore, as a method for solving a problem caused by transmission of a signal along an electric wiring line, methods in which electric wiring lines for signal transmission are eliminated have been proposed (see, for example, Japanese Patent Laid-open Nos. 2005-204221, 2005-223411, Hei 10-256478 and U.S. Pat. No. 5,754,948, hereinafter referred to as Patent Documents 1 to 4, respectively).

Patent Documents 1 and 2 propose carrying out signal transmission within a housing by wireless and applying the UWB (Ultra Wide Band) communication method. Patent Documents 3 and 4 disclose use of a carrier frequency in the millimeter waveband.

SUMMARY OF THE INVENTION

However, such a as proposed in Patent Documents 1 and 2 uses such a low carrier frequency that it is not suitable for such high speed communication as transmission, for example, of an image signal and besides has a problem in regard to the size in that an antenna of a large size is required. Further, since the frequency used for transmission is proximate to a frequency used in other baseband signal processing, there is a problem also in that interference is likely to occur between a radio signal and a baseband signal. Further, where the carrier frequency is low, the communication is likely to be influenced by noise of a driving system in an apparatus, and a countermeasure is required.

In contrast, the problems of the antenna size and the interference can be solved if a carrier frequency in the millimeter waveband having shorter wavelengths is used as in the disclosure of Patent Documents 3 and 4.

Here, where wireless communication which uses the millimeter waveband is carried out, if such a wireless method, that is, a wireless communication technique, as is used generally in a field or outdoors is applied, then high stability is demanded for the carrier frequency. This signifies that an oscillation circuit of a complicated circuit configuration having high frequency stability is required and that also the system configuration as a whole is complicated.

For example, if a frequency multiplication circuit or a PLL (Phase-locked Loop) circuit having high stability is used as an external reference part in order to implement a carrier signal of a high frequency on the ppm (parts per million) order having high stability, then the circuit scale becomes large. Further, where it is intended to implement an entire oscillation circuit including a tank circuit, which is a resonance circuit composed of an inductor and a capacitor, using a silicon integrated circuit, actually it is difficult to form a tank circuit having a high Q value. Therefore, it cannot be avoided to dispose a tank circuit having a high Q value outside an integrated circuit.

However, if it is tried to implement high speed signal transmission by wireless between different electronic apparatus arranged in a comparatively short range or within an electronic apparatus using a shorter wavelength band such as, for example, the millimeter waveband, it is considered not advisable to demand high stability for a carrier frequency. Rather, it is considered better to use an oscillation circuit of a simple circuit configuration by moderating the stability of the carrier frequency and try to simplify also the entire system configuration.

However, if the stability of the carrier frequency is moderated simply, then although it depends upon the modulation and demodulation method, frequency variation, that is, the difference between a carrier frequency used in a transmission circuit and a carrier frequency used in a reception circuit, becomes a problem. Thus, it is a matter of concern that appropriate signal transmission may not be carried out, that is, appropriate demodulation may not be carried out.

In addition, where the transmission side or the reception side includes a plurality of communication units, for example, as in a case wherein the transmission side includes a single communication unit while the reception side includes a plurality of communication units such that broadcast communication can be carried out or in another case wherein both of the transmission side and the reception side include a plurality of communication units such that multiplex communication is carried out, also increase of the transmission power and of the circuit scale is added. Consequently, the problems become further complicated together with the situation described above.

Therefore, it is desirable to provide a wireless communication device, a wireless transmission system and a wireless communication method wherein radio signal transmission between different apparatus or within one apparatus can be carried out appropriately while the stability of a carrier frequency is moderated.

Also it is desirable to provide a wireless communication device, a wireless transmission system and a wireless communication method wherein, also where the transmission side or the reception side includes a plurality of communication units, signal transmission can be carried out appropriately while the stability of a carrier frequency is moderated.

In a form of a wireless communication device, a wireless transmission system and a wireless communication method according to the present invention, a communication unit for transmission and a communication unit for reception are disposed in a housing of an electronic apparatus.

A radio signal transmission path which allows wireless information transmission therein is configured between the communication unit for transmission and the communication unit for reception. Although the radio signal transmission path may be the air, that is, a free space, preferably it should have a waveguide structure which transmits a radio signal therethrough while confining the radio signal thereto.

Incidentally, the wireless transmission system may be configured from a combination of a plurality of electronic apparatus which include transmission and reception side communication units which are paired with each other between the transmission side and the reception side or may be configured such that one electronic apparatus includes transmission and reception side communication units such that the electronic apparatus itself configures the wireless transmission system. The wireless communication device includes a transmission side communication unit and/or a reception side communication unit. For example, the wireless transmission device is provided as a semiconductor integrated circuit and mounted on a circuit board in the electronic apparatus.

For example, a wireless communication device which includes only a plurality of communication units for transmission is sometimes provided as a semiconductor integrated circuit. Or, a wireless communication device which includes only a plurality of communication units for reception is sometimes provided as a semiconductor integrated circuit. Further, a wireless communication system is sometimes implemented including a plurality of communication units for transmission and a plurality of communication units for reception accommodated in one housing such that it can be regarded as a wireless communication device.

Each of the communication units for transmission modulates and frequency-converts a transmission subject signal with a carrier signal to generate a modulation signal of a higher frequency and transmits the generated modulation signal to the radio signal transmission path. Each of the communication units for reception generates a carrier signal for demodulation and frequency conversion synchronized with the carrier signal using the signal received through the radio signal transmission path as an injection signal. Then, the communication unit for reception frequency-converts the modulation signal received through the radio signal transmission path with the generated carrier signal to demodulate the transmission subject signal.

In summary, a radio signal transmission path is configured between a communication unit on the transmission side disposed in a housing of an electronic apparatus and another communication unit on the reception side disposed in the housing of the electronic apparatus or in a housing of a different electronic apparatus so that wireless signal transmission is carried out between the two communication units.

Here, in a first mechanism according to the present invention, a plurality of communication pairs, which may each be hereinafter referred to as channel, each including a communication unit for transmission and a communication unit for reception are prepared, and a method which modulates the amplitude is adopted as a modulation method for use for communication between the communication unit for transmission and the communication unit for reception of some of the communication pairs while a modulation method which modulates at least the phase or the frequency and requires transmission power lower than that of the method which modulates the amplitude is used for communication between the communication unit for transmission and the communication unit for reception of the remaining ones of the communication pairs.

The communication pairs may each be any communication pair only if it includes a communication unit for transmission and a communication unit for reception, and from a system configuration, not one but a plurality of communication units on the reception side may be provided for one communication unit on the transmission side in the principle. However, this configuration cannot be taken by the first mechanism, but a plurality of communication units are provided on the transmission side without fail.

Here, in the first mechanism, the number of those communication pairs which adopt the method which modulates the amplitude is set smaller than the total number of communication units for transmission. As a preferable form, the number of those channels which adopt the method which modulates the amplitude is one.

The first mechanism is intended to achieve reduction of the required transmission power for the entire system by setting, where a plurality of communication pairs each including a communication unit for transmission and a communication unit for reception are prepared to carry out multiplex transmission, the number of those communication pairs which adopt a method for modulating the amplitude which requires high transmission power smaller than the total number of the communication pairs, here, the number of communication pairs on the transmission side.

In other words, the first mechanism is intended to achieve reduction of the required transmission power upon multiplex transmission, and in this regard, attention may be paid only to the transmission side. In particular, a wireless communication device which includes a plurality of communication units for transmission which modulate and transmit a transmission subject signal should be configured such that the communication units for transmission include a communication unit or units for transmission which adopt a method which modulates the amplitude and a communication unit or units for transmission which adopt a modulation method which modulates at least the phase or the frequency and requires transmission power lower than that of the method which modulates the amplitude.

On the other hand, in a second mechanism according to the present invention, a plurality of communication pairs each including a communication unit for transmission and a communication unit for reception are prepared such that the communication pairs include a communication pair or pairs which adopt an injection locking method which recovers a carrier signal by injection locking based on a reception signal and a communication pair or pairs which do not adopt the injection locking method.

The communication pairs may each be any communication pair only if it includes a communication unit for transmission and a communication unit for reception, and from a system configuration, not one but a plurality of communication units on the transmission side may be provided for one communication unit on the reception side in the principle. However, this configuration cannot be taken by the second mechanism, but a plurality of communication units are provided on the reception side without fail. Meanwhile, the number of communication units on the transmission side may be one.

Here, in the second mechanism, the number of those communication pairs which adopt the injection locking method is set smaller than the total number of communication units for reception. As a preferable form, the number of those communication pairs which adopt the injection locking method is one.

The second mechanism is intended to achieve reduction of the circuit scale of the entire system by setting, where a plurality of communication pairs each including a communication unit for transmission and a communication unit for reception are prepared to carry out broadcast communication or multiplex transmission, the number of those communication pairs or channels which include an injection locking circuit smaller than the total number of the communication pairs.

In other words, the second mechanism is intended to achieve reduction of the number of injection locking circuits on the reception side upon multiplex transmission, and in this regard, attention may be paid only to the reception side. In particular, a wireless communication device which includes a plurality of communication units for reception which convert a reception signal into a signal of a lower frequency should be configured such that the communication units for reception include a communication unit or units for reception which adopt the injection locking method which recovers a carrier signal by injection locking based on the reception signal and a communication unit or units for reception which do not adopt the injection locking method.

More preferably, the first mechanism and the second mechanism according to the present invention are combined.

As a more preferable form, the channel which adopts the injection locking method adopts a method which modulates only the amplitude as a modulation method to be used for communication between the communication unit for transmission and the communication unit for reception.

Incidentally, where the injection locking method is adopted, on the reception side, a received signal is used as an injection signal to generate a carrier signal for demodulation synchronized with the carrier signal for the modulation. Then, the carrier signal for demodulation is used to carry out frequency conversion, that is, down conversion.

Although only a modulation signal obtained by frequency conversion or up conversion on the transmission side may be signaled such that the demodulation signal received by the reception side is used as an injection signal for generating a carrier signal for demodulation, preferably also a reference carrier signal used for the modulation is signaled together with the modulation signal such that, on the reception side, the injection signal is used for injection-locking into the received reference carrier signal.

In the mechanism which adopts the injection locking method, the carrier signal used for the up conversion and the carrier signal used for the down conversion are placed into a synchronized state with each other with certainty. Therefore, even if the stability of the frequency of the carrier signal is moderated to carry out signal transmission by wireless, the transmission subject signal (that is, output signal corresponding to the transmission subject signal) can be obtained appropriately. In down conversion, synchronous detection can be applied readily. By using quadrature detection developmentally for the synchronous detection, then not only amplitude modulation but also phase modulation and frequency modulation can be applied. This signifies that the data transfer rate can be raised, for example, by orthogonalizing a modulation signal.

With the first mechanism of the present invention, where wireless multiplex communication is carried out between different apparatus or within an apparatus, that is, within a housing of an apparatus, the required transmission power for the entire system can be reduced in comparison with that in an alternative case wherein the method which modulates the amplitude is adopted in all communication units on the transmission side or all communication pairs.

According to the second mechanism of the present invention, where wireless broadcast communication or multiplex communication is carried out between different apparatus or within an apparatus, that is, within a housing of an apparatus, the circuit scale of the entire system can be reduced in comparison with that in an alternative case wherein the injection locking method is executed by all communication units on the reception side or by all communication pairs.

If the first mechanism and the second mechanism of the present invention are combined, then where wireless broadcast communication or multiplex communication is carried out between different apparatus or within an apparatus, that is, within a housing of an apparatus, the required transmission power for the entire system can be reduced in comparison with that in an alternative case wherein the method which modulates the amplitude is adopted in all communication units on the transmission side or in all communication pairs. Besides, the circuit scale of the entire system can be reduced in comparison with that in an alternative case wherein the injection locking method is executed by all communication units on the reception side or by all communication pairs.

Incidentally, with the configuration which adopts the injection locking method, even if the stability of the frequency of the carrier signal for modulation is moderated, the transmission subject signal can be demodulated appropriately on the reception side. Further, since the stability of the frequency of the carrier signal may be moderated, an oscillator of a simple circuit configuration can be used, and the entire system configuration can be simplified. Further, since the stability of the frequency of the carrier signal may be moderated, the entire oscillator including a tank circuit can be formed on the same semiconductor board together with a frequency converter. Consequently, a one-chip oscillator or semiconductor integrated circuit having a tank circuit built therein and a one-chip communication circuit or semiconductor integrated circuit having a tank circuit built therein can be implemented.

BRIEF DESCRIPTION OF THE DRAWINGS

FIGS. 4A to 4C are schematic views illustrating an appropriate condition of space division multiplexing;

FIG. 14 is a diagram showing a wireless transmission system according to a second example of the third embodiment;

DETAILED DESCRIPTION OF THE PREFERRED EMBODIMENTS

In the following, embodiments of the present invention are described in detail with reference to the drawings.

It is to be noted that the present invention is described in the following order:

1. Communication Processing Channel: Basis (Time Division Multiplexing, Frequency Division Multiplexing, Code Division Multiplexing)
2. Communication Processing Channel: Modification (Space Division Multiplexing)
3. Modulation and Demodulation: Comparative Example
4. Modulation and Demodulation: Basis (Application of Injection Locking Method)
5. Relationship between Multi-Channel Transmission and Injection Locking
6. Wireless Transmission System: First Embodiment (Reduction of Number of Injection Locking Circuits upon Broadcast Transmission)
7. Wireless Transmission System: Second Embodiment (Reduction of Number of Injection Locking Circuits upon Space Division Multiplexing)
8. Wireless Transmission System: Third Embodiment (Reduction of Number of Injection Locking Circuits upon Frequency Division Multiplexing)
9. Modifications of First to Third Embodiments
10. Relationship between an Ampretude Modulation Signal and Other Modulation Signals
11. Wireless Transmission System: Fourth Embodiment (Reduction of Transmission Power upon Space Division Multiplexing)
12. Wireless Transmission System: Fifth Embodiment (Reduction of Transmission Power upon Frequency Division Multiplexing)
13. Modifications of Fourth and Fifth Embodiments
14. Phase Correction Unit
15. Application Examples: Image Pickup Device, Card-type Medium, Portable Device <Communication Processing Channel: Basis>

Figure 1:
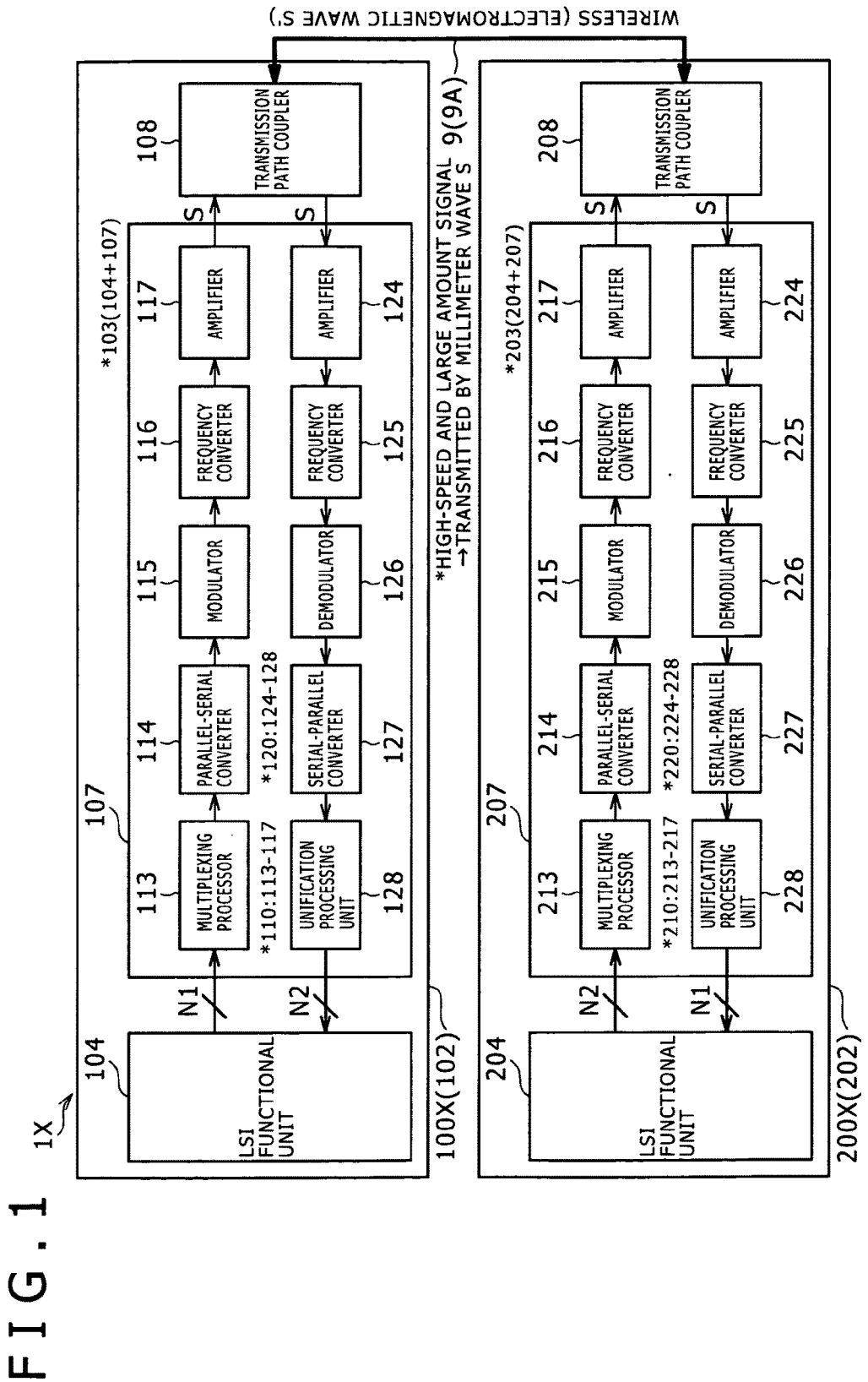
FIG. 1 is a block diagram showing a functional configuration of a signal interface of a basic configuration of a wireless transmission system.
Figure 2A:
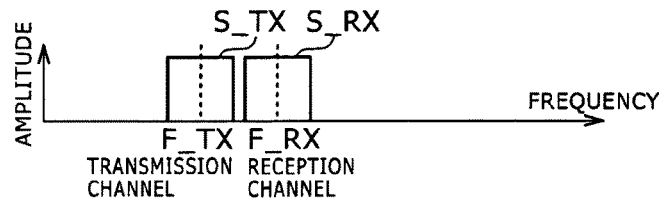
FIGS. 2A to 2C are diagrammatic views illustrating multiplexing of signals in the wireless transmission system.
Figure 2B:
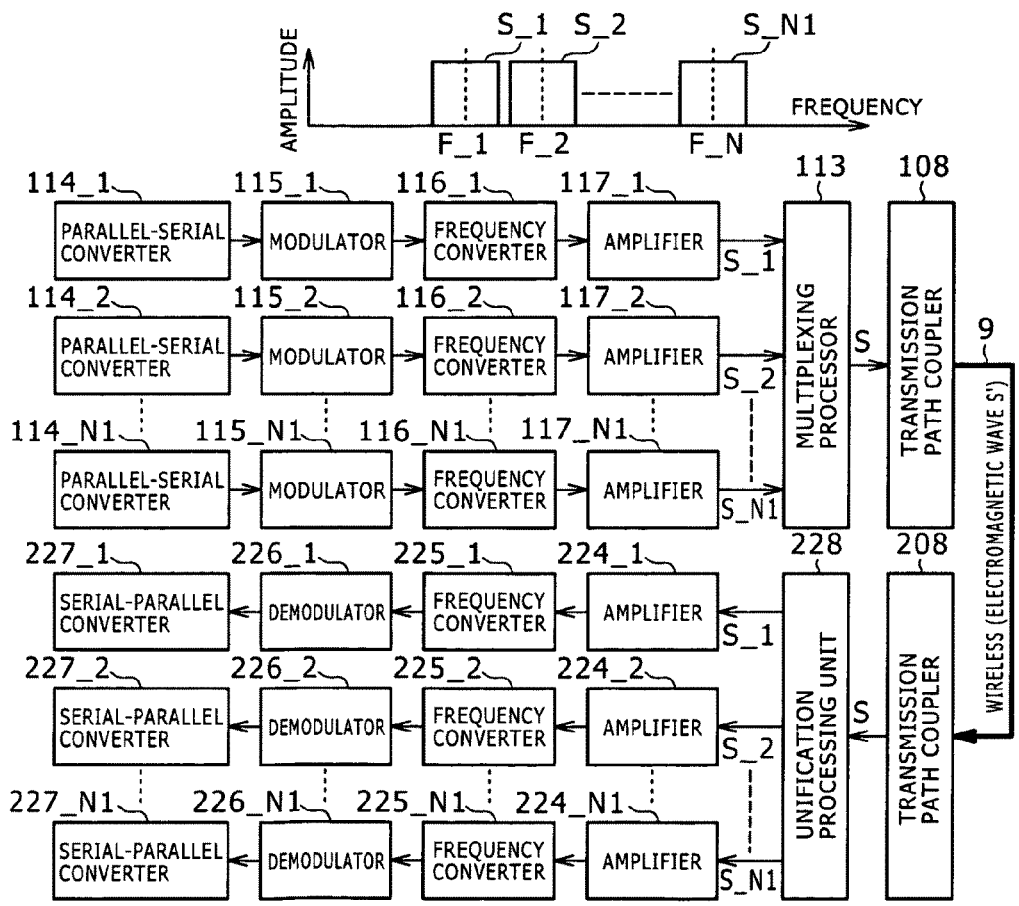
Figure 2C:
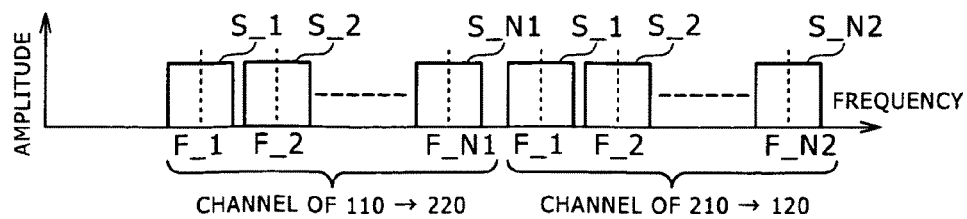

FIGS. 1 to 2C show the wireless transmission system. In particular, FIG. 1 shows a signal interface of the wireless transmission system 1X of a basic configuration from a point of view of a functional configuration. FIGS. 2A to 2C illustrates multiplexing of signals.

While a carrier frequency used for the wireless transmission system of the present embodiment described below is a frequency in the millimeter waveband, the mechanism of the present embodiment can be applied not only to a case wherein a carrier frequency of the millimeter waveband is used but also to another case wherein a carrier frequency in a shorter wavelength band such as, for example, a sub millimeter waveband is used. The wireless transmission system of the present embodiment is used, for example, for a digital recording and reproduction device, a ground wave television receiver, a portable telephone set, a game machine and a computer.

[Functional Configuration]

As shown in FIG. 1, the wireless transmission system 1X is configured such that a first communication device 100X which is an example of a first wireless device and a second communication device 200X which is an example of a second wireless device are coupled to each other through a millimeter wave signal transmission path 9 and carry out signal transmission using the millimeter waveband. The millimeter wave signal transmission path 9 is an example of a wireless signal transmission path. A signal of a transmission subject is frequency-converted into a signal of the millimeter waveband suitable for wideband transmission, and the resulting signal is transmitted.

The wireless transmission device or system is configured from a first communication unit or first millimeter wave transmission device and a second communication unit or second millimeter wave transmission device. Further, between the first communication unit and the second communication unit which are disposed in a comparatively short range, a signal of a transmission subject converted into a millimeter wave signal is transmitted through the millimeter wave signal transmission path. The term "wireless transmission" in the present embodiment signifies transmission of a signal of a transmission subject not along an electric wiring line but by wireless, in the present example, by a millimeter wave.

The term "comparatively short range" signifies a shorter range than the distance between communication devices in a field or outdoors used for broadcasting or general wireless communication, and the transmission range may be a range which can be specified as a closed space. The term "closed space" signifies a space in a state wherein leakage of an electric wave from the inner side of the space to the outer side of the space is little and arrival or invasion of an electric wave from the outer side of the space at or into the inner side of the space is little. Typically, the term "closed space" signifies a state that the entire space is enclosed by a housing or case having a shielding effect against a radio wave.

The wireless transmission may be, for example, inter-board communication in a housing of one electronic apparatus, inter-chip communication on the same board and inter-device communication where a plurality of electronic devices are integrated as in a case wherein one electronic apparatus is mounted on the other electronic apparatus.

While the "integration" described above typically signifies a state wherein both of the electronic apparatus fully contact with each other by mounting therebetween, it may be a state wherein a transmission range between both of the electronic apparatus can be substantially specified as a closed space. Also a case is included wherein both of the electronic apparatus are disposed at determined position in a state rather spaced from each other, that is, in a comparatively short range such as, for example, within several centimeters to ten and several centimeters and it may be considered that the electronic apparatus are substantially integrated with each other. In short, the integration signifies any state in which a radio wave leaks little from the inside to the outside of a space which is configured from both electronic apparatus and in which an electric wave can propagate and conversely an electric wave from the outside of the space little arrives or invades at or into the inside of the space.

Signal transmission in a housing of one electronic apparatus is hereinafter referred to as intra-housing signal transmission and signal transmission in a state wherein a plurality of electronic apparatus are integrated (including "substantially integrated" in the following description) is hereinafter referred to as inter-apparatus signal transmission. In the case of the intra-housing signal transmission, a communication device or communication unit or transmitter on the transmission side and a communication device or communication unit or receiver on the reception side are accommodated in the same housing, and the wireless transmission system of the present embodiment wherein a wireless signal transmission path is formed between the communication units or transmitter and receiver is the electronic apparatus itself. On the other hand, in the case of the inter-apparatus signal transmission, the communication device or communication unit or transmitter on the transmission side and the communication device or communication unit or receiver on the reception side are accommodated in individual housings of electronic apparatus which are different from each other. Further, wireless signal transmission paths are formed between the communication units or transmitters and receivers in both of the electronic apparatus when both electronic are arranged and integrated at determined positions such that the wireless transmission system of the present embodiment is constructed.

In the communication devices provided across the millimeter wave signal transmission path, the transmitter and the receiver are disposed in a paired and coupled relationship with each other. Signal transmission between one communication device and the other communication device may be carried out unidirectionally, that is, in one direction, or may be carried out bidirectionally. For example, where the first communication unit functions as the device on the transmission side and the second communication unit functions as the device on the reception side, the transmitter is disposed in the first communication unit and the receiver is disposed in the second communication unit. Where the second communication unit functions as the device on the transmission side and the first communication unit functions as the device on the reception side, the transmitter is disposed in the second communication unit and the receiver is disposed in the first communication unit.

The transmitter includes, for example, a signal generator on the transmission side for carrying out a signal process for a signal of a transmission subject to generate a millimeter wave signal, that is, a signal converter for converting an electric signal of a transmission subject into a millimeter wave signal, and a signal coupler on the transmission side for coupling the millimeter wave signal generated by the signal generator on the transmission side with a transmission path or millimeter wave signal transmission path for transmitting the millimeter wave signal. Preferably, the signal generator on the transmission side is provided integrally with a functional unit for generating a signal of a transmission subject.

For example, the signal generator on the transmission side includes a modulation circuit, and the modulation circuit modulates the signal of a transmission subject. The signal generator on the transmission side carries out frequency conversion for a signal modulated by the modulation circuit to generate a millimeter wave signal. As the principle, it seems a possible idea to convert the signal of a transmission subject directly into a millimeter wave signal. The signal coupler on the transmission side supplies the millimeter wave signal generated by the signal generator on the transmission side to the millimeter wave signal transmission path.

On the other hand, the receiver includes, for example, a signal coupler on the reception side for receiving the millimeter wave signal transmitted thereto through the millimeter wave signal transmission path and a signal generator on the reception side for carrying out a signal process for the millimeter wave signal or input signal received by the signal coupler on the reception side to generate a normal electric signal which is a signal of a transmission subject, that is, a signal converter for converting the millimeter wave signal into an electric signal of a transmission subject. Preferably, the signal generator on the reception side is provided integrally with a functional unit for receiving a signal of a transmission subject. For example, the signal generator on the reception side includes a demodulation circuit and carries out frequency conversion for the millimeter wave signal to generate an output signal. Then, the demodulation circuit demodulates the output signal to generate a signal of a transmission subject. As the principle, it seems a possible idea to convert the millimeter wave signal directly into a signal of a transmission subject.

In particular, when it is tried to implement a signal interface, a signal of a transmission subject is transmitted in a contactless and cable-less manner using a millimeter wave signal, that is, not transmitted using an electric wiring line. Preferably, at least signal transmission, particularly transmission of an image signal for which high-speed and great amount data transmission is required, or of a high-speed clock signal or the like, is carried out using a millimeter wave signal. In particular, in the present embodiment, signal transmission carried out through an electric wiring line in the past is carried out using a millimeter wave signal. By carrying out signal transmission using the millimeter waveband, high-speed signal transmission on the Gbps order can be implemented and the range on which a millimeter wave signal has an influence can be easily limited, and also an effect arising from the characteristic just described is obtained.

Here, the signal couplers may be configured such that the first communication unit and the second communication unit can transmit a millimeter wave signal through the millimeter wave signal transmission path. For example, the signal couplers may individually include, for example, an antenna structure or antenna coupler or may be configured such that coupling of a signal is carried out without including an antenna structure.

While the "millimeter wave signal transmission path for transmitting a millimeter wave signal" may be configured from the air, that is, from a free space, preferably the millimeter wave signal transmission path includes a structure for transmitting a millimeter wave signal while confining the millimeter wave signal in the transmission path. If the characteristic just described is positively utilized, then layout of the millimeter wave signal transmission path can be determined arbitrarily, for example, like an electric wiring line.

While, as such a millimeter wave confining structure or wireless signal confining structure as described above, for example, a structure of a waveguide tube is considered typically, the present invention is not limited to this. For example, a structure configured from a dielectric material capable of transmitting a millimeter wave signal, hereinafter referred to as dielectric transmission path or millimeter wave dielectric transmission path, or a hollow waveguide which configures a transmission path and in which a shielding material for suppressing outside radiation of a millimeter wave signal is provided in such a manner as to surround a transmission path and the inside of the shielding material is hollow may be applied. By providing flexibility to the dielectric material or the shielding material, layout of a millimeter wave signal transmission path can be implemented.

Incidentally, in the case of the air called free space, each of the signal couplers includes an antenna structure such that signal transmission in a short range space is carried out through the antenna structure. On the other hand, where the device configured from a dielectric material is used, while an antenna structure may be applied, this is not essential.

In the following, a mechanism provided in the wireless transmission system 1X of the present embodiment is described particularly. It is to be noted that, although the following description is given of an example wherein the functional elements are formed on a semiconductor integrated circuit or chip, this is not essential.

The semiconductor chip 103 which can carry out millimeter wave communication is provided in the first communication device 100X, and the semiconductor chip 203 which can carry out millimeter wave communication is provided also in the second communication device 200X.

In the present embodiment, only signals which are demanded to be transmitted at a high speed and in a great amount are made a subject of the communication with the millimeter waveband, and other signals which may be transmitted at a low speed and in a small amount or which can be regarded as DC current such as power supply are not made a subject of conversion into a millimeter wave signal. The signals which are not made a subject of conversion into a millimeter wave signal including power supply are connected between boards using a mechanism similar to a conventional mechanism. Original electric signals of a subject of transmission before conversion into millimeter waves are hereinafter referred to collectively as baseband signals.

[First Communication Device]

The first communication device 100X includes a board 102, a semiconductor chip 103 mounted on the board 102 and capable of carrying out millimeter waveband communication, and a transmission path coupler 108 mounted on the board 102. The semiconductor chip 103 is a system LSI (Large Scale Integrated Circuit) wherein an LSI functional unit 104 and a signal generating unit 107 which is a millimeter wave signal generating unit are integrated. Though not shown, the LSI functional unit 104 and the signal generating unit 107 may be configured otherwise such that they are not integrated. Where the LSI functional unit 104 and the signal generating unit 107 are formed as separate units, since a problem may possibly arise from transmission of a signal by an electric wiring line for signal transmission between them, they are preferably formed as a single integrated unit. Where they are formed as separate units, the two chips of the LSI functional unit 104 and the signal generating unit 107 are preferably disposed at a short distance to minimize the wire length thereby to minimize a possible bad influence.

The signal generating unit. 107 and the transmission path coupler 108 are configured so as to have bidirectionality of data. To this end, the signal generating unit 107 includes a signal generation unit on the transmission side and a signal generation unit on the reception side. Although such transmission path couplers 108 may be provided separately for the transmission side and the reception side, here the single transmission path coupler 108 is used for both of transmission and reception.

It is to be noted that the "bidirectional communication" here is single core bidirectional transmission which uses one channel or core of a millimeter wave signal transmission path 9 which is a millimeter wave transmission channel. For implementation of this, a half duplex system wherein time division multiplexing (TDD) is applied, frequency division multiplexing (FDD: FIGS. 2A to 2C) and so forth are applied.

In the case of the time division multiplexing, since separation of transmission and reception is carried out time-divisionally, "simultaneity of bidirectional communication," that is, "single-core simultaneous bidirectional transmission," wherein signal transmission from the first communication device 100X to the second communication device 200X and signal transmission from the second communication device 200X to the first communication device 100X are carried out simultaneously, is not implemented. The single-core simultaneous bidirectional transmission is implemented by the frequency division multiplexing. However, since the frequency division multiplexing uses different frequencies for transmission and reception as seen in FIG. 2A, it is necessary to widen the transmission bandwidth of the millimeter wave signal transmission path 9.

The semiconductor chip 103 may not be mounted directly on the board 102 but may be formed as a semiconductor package wherein the semiconductor chip 103 is mounted on an interposed board and molded using resin such as epoxy resin and mounted as such on the board 102. In particular, the interposer board is used as a chip mounting board, and the semiconductor chip 103 is provided on the interposer board. The interposer board may be formed using a sheet member having a relative permittivity within a fixed range such as a range approximately from two to ten and formed from a combination of, for example, thermally reinforced resin and copper foil.

The semiconductor chip 103 is connected to the transmission path couplers 108. Each transmission path coupler 108 is formed from an antenna structure including, for example, an antenna coupling unit, an antenna terminal, a microstrip line, an antenna and so forth. It is to be noted that also it is possible to apply a technique of forming an antenna directly on a chip such that also the transmission path couplers 108 are incorporated in the semiconductor chip 103.

The LSI functional unit 104 carries out principal application control of the first communication device 100X and includes, for example, a circuit for processing various signals to be transmitted to the opposite party and a circuit for processing various signals received from the opposite party.

The signal generating unit 107 or electric signal conversion unit converts a signal from the LSI functional unit 104 into a millimeter wave signal and carries out signal transmission control of the millimeter wave signal through the millimeter wave signal transmission path 9.

In particular, the signal generating unit 107 includes the transmission-side signal generating unit 110 and the reception-side signal generating unit 120. The transmission-side signal generating unit 110 and the transmission path coupler 108 cooperate with each other to form a transmission unit, that is, a communication unit on the transmission side. Meanwhile, the reception-side signal generating unit 120 and the transmission path coupler 108 cooperate with each other to form a reception unit, that is, a communication unit on the reception side.

The transmission-side signal generating unit 110 includes a multiplexing processor 113, a parallel-serial converter 114, a modulator 115, a frequency converter 116 and an amplifier 117 in order to carry out signal processing of an input signal to generate a signal of a millimeter wave. It is to be noted that the modulator 115 and the frequency converter 116 may be formed integrally as a so-called unit of the direct conversion type.

The reception-side signal generating unit 120 includes an amplifier 124, a frequency converter 125, a demodulator 126, a serial-parallel converter 127 and a unification urpcessing unit 128 in order to carry out signal processing of an electric signal of a millimeter wave received by the transmission path coupler 108 to generate an output signal. The frequency converter 125 and the demodulator 126 may be formed as a so-called unit of the direct conversion type.

The parallel-serial converter 114 and the serial-parallel converter 127 are provided, where the present configuration is not applied, for parallel interface specifications wherein a plurality of signals for parallel transmission are used, but are not required for serial interface specifications.

The multiplexing processor 113 carries out, where signals from the LSI functional unit 104 include a plurality of kinds of, that is, N1, signals which make a subject of communication in the millimeter waveband, a multiplexing process such as time division multiplexing, frequency division multiplexing or code division multiplexing to integrate the plurality of kinds of signals into a signal of one channel. For example, the multiplexing processor 113 integrates, for example, a plurality of kinds of signals for which high speed transmission and/or large amount data transmission are demanded into a signal of one channel as a subject of transmission by a millimeter wave.

In the time division multiplexing or the code division multiplexing, the multiplexing processor 113 is provided at the preceding stage to the parallel-serial converter 114 and may integrate signals of a plurality of channels into a signal of one channel and supply the signal of one channel to the parallel-serial converter 114. In the case of the time division multiplexing, a changeover switch should be provided which delimits a plurality of kinds of signals _@ (@ is 1 to N1) finely in time and supplies resulting signals to the parallel-serial converter 114. Corresponding to the multiplexing processor 113, a unification processing unit 228 for converting an integrated signal of one channel back into signals of N1 channels is provided on the second communication device 200X side.

On the other hand, in the case of the frequency division multiplexing, it is necessary to modulate a plurality of kinds of signals with individually different carrier frequencies to convert the signals into signals of frequencies within ranges of the individually different frequency bands F_@ to generate signals of millimeter waves and transmit the millimeter wave signals for which the individually different carrier frequencies are used in the same direction or in the opposite directions. To this end, for example, where the signals are to be transmitted in one direction as seen in FIG. 2B, the parallel-serial converter 114, modulator 115, frequency converter 116 and amplifier 117 should be provided for each of the plurality of kinds of signals _@, and an addition processor or signal mixer should be provided as the multiplexing processor 113 at the succeeding stage to the amplifier 117. Then, electric signals of the millimeter waves in the frequency band F_1+ . . . +F_N1 after the frequency multiplexing process should be supplied to the transmission path coupler 108. As the addition processor, a coupler may be used where the millimeter wave signals which use individually different carrier frequencies are to be transmitted in the same direction as seen in FIG. 2B. Though not shown, the amplifier 117 may be arranged at the succeeding stage to the multiplexing processor 113, that is, on the transmission path coupler 108 side, so as to integrate the signals into one signal.

As can be recognized from FIG. 2B, in the frequency division multiplexing of integrating signals of a plurality of channels into a signal of one channel by frequency division multiplexing, it is necessary to widen the transmission bandwidth. Where, as shown in FIG. 2C, both of the integration of signals of a plurality of channels into a signal of one channel by frequency division multiplexing and the full duplex method which uses different frequencies for transmission, which is, in the example illustrated in FIG. 2B, a channel from the transmission-side signal generating unit 110 side to the reception-side signal generating unit 220 side and reception, which is, in the example illustrated in FIG. 2B, a channel from the transmission-side signal generating unit 210 side to the reception-side signal generating unit 120 side, are used together, it is necessary to further widen the transmission bandwidth.

The parallel-serial converter 114 converts parallel signals into a serial data signal and supplies the serial data signal to the modulator 115. The modulator 115 modulates a transmission subject signal and supplies the modulated transmission subject signal to the frequency converter 116. The modulator 115 may basically be of the type wherein at least one of the amplitude, frequency and phase is modulated with the transmission subject signal or may be modulated in an arbitrary combination of them.

For example, in the case of analog modulation, for example, amplitude modulation (AM) and vector modulation are available. As the vector modulation, frequency modulation (FM) and phase modulation (PM) are available. In the case of digital modulation, for example, amplitude shift keying (ASK), frequency shift keying (FSK), phase shift keying (PSK) and amplitude phase shift keying (APSK) which modulates the amplitude and the phase are available. As the amplitude phase modulation, quadrature amplitude modulation (QAM) is representative.

The frequency converter 116 frequency converts a transmission subject signal after modulation by the modulator 115 to generate an electric signal of a millimeter wave and supplies the millimeter wave electric signal to the amplifier 117. The electric signal of a millimeter wave is an electric signal having a frequency substantially within a range from 30 GHz to 300 GHz. The reason why the "substantially" is used is that the frequency may be any frequency with which an effect by millimeter wave communication is obtained and the lower limit is not restricted to 30 GHz while the upper limit is not restricted to 300 GHz.

While the frequency converter 116 can assume various circuit configurations, for example, it may have a configuration including a frequency mixing circuit, that is, a mixer circuit, and a local oscillation circuit. The local oscillation circuit generates a carrier to be used for modulation, that is, a carrier signal or reference carrier. The frequency mixing circuit multiplies or modulates a carrier in the millimeter waveband generated by the local oscillation circuit by or with a signal from the parallel-serial converter 114 to generate a modulation signal in the millimeter waveband and supplies the modulation signal to the amplifier 117.

The amplifier 117 amplifies an electric signal of a millimeter wave after frequency conversion and supplies the amplified electric signal to the transmission path coupler 108. The amplifier 117 is connected to the bidirectional transmission path coupler 108 through an antenna terminal not shown.

The transmission path coupler 108 transmits a signal of a millimeter wave generated by the transmission-side signal generating unit 110 to the millimeter wave signal transmission path 9, and receives a signal of a millimeter wave from the millimeter wave signal transmission path 9 and outputs the received millimeter wave signal to the reception-side signal generating unit 120.

The transmission path coupler 108 is configured from an antenna coupling unit. The antenna coupling unit configures an example or part of the transmission path coupler 108 or signal coupling unit. The antenna coupling unit is, in a narrow sense, a block which couples an electronic circuit in a semiconductor chip and an antenna disposed inside or outside the chip, and is, in a wide sense, a block which signal-couples a semiconductor chip and the millimeter wave signal transmission path 9. For example, the antenna coupling unit includes at least an antenna structure. Further, where the time division multiplexing is applied to transmission and reception, an antenna changeover unit, that is, an antenna sharing unit, is provided in the transmission path coupler 108.

The antenna structure is a structure in the coupling unit to the millimeter wave signal transmission path 9 and may be any structure only if it couples an electric signal in the millimeter waveband to the millimeter wave signal transmission path 9, but does not signify an antenna itself. For example, the antenna structure is configured including an antenna terminal, a microstrip line and an antenna. Where the antenna changeover unit is formed in the same chip, the antenna terminal except the antenna changeover unit and the microstrip line configure the transmission path coupler 108.

The antenna on the transmission side radiates an electromagnetic wave based on a signal of a millimeter wave to the millimeter wave signal transmission path 9. Meanwhile, the antenna on the reception side receives an electromagnetic wave of a millimeter wave from the millimeter wave signal transmission path 9. The microstrip line interconnects the antenna terminal and the antenna, and transmits a signal of a millimeter wave on the transmission side from the antenna terminal to the antenna, but transmits a signal of a millimeter wave on the reception side from the antenna to the antenna terminal.

The antenna changeover unit is used where the antenna is used commonly for transmission and reception. For example, when a signal of a millimeter wave signal is to be transmitted to the second communication device 200X side which is the opposite party, the antenna changeover unit connects the antenna to the transmission-side signal generating unit 110. On the other hand, when a signal of a millimeter wave from the second communication device 200X which is the opposite party is to be received, the antenna changeover unit connects the antenna to the reception-side signal generating unit 120. Although the antenna changeover unit is provided separately from the semiconductor chip 103 on the board 102, the location of the antenna changeover unit is not limited to this, but the antenna changeover unit may be provided otherwise in the semiconductor chip 103. Where antennas for transmission and reception are provided separately from each other, the antenna changeover unit can be omitted.

It seems a possible idea for the millimeter wave signal transmission path 9 which is a propagation path of a millimeter wave to be configured, for example, as a free space transmission path such that a millimeter wave propagates, for example, in the space in the housing. Or preferably, the millimeter wave signal transmission path 9 is formed from a waveguide structure of a waveguide pipe, a transmission path, a dielectric line or the inside of a dielectric member such that it has a characteristic of transmitting an electromagnetic wave in the millimeter waveband efficiently. For example, a dielectric transmission path 9A may be adopted which is configured including a dielectric material having a relative dielectric constant within a fixed range and a dielectric loss tangent within a fixed range. For example, if a dielectric material is filled in the entire housing, then not free space transmission paths but dielectric transmission paths 9A are disposed between the transmission path coupler 108 and the transmission path coupler 208. Or, the dielectric transmission path 9A may be configured otherwise by connecting an antenna of the transmission path coupler 108 and an antenna of the transmission path coupler 208 to each other by a dielectric line which is a line member formed from a dielectric material and having a certain diameter.

The "fixed range" may be any range of the relative dielectric constant or the dielectric loss tangent of the dielectric material within a range within which an effect of the present embodiment can be achieved, and the relative dielectric constant or the dielectric loss tangent may have a value determined in advance within this range. In short, the dielectric material may be any material which can transmit a millimeter wave and has a characteristic with which the effect of the present embodiment can be achieved. Since the effect of the present embodiment does not rely only upon the dielectric material itself but relates also to the transmission path length or the frequency of the millimeter wave, the relative dielectric constant or the dielectric loss tangent cannot necessarily be determined definitely. However, as an example, they can be determined in the following manner.

In order to allow a signal of a millimeter wave to be transmitted at a high speed in the dielectric transmission path 9A, the relative dielectric constant of the dielectric material preferably is approximately 2 to 10, and more preferably is approximately 3 to 6, and the dielectric loss tangent of the dielectric material preferably is 0.00001 to 0.01, more preferably is approximately 0.00001 to 0.001. As the dielectric material which satisfies such conditions as given above, acrylic resin-based, urethane resin-based, epoxy resin-based, silicone-based, polyimide-based and cyanoacrylate-based materials are available. Unless otherwise specified, such ranges of the relative dielectric constant and the dielectric loss tangent of the dielectric material as given above are applied similarly in the present embodiment. It is to be noted that, as the millimeter wave signal transmission path 9 of a configuration for confining a millimeter wave signal in the transmission path, not only the dielectric transmission path 9A but also a hollow waveguide which is surrounded over an outer periphery thereof by a shielding member and has a hollow structure.

The reception-side signal generating unit 120 is connected to the transmission path coupler 108. The amplifier 124 on the reception side is connected to the transmission path coupler 108, and amplifies an electric signal of a millimeter wave after received by the antenna and supplies the amplified electric signal to the frequency converter 125. The frequency converter 125 frequency-converts the amplified millimeter wave electric signal and supplies the frequency-converted signal to the demodulator 126. The demodulator 126 demodulates the frequency-converted signal to acquire a baseband signal and supplies the baseband signal to the serial-parallel converter 127.

The serial-parallel converter 127 converts serial reception data into parallel output data and supplies the parallel output data to the LSI functional unit 104.

The unification processing unit 128 corresponds to the multiplexing processor 213 of the transmission-side signal generating unit 210. For example, where signals from the LSI functional unit 204 include a plurality of kinds of, that is, N2, which may be equal to or different from N1, signals which make a subject of communication in the millimeter waveband, the multiplexing processor 213 carries out multiplexing processing such as time division multiplexing, frequency division multiplexing or code division multiplexing to integrate a plurality of kinds of signals into a signal of one channel similarly to the multiplexing processor 113. When such a signal as just described is received from the second communication device 200X, the unification processing unit 128 disintegrates, for example, the integrated signal of one channel into a plurality of kinds of signals _@ (@ is 1 to N2) similarly to the unification processing unit 128 corresponding to the multiplexing processor 113. For example, the unification processing unit 128 disintegrates the integrated signal of one channel into N2 data signals and supplies the N2 data signals to the LSI functional unit 104.

It is to be noted that, where the signals from the LSI functional unit 204 include a plurality of kinds of, that is, N2, signals which make a subject of communication in the millimeter waveband, signals are sometimes integrated in a signal of one channel by frequency division multiplexing by the transmission-side signal generating unit 210 in the second communication device 200X. In the case, electric signals of the millimeter waves in the frequency band F__1+ . . . +F_N2 need to be received and processed individually for each frequency band F_@. Therefore, the amplifier 124, frequency converter 125, demodulator 126 and serial-parallel converter 127 should be provided for each of the plural kinds of signals _@ while a frequency separator is provided as the unification processing unit 128 at the preceding stage to the amplifiers 124 (refer to FIG. 2B). Then, the electric signals of millimeter waves of the frequency bands F_@ after the separation should be supplied to the channels of the corresponding frequency bands F_@. As the frequency separator, where multiplexed millimeter wave signals of different carrier frequencies integrated as a signal of one channel are to be separated from each other as seen in FIG. 2B, a so-called distributor should be used. Though not shown, the amplifier 124 may be arranged at the preceding stage to the unification processing unit 128, that is, on the transmission path coupler 208 side, such that amplified signals are integrated by the unification processing unit 128.

It is to be noted that, while, in the form of use of the frequency division multiplexing method illustrated in FIG. 2B, a plurality of sets of a transmitter and a receiver are used such that different carrier frequencies are used for the different sets to carry out transmission in the same direction, that is, from the first communication device 100X to the second communication device 200X, the form of use of the frequency division multiplexing method is not limited to this. For example, the frequency division multiplexing method may be used for full duplex bidirectional communication wherein a first carrier frequency is used by a set of the transmission-side signal generating unit 110 of the first communication device 100X and the reception-side signal generating unit 220 of the second communication device 200X while a second carrier frequency is used by another set of the reception-side signal generating unit 120 of the first communication device 100X and the transmission-side signal generating unit 210 of the second communication device 200X such that the two sets carry out signal transmission at the same time in the opposite directions to each other. In this instance, for the antenna changeover unit in each of the transmission path couplers 108 and 208 in FIG. 1, a circulator which allows simultaneous signal transmission in the opposite directions should be used.

Further, a greater number of sets of a transmitter and a receiver may be used such that different carrier frequencies are used by the different sets to carry out signal transmission in the same direction and in the opposite directions in combination. In this instance, a circulator should be used in the transmission path couplers 108 and 208 while the multiplexing processors 113 and 213 and the unification processing units 128 and 228 are used in FIG. 2B.

Also it seems a possible idea to use a system configuration which includes a combination of different multiplexing methods such that, for example, time division multiplexing is applied to some channel or channels while frequency division multiplexing is applied to some other channel or channels.

Where the semiconductor chip 103 is configured in such a manner as described above, input signals are subjected to parallel to serial conversion and a resulting serial signal is transmitted to the semiconductor chip 203. Meanwhile, a reception signal from the semiconductor chip 203 side is subjected to serial to parallel conversion. Consequently, the number of signals of a millimeter wave conversion subject is reduced.

Where original signal transmission between the first communication device 100X and the second communication device 200X is serial transmission, the parallel-serial converter 114 and the serial-parallel converter 127 need not be provided.

[Second Communication Device]

While the second communication device 200X is described hereinabove, for example, in regard to the unification processing unit 228 in a relationship to the multiplexing processor 113 and in regard to the multiplexing processor 213 in a relationship to the unification processing unit 128, also in regard to the other components, it has a substantially similar functional configuration to that of the first communication device 100X. Each of the functional units of the second communication device 200X is denoted by a reference numeral in the two hundreds, and a functional unit similar to that of the first communication device 100X is denoted by a reference numeral including digits in the tens and the ones same as those of the first communication device 100X. A transmission unit is formed from a transmission-side signal generating unit 210 and a transmission path coupler 208, and a reception unit is formed from a reception-side signal generating unit 220 and the transmission path coupler 208.

A LSI functional unit 204 carries out principal application control of the second communication device 200X and includes, for example, a circuit for processing various signals to be transmitted to the opposite party and another circuit for processing various signals received from the opposite party.

[Connection and Operation]

A technique of frequency-converting and transmitting an input signal is used generally in broadcasting and wireless communication. In such applications, comparatively complicated transmitters, receivers and so forth are used which can cope with such problems as α) in what range communication can be carried out (problem of the S/N ratio regarding thermal noise), β) how to cope with reflection and multipath transmission and γ) how to suppress disturbance and interference with other channels. In contrast, the signal generating units 107 and 207 used in the present embodiment are used in the millimeter waveband which is a higher frequency band than frequencies used in complicated transmitters and receivers used popularly in broadcasting and wireless communication. Thus, since the wavelength λ is low, frequencies can be re-utilized readily, and therefore, signal generators suitable for communication between many devices positioned in the neighborhood of each other are used.

In the present embodiment, signal transmission is carried out using the millimeter waveband as described above so as to flexibly cope with high speed transmission and large amount data transmission, different from an existing signal interface which utilizes electric wiring lines. For example, only signals for which high speed transmission or large amount data transmission is required are made a subject of communication in the millimeter waveband. Depending upon the system configuration, the communication devices 100X and 200X include an interface by existing electric wiring lines, that is, an interface by a terminal and a connector, for signals for low speed transmission or small amount data transmission or for power supply.

The signal generating unit 107 carries out signal processing for input signals inputted from the LSI functional unit 104 to generate a signal of a millimeter wave. The signal generating unit 107 is connected to the transmission path coupler 108 by a transmission path such as, for example, a microstrip line, a strip line, a coplanar line or a slot line such that the generated signal of a millimeter wave is supplied to the millimeter wave signal transmission path 9 through the transmission path coupler 108.

The transmission path coupler 108 has an antenna structure and has a function of converting a signal of a millimeter wave transmitted thereto into an electromagnetic wave and signaling the electromagnetic wave. The transmission path coupler 108 is coupled to the millimeter wave signal transmission path 9 such that an electromagnetic wave converted by the transmission path coupler 108 is supplied to one end portion of the millimeter wave signal transmission path 9. To the other end of the millimeter wave signal transmission path 9, the transmission path coupler 208 on the second communication device 200X side is coupled. Since the millimeter wave signal transmission path 9 is provided between the transmission path coupler 108 of the first communication device 100X side and the transmission path coupler 208 of the second communication device 200X side, an electromagnetic wave in the millimeter waveband is propagated to the millimeter wave signal transmission path 9.

The transmission path coupler 208 of the second communication device 200X side is connected to the millimeter wave signal transmission path 9. The transmission path coupler 208 receives an electromagnetic wave transmitted to the other end of the millimeter wave signal transmission path 9, converts the electromagnetic wave into a signal of the millimeter band and supplies the signal of the millimeter band to the signal generating unit 207 which is a baseband signal generation unit. The signal generating unit 207 carries out signal processing for the converted signal of the millimeter wave to generate an output signal, that is, a baseband signal, and supplies the generated output signal to the LSI functional unit 204.

While, in the foregoing description, signal transmission is carried out from the first communication device 100X to the second communication device 200X, also signal transmission from the LSI functional unit 204 of the second communication device 200X to the first communication device 100X is carried out similarly. Thus, a signal of a millimeter wave can be transmitted bidirectionally.

Here, a signal transmission system which carries out signal transmission through an electric wiring line has the following problems.

i) Although great amount data transmission and high speed transmission of transmission data are demanded, there is a limitation to the transmission speed and the transmission capacity of an electric wiring line.

ii) It seems a possible countermeasure to increase, in order to cope with the problem of achievement of high speed transmission of transmission data, the number of wiring lines to achieve parallel transmission of transmission data while reducing the transmission speed per one signal line. However, this countermeasure increases the number of input and output terminals. As a result, complication of a printed circuit board and a cable wiring scheme, increase in physical size of a connector unit and an electric interface and so forth are required. This complicates the shape of the elements mentioned, resulting in such problems of deterioration of the reliability of the element and increase of the cost.

iii) As the bandwidth of the frequency band of a baseband signal increases together with significant increase of the information amount of movie images or computer images, the problem of EMC (electromagnetic compatibility) becomes further tangible. For example, where an electric wiring line is used, the wiring line serves as an antenna and a signal corresponding to a tuning frequency of the antenna suffers from interference. Further, reflection or resonance caused by impedance mismatching of a wiring line makes a cause of unnecessary radiation. Since a countermeasure against such problems is taken, the configuration of an electronic apparatus is complicated.

iv) In addition to EMC, if reflection exists, then also a transmission error caused by interference between symbols on the reception side or a transmission error by jumping in of disturbance becomes a problem.

Meanwhile, the wireless transmission system 1X of the present embodiment uses not an electric wiring line but a millimeter wave to carry out signal transmission. A signal to be transmitted from the LSI functional unit 104 to the LSI functional unit 204 is converted into a millimeter wave signal, which is transmitted through the millimeter wave signal transmission path 9 between the transmission path couplers 108 and 208.

Since the millimeter wave signal transmission is wireless transmission, there is no necessity to take care of the wiring line shape or the position of a connector, and therefore, the problem of the restriction to the layout does not occur very often. Since a wiring line and a terminal for a signal whose transmission is changed to signal transmission by a millimeter wave can be omitted, the problem of EMC is eliminated. Generally since the communication devices 100X and 200X do not include any other functional unit which uses a frequency of the millimeter waveband, a countermeasure against EMC can be implemented readily.

Since the transmission between the first communication device 100X and the second communication device 200X is wireless transmission in a state in which they are positioned closely to each other and therefore is signal transmission between fixed positions or in a known positional relationship, the following advantages are achieved.

1) It is easy to appropriately design a propagation channel or waveguide structure between the transmission side and the reception side.

2) By designing a dielectric structure of the transmission path couplers for enclosing the transmission side and the reception side together with a propagation channel, that is, the waveguide structure of the millimeter wave signal transmission path 9, good transmission of high reliability can be achieved by free space transmission.

3) Since also control of a controller for managing wireless transmission, which corresponds to the LSI functional unit 104 in the present embodiment, need not be carried out so dynamically, adaptively or frequently as is carried out by general wireless communication, the overhead by the control can be reduced from that of general wireless communication. As a result, miniaturization, reduction in power consumption and increase in speed can be anticipated.

4) If, upon production or designing, the wireless transmission environment is calibrated to grasp a dispersion and so forth of each individual product, then high quality communication can be anticipated by referring to the data of the dispersion and so forth to carry out transmission.

5) Even if reflection exists, since this is fixed reflection, an influence of the reflection can be eliminated readily by a small equalizer at he reception side. Also setting of the equalizer can be carried out by preset or static control and can be implemented readily.

Further, since wireless communication in the millimeter waveband in which the wavelength is short is used, the following advantages can be anticipated.

a) Since a wide communication bandwidth can be assured by the millimeter wave communication, it is possible to use a high data rate simply.

b) The frequency to be used for transmission can be spaced away from a frequency for a different baseband signal process, and therefore, interference in frequency between a millimeter wave and a baseband signal is less likely to occur.

c) Since wavelengths in the millimeter waveband are short, the antenna and the waveguide structure which depend upon the wavelength can be made small. In addition, since the distance attenuation is great and the diffraction is small, electromagnetic shielding can be carried out readily.

d) In ordinary wireless communication in a field, severe restraints to the stability of a carrier wave are applied in order to prevent interference and so forth order to implement a carrier having such high stability, an external frequency reference part, a multiplication circuit or a PLL (phase-locked loop circuit) and so forth which have high stability are used, and this increases the circuit scale. However, where a millimeter wave is used, particularly where a millimeter wave is used together with signal transmission between fixed positions or in a known positional relationship, a millimeter wave can be blocked readily and can be prevented from leaking to the outside. Therefore, a carrier wave of low stability can be used for transmission and increase of the circuit scale can be prevented. In order to use a small circuit on the reception side to demodulate a signal transmitted with a carrier whose stability is moderated, preferably an injection locking method is adopted. Details of the injection locking method are hereinafter described.

While, in the description of the present embodiment, a system which carries out communication in the millimeter waveband is described as an example of the wireless transmission system, the application range thereof is not limited to a system which uses the millimeter waveband for communication. Communication in a frequency band lower than the millimeter waveband or conversely higher than the millimeter waveband may be applied alternatively. For example, the microwave waveband may be applied. However, where an injection locking method is adopted for signal transmission within a housing or in signal transmission between different apparatus, and where an overall oscillation circuit including a tank circuit is formed on a CMOS chip, it is considered most effective to use the millimeter waveband.

<Communication Processing Channel: Modification>

Figure 5:
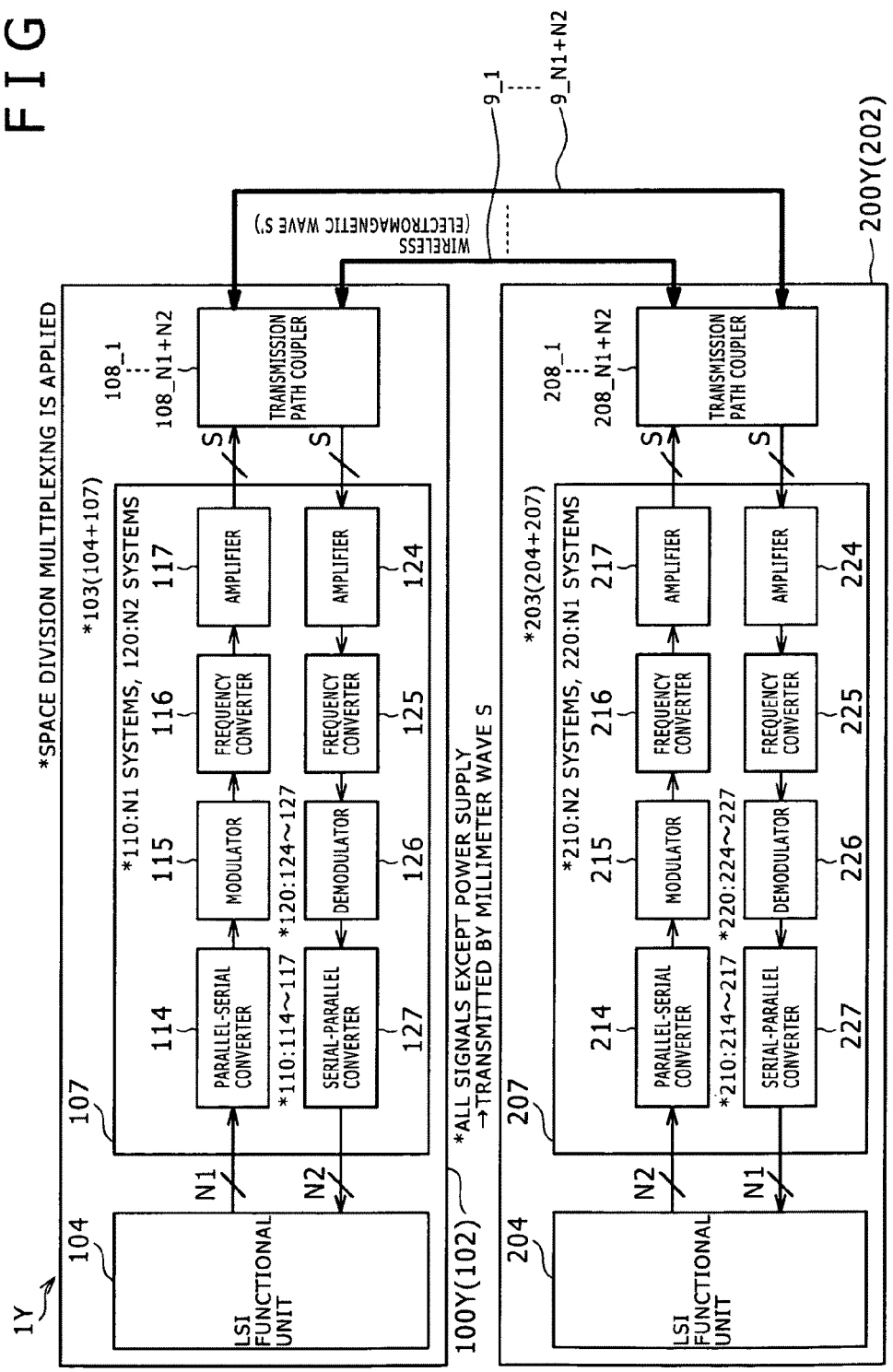
FIG. 5 is a block diagram showing a functional configuration of a signal interface of modification (applying space division multiplexing) of a wireless transmission system.

FIGS. 3A to 4C show modified configuration of the wireless transmission system. FIGS. 3A to 3F show an outline of the "space division multiplexing" applied to the modified configuration. FIGS. 4A to 4C show appropriate conditions, that is, application conditions of the "space division multiplexing." FIG. 5 shows a functional configuration of a signal interface of modification of a wireless transmission system 1Y.

The wireless transmission system 1Y of the present embodiment is characterized in that, by using a plurality of paired transmission couplers 108 and 208, a plurality of channels of such millimeter wave signal transmission paths 9 are included. The plural channels of the millimeter wave signal transmission paths 9 are installed such that they do not interfere spatially with each other or are not influenced by interference, and can carry out communication at the same time using the same frequency along the plural channels for signal transmission.

The term "there is no spatial interference" signifies that signals of plural channels can be transmitted independently of each other. A mechanism therefor is hereinafter referred to as space division multiplexing. When multi-channeling for a transmission channel is intended, if the space division multiplexing is not applied, then it is necessary to apply frequency division multiplexing such that different carrier frequencies are used for different channels. However, if the space division multiplexing is applied, then even if the same carrier frequency is used, transmission can be implemented without being influenced by interference.

The "space division multiplexing" may be any method of forming a plurality of channels of millimeter wave signal transmission paths 9 in a three-dimensional space in which a millimeter wave signal which is an electromagnetic wave can be transmitted. In particular, the method is not limited to configuration of plural channels of millimeter wave signal transmission paths 9 in a free space. For example, where a three-dimensional space in which a millimeter wave signal which is an electromagnetic wave can be transmitted is configured from a dielectric material which is an entity, plural channels of millimeter wave signal transmission paths 9 may be formed in the dielectric material. Further, each of the plural channels of millimeter wave signal transmission paths 9 is not limited to a free space but may have a form of a dielectric transmission path, a hollow waveguide or the like.

[Examples of the Structure of the Millimeter Wave Signal Transmission Path for the Space Division Multiplexing]

FIGS. 3A to 3F show several examples of the structure of the millimeter wave signal transmission path for the space division multiplexing. When it is intended to increase the number of transmission channels, where the space division multiplexing is not applied, it seems a possible idea, for example, to apply frequency division multiplexing to use carrier frequencies different among different channels. However, if the space division multiplexing is applied, then even if the same carrier frequency is used, simultaneous signal transmission can be carried out without being influenced by interference.

In particular, the "space division multiplexing" may be achieved using any configuration only if a plurality of channels of independent millimeter wave signal transmission paths 9 are formed in a three-dimensional space through which a millimeter wave signal or an electromagnetic wave can be transmitted. Thus, the configuration is not limited to the specific configuration wherein a plurality of channels of free space transmission paths 9B are formed in a free space such that they are spaced from each other by a distance with which interference does not occur (refer to FIG. 3A).

Figure 3A:
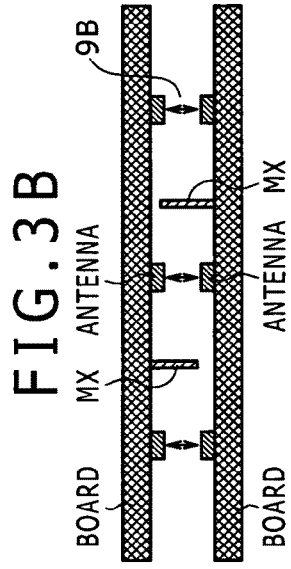
FIGS. 3A to 3F are diagrammatic views illustrating outlines of space division multiplexing adopted in modified configurations.
Figure 3B:
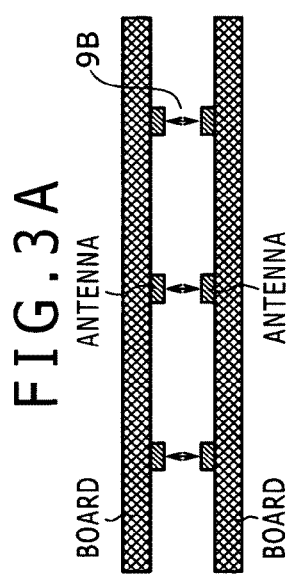

For example, as shown in FIG. 3B, where a plurality of channels of free space transmission paths 9B are provided in a free space, a structure for disturbing propagation of a radio wave, that is, a millimeter wave blocking body MX, may be arranged between each adjacent ones of transmission channels in order to suppress interference between the transmission channels. The millimeter wave blocking body MX may be or may not be a conductor.

Figure 3C:
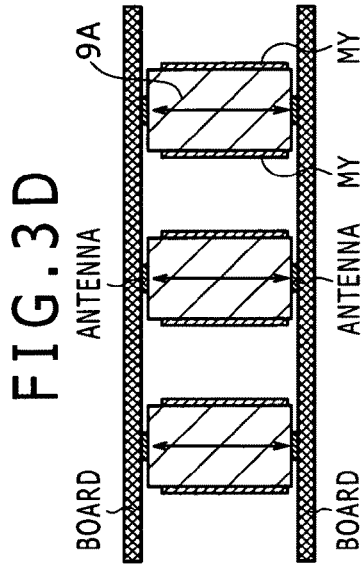
Figure 3D:
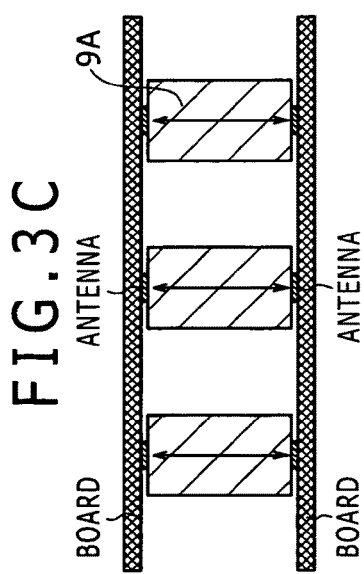

Each of the plural channels of millimeter wave signal transmission paths 9 is not necessarily required to be configured as a free space, but a millimeter wave confining structure may be used instead. For example, such a dielectric transmission path 9A as shown in FIG. 3C may be adopted which is configured including a dielectric material as the millimeter wave confining structure. Where the dielectric transmission path 9A is configured in a millimeter wave confining structure, a dielectric shielding member of a metal member or the like for suppressing external radiation of a millimeter wave signal, that is, a millimeter wave blocking body MY, may be provided on an outer periphery of the dielectric transmission path 9A as shown in FIG. 3D to suppress external radiation of a millimeter wave. Preferably, the millimeter wave blocking body MY is set to a fixed potential such as, for example, the ground potential, on the circuit board.

Figure 3E:
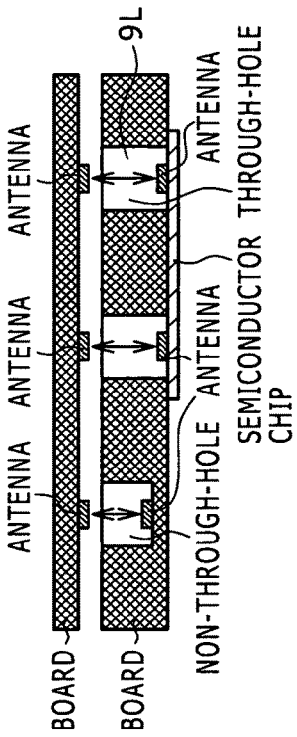

As another example of the millimeter wave confining structure, a hollow waveguide 9L which is surrounded over an outer periphery thereof by a shielding member and has a hollow structure may be used. For example, as shown in FIG. 3E, the hollow waveguide 9L is structured such that it is surrounded over an outer periphery thereof by a conductor MZ which is an example of a shielding member and is hollow. The surrounding conductor MZ may be provided on any one of two boards disposed in an opposing relationship to each other. The propagation loss L between the surrounding conductor MZ and one of the boards, more particularly, the length of a gap from an end of the conductor MZ to the opposing board, is set to a sufficiently low value in comparison with the wavelength of the millimeter wave. Where the surrounding shielding member is formed as the conductor MZ, the shielding performance can be assured with a higher degree of certainty than where it is not formed from a conductor.

If FIGS. 3B and 3E are compared with each other, then the hollow waveguide 9L has a structure similar to the free space transmission path 9B where the millimeter wave blocking body MX is disposed in the free space transmission path 9B but is different from the free space transmission path 9B in that the conductor MZ which is an example of a millimeter wave shielding member is provided in such a manner as to surround the antenna. Since the inside of the conductor MZ is hollow, there is no necessity to use a dielectric material, and the millimeter wave signal transmission path 9 can be configured simply and readily at a low cost. Preferably, the conductor MZ is set to a fixed potential such as, for example, the ground potential on the board.

Figure 3F:
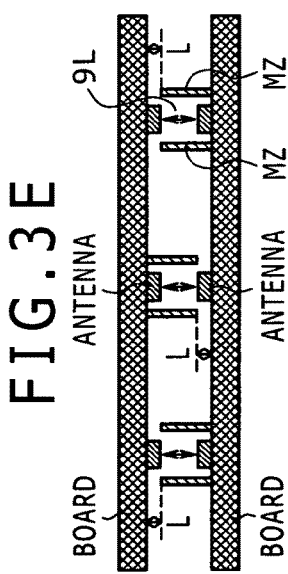

The configuration of the hollow waveguide 9L is not limited to that wherein an enclosure is formed from the conductor MZ on the board, but the hollow waveguide 9L may be configured such that a hole which may be or may not be a through-hole is formed in a rather thick board such that the wall face of the hole is utilized as the enclosure as shown in FIG. 3F. The hole may have an arbitrary sectional shape such as a circular shape, a triangular shape or a quadrangular shape. In this instance, the board functions as a shielding member. The hole may be formed in one or both ones of a pair of boards disposed in an opposing relationship to each other. The side wall of the hole may be or may not be covered with a dielectric member. Where the hole is formed as a through-hole, an antenna should be disposed on or attached to the rear face of a semiconductor chip. Where the hole is formed not as a through-hole but as a bottomed or blind hole, an antenna should be installed on the bottom of the hole.

Since the dielectric transmission path 9A and the hollow waveguide 9L confine a millimeter wave therein by the enclosure thereof, they can achieve such advantages that a millimeter wave can be transmitted efficiently with comparatively low loss, that external radiation of a millimeter wave is suppressed and that an EMC countermeasure can be taken comparatively easily.

As a further example of the millimeter wave confining structure, where a three-dimensional space which can transmit a millimeter wave signal which is an electromagnetic signal is configured from a dielectric material which is an entity, a plurality of channels of independent millimeter wave signal transmission paths 9, particularly the dielectric transmission paths 9A (this similarly applies in this paragraph), are formed on the dielectric material. For example, it seems a possible idea to configure a printed board, on which electronic circuit parts are mounted, from a dielectric material and use the printed board as a dielectric transmission path 9A. In this instance, it seems a possible idea to form a plurality of independent dielectric transmission paths 9A in the board.

[Appropriate Conditions of the Space Division Multiplexing]

FIGS. 4A to 4C particularly illustrate a manner of setting of appropriate conditions where the space division multiplexing is applied. For example, the propagation loss L of a free space can be represented by "L [dB]=10 $\log_{10}((4\pi d/\lambda)^2)$ . . . (A)" as seen in FIG. 4A where d is the distance and λ is the wavelength.

Two kinds of space division multiplexing are considered as seen in FIGS. 4A to 4C. In FIGS. 4A to 4C, the transmitter is represented by "TX" and the receiver is represented by "RX." Reference character "_100" represents the first communication device 100Y side and "_200" represents the second communication device 200Y side. Referring to FIG. 4B, the first communication device 100Y includes two channels of transmitters TX_100_1 and TX_100_2, and the second communication device 200Y includes two channels of receivers RX_200_1 and RX_200_2. In particular, signal transmission from the first communication device 100Y side to the second communication device 200Y side is carried out between the transmitter TX_100_1 and the receiver RX_200_1 and between the transmitter TX_100_2 and the receiver RX_200_2. In other words, signal transmission from the first communication device 100Y side to the second communication device 200Y side is carried out through the two channels.

Meanwhile, referring to FIG. 4C, the first communication device 100Y includes a transmitter TX_100 and a receiver RX_100 while the second communication device 200Y includes a transmitter TX_200 and a receiver RX_200. In particular, signal transmission from the first communication device 100Y side to the second communication device 200Y side is carried out between the transmitter TX_100 and the receiver RX_200, and signal transmission from the second communication device 200Y side to the first communication device 100Y side is carried out between the transmitter TX_200 and the receiver RX_100. Different channels are used for transmission and reception, and transmission (TX) and reception (RX) of data from and to both apparatus can be carried out by full duplex transmission.

Here, the relationship between an inter-antenna distance $d_1$ and a spatial channel distance $d_2$, particularly a space distance between free space transmission paths 9B, necessary to obtain a necessary DU [dB], that is, a necessary ratio between a desired wave and an unnecessary wave, where an antenna having no directivity is given, from the expression (A), by "$d_2/d_1=10^{DU/20}$ . . . (B)."

For example, if DU=20 dB, then $d_2/d_1$=10, and the spatial channel distance $d_2$ must be as long as ten times the inter-antenna distance $d_1$. Since usually an antenna has some directivity, even in the case of the free space transmission paths 9B, the spatial channel distance $d_2$ can be set shorter.

For example, if the distance to an antenna of the opposite party of communication is short, then the transmission power for the antennas can be suppressed low. If the transmission power is sufficiently low and a pair of antennas can be installed at positions sufficiently spaced away from each other, then interference between the paired antennas can be suppressed sufficiently low. Particularly in millimeter wave communication, since the wavelength of a millimeter wave is short, the distance attenuation is great and also the diffraction is small, and therefore, space division multiplexing can be implemented readily. For example, even with the free space transmission paths 9B, the spatial channel distance $d_2$, that is, the space distance between the free space transmission paths 9B, can be set smaller than ten times the inter-antenna distance $d_1$.

In the case of a dielectric transmission path or a hollow waveguide having a millimeter wave confining structure, since a millimeter wave can be transmitted while it is confined in the inside, the spatial channel distance $d_2$, that is, the space distance between the free space transmission paths, can be set shorter than ten times the inter-antenna distance $d_1$. Particularly in contrast to the free space transmission paths 9B, the channel distance can be reduced further.

[System Configuration wherein Space Division Multiplexing is Applied]

FIG. 5 shows a modified configuration of a wireless transmission system 1Y to which space division multiplexing is applied. Referring to FIG. 5, as can be recognized from the description regarding the space division multiplexing given hereinabove, the wireless transmission system 1Y includes a plurality of channels of millimeter wave signal transmission paths 9 interposed between a first communication device 100Y and a second communication device 200Y.

Since the space division multiplexing permits use of the same frequency band at the same time, the communication speed can be raised, and the simultaneity of bidirectional communication wherein signal transmission for the N1 channels from the first communication device 100Y to the second communication device 200Y and signal transmission for the N2 channels from the second communication device 200Y to the first communication device 100Y can be secured. Particularly a millimeter wave is short in wavelength, and an attenuation effect by the distance can be expected. Further, even where the offset is small, that is, even where the spatial distance between transmission channels is short, interference is less likely to occur, and propagation channels different from each other depending upon the place can be implemented readily.

As seen in FIG. 5, the wireless transmission system 1Y of the present embodiment includes "N1+N2" channels of transmission path couplers 108 and 208 each including a millimeter wave transmission terminal, a millimeter wave transmission path, an antenna and so forth and "N1+N2" channels of millimeter wave signal transmission paths 9. Each of the reference characters has a suffix "_@" (@ is 1 to N1+N2). Thus, a full duplex transmission system wherein millimeter wave transmission is carried out independently for transmission and reception can be implemented.

The multiplexing processor 113 and the unification processing unit 128 are removed from the first communication device 100Y, and the multiplexing processor 213 and the unification processing unit 228 are removed from the second communication device 200Y. In the present example, all signals except power supply are made a subject of transmission with a millimeter wave. It is to be noted that, although the wireless transmission system 1Y is similar to that shown in FIG. 2B which adopts frequency division multiplexing, the transmission-side signal generating unit 110 and the reception-side signal generating unit 220 are provided for each of N1 channels, or in other words, N1 such transmission-side signal generating units 110 and N1 such reception-side signal generating units 220 are provided, and the transmission-side signal generating unit 210 and the reception-side signal generating unit 120 are provided for each of N2 channels, or in other words, N2 such transmission-side signal generating units 210 and N2 such reception-side signal generating units 120 are provided.

While the basic configuration is described here, this is a mere example, and the form of accommodating the transmission-side signal generating unit 110, reception-side signal generating unit 120, the transmission-side signal generating unit 210 and reception-side signal generating unit 220 in the semiconductor chips 103 and 203, respectively, is not limited to that described hereinabove with reference to FIG. 5. For example, the system may be configured using the semiconductor chip 103 including only the signal generating unit 107 which accommodates one channel of the transmission-side signal generating unit 110 and the reception-side signal generating unit 120 and the semiconductor chip 203 including only a signal generating unit 207 which accommodates one channel of the transmission-side signal generating unit 210 and the reception-side signal generating unit 220. Further, the transmission-side signal generating unit 110, reception-side signal generating unit 120, transmission-side signal generating unit 210 and reception-side signal generating unit 220 may be accommodated in the individually different semiconductor chips 103 and 203 to configure the system. Depending upon such modifications, the system may be configured so as to satisfy N1=N2=N.

The functional units which should be accommodated in the semiconductor chips 103 and 203 need not be accommodated in a paired relationship between the first communication device 100Y side and the second communication device 200Y side but may be accommodated in an arbitrary combination. For example, the first communication device 100Y may be formed such that the functional units for the N1 channels on the transmission side and the N2 channels on the reception side are accommodated in one chip while the second communication device 200Y side is configured such that the transmission-side signal generating units 210 and the reception-side signal generating units 220 are accommodated in such different semiconductor chips 203 from each other.

The carrier frequencies of the channels may be same as each other or different from each other. For example, where a dielectric transmission path or a hollow waveguide is used, since a millimeter wave is confined in the inside of them, millimeter wave interference can be prevented. Therefore, there is no problem even if the same frequency is used. On the other hand, in the case of a free space transmission path, if frequency space transmission paths are spaced from each other by a certain distance, then there is no problem if the same frequency is used. However, where frequency space transmission paths are spaced but by a small distance, different frequencies should be used.

For example, in order to implement bidirectional communication, time division multiplexing and frequency division multiplexing are available in addition to space division multiplexing as is described in the basic configuration. In the basic configuration, as a method for implementing data transmission and reception using the millimeter wave signal transmission path 9 of one channel, one of a half duplex method wherein transmission and reception are changed over by time division multiplexing and a full duplex method wherein transmission and reception are carried out simultaneously by frequency division multiplexing is adopted.

However, the time division multiplexing has a problem that transmission and reception cannot be carried out concurrently. Further, as seen from FIGS. 2A to 2C, the frequency division multiplexing has a problem that the millimeter wave signal transmission path 9 must have a great frequency bandwidth.

In contrast, in the wireless transmission system 1Y of the modified configuration, same carrier frequency setting can be applied to a plurality of signal transmission channels, that is, to a plurality of channels. Consequently, it is facilitated to re-utilize carrier frequencies, that is, to use the same frequency for a plurality of channels. Even if the millimeter wave signal transmission path 9 does not have a great bandwidth, transmission and reception of signals can be implemented simultaneously. Also, if a plurality of transmission channels are used in the same direction and the same frequency band is used at the same time, then increase of the communication speed can be, achieved.

Where the millimeter wave signal transmission paths 9 of N channels are used for N (N=N1=N2) base band signals, in order to achieve bidirectional transmission and reception, time division multiplexing or frequency division multiplexing should be applied to transmission and reception. Also, if the millimeter wave signal transmission paths 9 of 2N channels are used, also as regards bidirectional transmission and reception, transmission can be carried out using the millimeter wave signal transmission paths 9 of different channels, that is, using the transmission paths which are fully independent of each other. In short, where N signals of a subject of communication in the millimeter waveband are used for transmission and reception, even if such a multiplexing process as time division multiplexing, frequency division multiplexing or code division multiplexing is not carried out, the N different signals can be transmitted through the individual millimeter wave signal transmission paths 9 of the 2N channels.

Also it seems a possible idea to use a system configuration which includes a combination of various multiplexing methods such that the time division multiplexing is applied to a channel and the frequency division multiplexing is applied to another channel while the space division multiplexing is applied to a further channel. Where the space division multiplexing is applied, it may seem a possible idea to adopt a system configuration which includes various types of millimeter wave signal transmission paths 9 which are combined such that one of the millimeter wave signal transmission paths 9 is formed as the free space transmission path 9B and another one of the millimeter wave signal transmission paths 9 is formed so as to have a millimeter wave confining structure like the dielectric transmission path 9A or the hollow waveguide 9L.

<Modulation and Demodulation: Comparative Example>

Figure 6A:
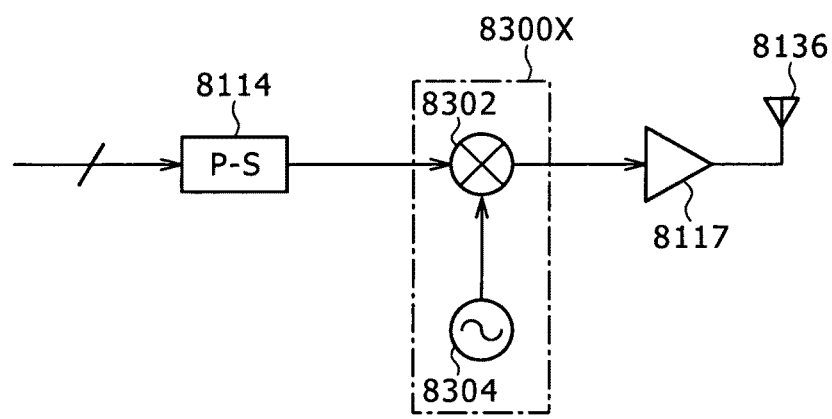
FIGS. 6A and 6B are block diagrams illustrating a comparative example of a modulation functional unit and a demodulation functional unit in a communication processing channel.
Figure 6B:
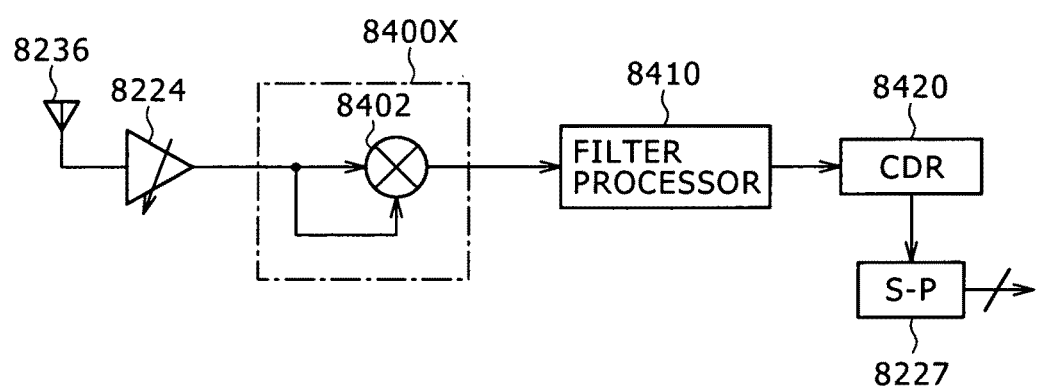

FIGS. 6A and 6B show a comparative example of a modulation functional unit and a demodulation functional unit in the communication processing channel.

[Modulation Functional Unit: Comparative Example]

FIG. 6A shows a configuration of a modulation functional unit 8300X of a comparative example provided on the transmission side. A signal of a transmission subject, for example, an image signal of 12 bits, is converted by the parallel-serial converter 114 into a high-speed serial data string and supplied to the modulation functional unit 8300X.

The modulation functional unit 8300X can adopt various circuit configurations in accordance with the modulation method. However, for example, if a method of modulating the amplitude is adopted, then the modulation functional unit 8300X should be configured such that it includes a frequency mixer 8302 and a transmission side local oscillator 8304.

The transmission side local oscillator 8304 which serves as a first carrier signal generating unit generates a carrier signal to be used for modulation, that is, a modulation carrier signal. The frequency mixer 8302 which serves as a first frequency converter multiplies or modulates a carrier in the millimeter waveband generated by the transmission side local oscillator 8304 by or with a signal from a parallel-serial converter 8114 which corresponds to the parallel-serial converter 114 to generate a modulation signal in the millimeter waveband. The modulation signal is supplied to an amplifier 8117 which corresponds to the amplifier 117. The modulation signal is amplified by the amplifier 8117 and radiated from an antenna 8136.

[Demodulation Functional Unit: Comparative Example]

FIG. 6B shows a configuration of a demodulation functional unit 8400X of the comparative example provided on the reception side. While the demodulation functional unit 8400X can have various circuit configurations within a range corresponding to the modulation method on the transmission side, it is assumed here that the demodulation functional unit 8400X adopts a method applied where the amplitude is modulated so as to correspond to the description of the modulation functional unit 8300X given hereinabove.

The demodulation functional unit 8400X of the comparative example includes a frequency mixer 8402 or mixer circuit of the 2-input type and uses a square-law detection circuit from which a detection output which increases in proportion to the square of the amplitude of an envelope of a received millimeter wave signal can be obtained. It is to be noted that it seems a possible idea to use a simple envelope detection circuit which does not have a square characteristic in place of the square-law detection circuit. A filter processor 8410, a clock recovering unit 8420 which is a clock data recovery (CDR) unit and a serial-parallel converter (S-P) 8127 which corresponds to the serial-parallel converter 127 are provided on the succeeding stage to the frequency mixer 8402. The filter processor 8410 includes, for example, a low-pass filter (LPF).

A millimeter wave reception signal received by an antenna 8236 is inputted to an amplifier 8224 of the variable gain type, which corresponds to the amplifier 224 and by which amplitude adjustment is carried out for the millimeter wave reception signal. An output signal of the amplifier 8224 is supplied to the demodulation functional unit 8400X. In particular, the amplitude-adjusted reception signal from the amplifier 8224 is inputted simultaneously to two input terminals of the frequency mixer 8402, by which a square signal is generated. The square signal is supplied to the filter processor 8410. The low-pass filter of the filter processor 8410 removes high frequency components from the square signal generated by the frequency mixer 8402 to generate a waveform of the input signal sent from the transmission side, that is, a baseband signal. The baseband signal is supplied to the clock recovering unit 8420.

The filter processor 8410 (CDR) recovers a sampling clock based on the baseband signal and samples the baseband signal with the recovered sampling clock to generate a reception data string. The generated reception data string is supplied to a serial-parallel converter 8227 (S-P), by which parallel signals, for example, an image signal of 12 bits, are recovered. Although various methods are available for clock recovery, for example, a symbol synchronizing method is adopted.

[Problems of the Comparative Example]

Where a wireless transmission system is configured from the modulation functional unit 8300X and the demodulation functional unit 8400X of the comparative example, it has the following difficult points.

First, the following difficult points exist with regard to the oscillation circuits. For example, in outdoor communication, it is necessary to take multi-channel transmission into consideration. In this instance, the required specifications for the stability of a carrier on the transmission side are severe because the stability is influenced by a frequency variation component of the carrier. In transmission of data using a millimeter wave in signal transmission within a housing or signal transmission between different apparatus, if it is attempted to use an ordinary technique as is used in outdoor wireless communication on the transmission side and the reception side, then stability is required for the carrier. Thus, an oscillation circuit for a millimeter wave having such high stability that the frequency stability value is on the ppm (parts per million) order is required.

In order to implement a carrier signal having high frequency stability, it seems a possible idea, for example, to implement an oscillation circuit for a millimeter wave having high stability on a silicon integrated circuit (CMOS: Complementary Metal-Oxide Semiconductor). However, since a silicon substrate used for an ordinary CMOS device has a low insulating property, a tank circuit having a high Q value (Quality Factor) cannot be formed readily, and consequently, the implementation of a carrier signal having high frequency stability is difficult. For example, where inductance is formed on a CMOS chip as disclosed, for example, in A. Niknejad, "mm-Wave Silicon Technology 60 GHz and Beyond" (particularly 3.1.2 Inductors, pp. 70-71), ISBN 978-0-387-87558-7 (hereinafter referred to as Reference Document A), the Q value becomes approximately 30 to 40.

Therefore, in order to implement an oscillation circuit having high stability, it seems a possible idea to adopt a technique wherein a tank circuit of a high Q value is provided using a quartz oscillator or the like outside a CMOS device in which main part of the oscillation circuit is configured such that the tank circuit oscillates with a low frequency and multiply the oscillation output of the tank circuit until the frequency thereof falls within the millimeter bandwidth. However, it is not preferable to provide such an external tank circuit for all chips in order to implement a function of replacing signal transmission by a wiring line such as LVDS (Low Voltage Differential Signaling) with signal transmission by a millimeter wave.

If a method wherein the amplitude is modulated like OOK (On-Off-Keying) is used, then since only it is necessary on the reception side to carry out envelope detection, the oscillation is not required, and therefore, the number of tank circuits can be reduced. However, as the signal transmission distance becomes long, the reception amplitude decreases, and with a method which uses a square-law detection circuit is used as an envelope detection circuit, the influence of decrease of the reception amplitude becomes conspicuous and signal distortion comes to have an influence disadvantageously. In other words, the square-law detection circuit is disadvantageous in terms of the sensitivity.

As another technique for implementing a carrier signal having high frequency stability, it seems a possible idea to use, for example, a frequency multiplication circuit or a PLL circuit having high stability. However, this increases the circuit scale. For example, "A 90 nm CMOS Low-Power 60 GHz Transceiver with Integrated Baseband Circuitry," ISSCC 2009/SESSION 18/RANGING AND Gb/s COMMUNICATION/18.5, 2009 IEEE International Solid-State Circuits Conference, pp. 314-316 (hereinafter referred to as Reference Document B) discloses a technique which uses a push-push oscillation circuit while a 60 GHz oscillation circuit is eliminated to reduce the circuit scale. However, the technique still requires an oscillation circuit of 30 GHz and a frequency divider, a phase frequency detection circuit (Phase Frequency Detector: PFD), an external reference, which is, in the technique disclosed, 117 MHz, and so forth. Thus, the circuit scale is apparently great.

Since the square-law detection circuit can extract only an amplitude component from a reception signal, the modulation method which can be used is limited to a method of modulating the amplitude such as ASK like OOK, and it is difficult to adopt a method which modulates the phase or the frequency. That it is difficult to adopt the phase modulation method leads to the fact that it is impossible to convert a modulation signal into quadrature signals to raise the data transmission rate.

Further, where it is tried to use the frequency division multiplexing method to implement multi-channel transmission, use of the square-law detection circuit gives rise to the following difficult points. Although it is necessary to dispose a band-pass filter for frequency selection on the reception side at a preceding stage to the square-law detection circuit, it is not easy to implement a small steep band-pass filter. Further, where a steep band-pass filter is used, also required specifications for the stability of the carrier frequency on the transmission side become severe.

<Modulation and Demodulation: Basis>

Figure 7A:
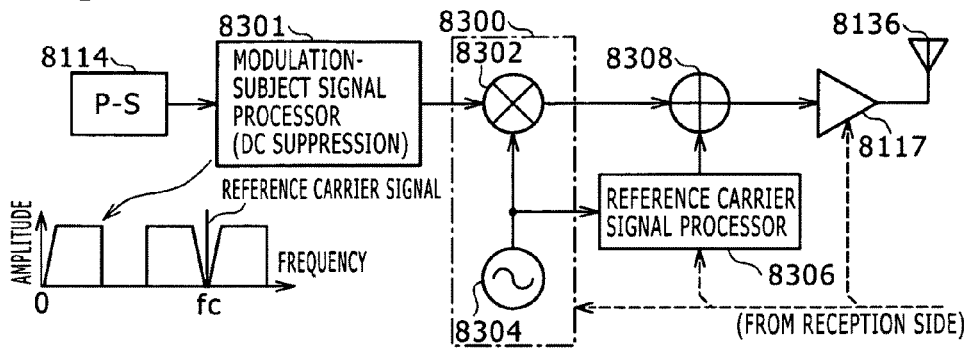
FIGS. 7A to 7D show a basic configuration of the modulation functional unit and peripheral circuits.
Figure 7B:
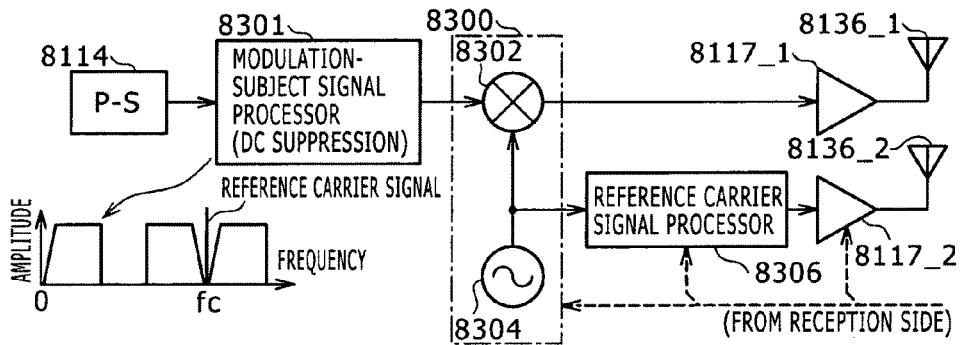
Figure 7C:
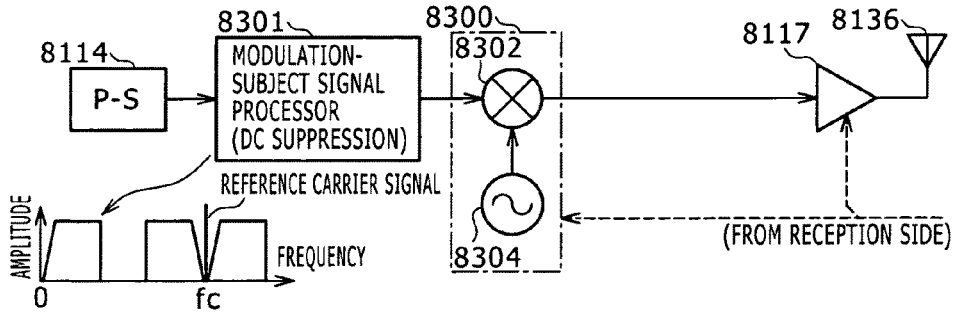
Figure 7D:
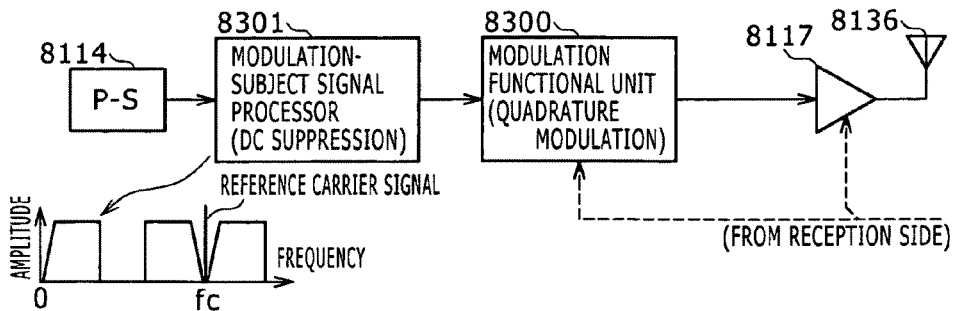
Figure 8A:
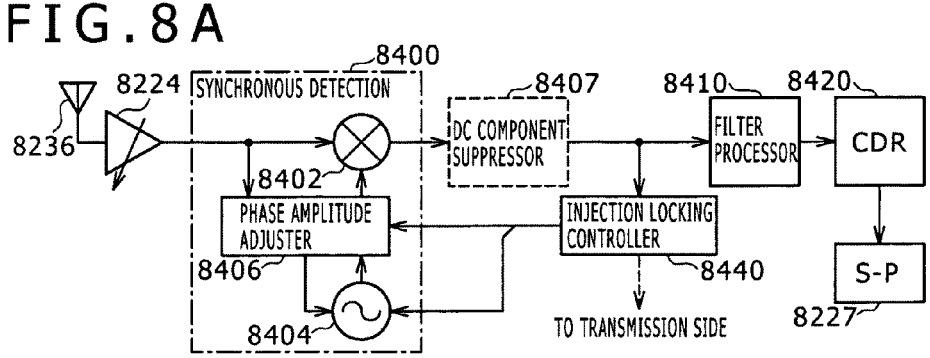
FIGS. 8A to 8D show a basic configuration of the demodulation functional unit and peripheral circuits.
Figure 8B:
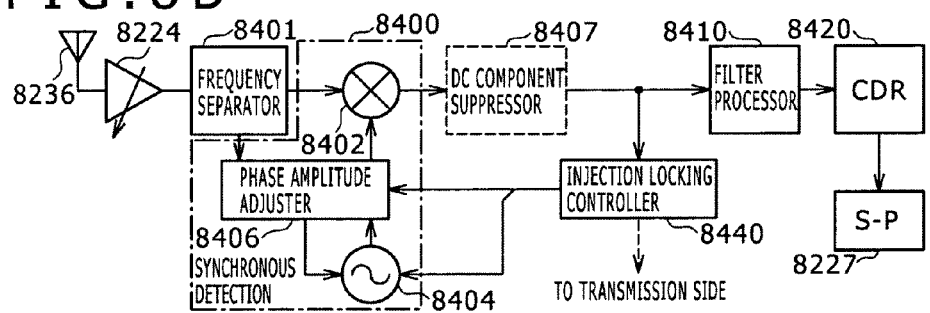
Figure 8C:
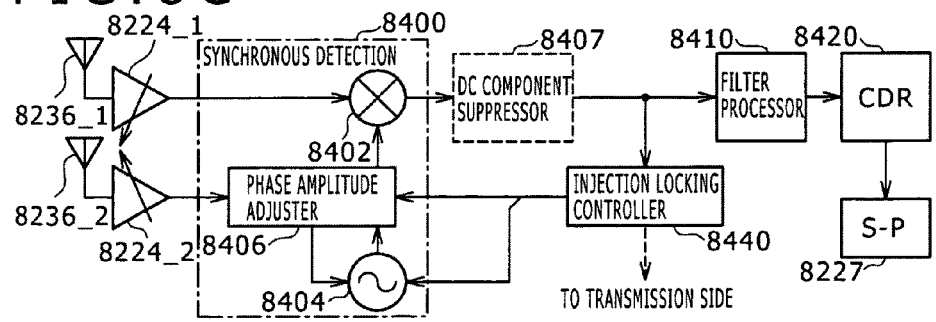
Figure 8D:
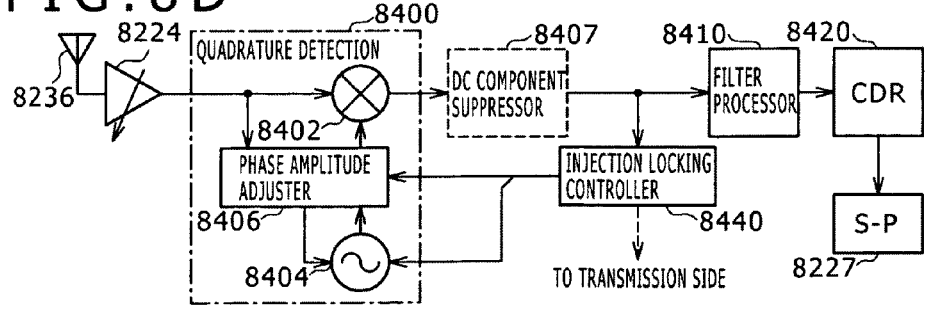
Figure 9:
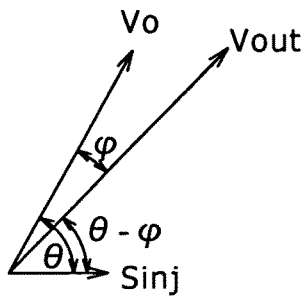
FIG. 9 is a diagrammatic view illustrating a phase relationship of injection locking.

FIGS. 7A to 9 show a basic configuration of the modulation function and the demodulation function in the communication processing channel. In particular, FIGS. 7A to 7D show a basic configuration of a transmission side signal generating unit 8110, which is a communication unit of the transmission side, configured from a modulation functional unit 8300 provided on the transmission side and including modulators 115 and 215 and frequency converters 116 and 216 and peripheral circuits of the modulation functional unit 8300. FIGS. 8A to 8D show an example of a configuration of a reception side signal generating unit 8220 which is a communication unit on the reception side and is configured from a demodulation functional unit 8400 of the basic configuration which is provided on the reception side and including frequency converters 125 and 225 and demodulators 126 and 226 and peripheral circuits of the demodulation functional unit 8400. FIG. 9 illustrates a phase relationship in injection locking.

As a countermeasure against the problems of the comparative example described above, the demodulation functional unit 8400 of the present embodiment adopts an injection locking method.

Where the injection locking method is applied, preferably an appropriate correction process is carried out in advance for a modulation subject signal so that injection locking can be carried out readily on the reception side. Typically, a modulation subject signal is modulated after components of and in the proximity of DC thereof are suppressed. A modulation subject signal after low frequency components in the proximity of DC are suppressed or cut is modulated so that modulation signal components in the proximity of the carrier frequency fc are minimized thereby to facilitate injection locking on the reception side. This signifies that not only DC but also signal components around DC should be suppressed. Where digital processing is applied, DC-free encoding is carried out in order to eliminate such a situation that a DC component is generated by successive appearances of the same code.

Preferably, also a reference carrier signal used as a reference for injection locking on the reception side corresponding to a carrier signal used for modulation is signaled together with a signal modulated in the millimeter waveband, that is, with a modulation signal. The reference carrier signal has a fixed frequency and a fixed phase, and preferably has a fixed amplitude, corresponding to those of the carrier signal outputted from the transmission side local oscillator 8304 and used for the modulation, and typically is the carrier signal itself used for the modulation. However, it is only necessary for the reference carrier signal to be at least kept in synchronism with the carrier signal, and the reference carrier signal is not limited to the signal described above. For example, a signal of a different frequency synchronized with the carrier signal used for the modulation, for example, a higher harmonic signal or a signal which has the same frequency but has a different phase such as, for example, an quadrature carrier signal orthogonal to the carrier signal used for the modulation may be used.

Depending upon the modulation method or the modulation circuit, two cases are available including a case wherein an output signal itself of the modulation circuit includes a carrier signal, for example, as in standard amplitude modulation or ASK and another case wherein the carrier is suppressed, for example, as in amplitude modulation, ASK or PSK of the carrier suppression type. Therefore, the circuit configuration to be adopted for signaling also a reference carrier signal together with a signal modulated in the millimeter waveband from the transmission side depends upon the type of the reference carrier signal, that is, depends upon whether or not the carrier signal itself used for the modulation should be used as a reference carrier signal, and also upon the modulation method or the modulation circuit.

[Modulation Functional Unit]

FIGS. 7A to 7D show a basic configuration of the modulation functional unit 8300 and peripheral circuits. Referring to FIGS. 7A to 7D, a modulation-subject signal processor 8301 is provided on the preceding stage to the modulation functional unit 8300, particularly to the frequency mixer 8302. FIGS. 7A to 7D particularly show different configuration examples matching with the digital type. Referring to FIGS. 7A to 7D, the modulation-subject signal processor 8301 carries out DC-free encoding such as 8-9 conversion encoding (8B/9B encoding), 8-10 conversion encoding (8B/10B encoding) or a scrambling process with respect to the data supplied from the parallel-serial converter 8114 in order to eliminate appearance of a DC component caused by successive appearances of the same code. Though not shown, in analog modulation, bypass filter processing or band-pass filter processing should be applied in advance to the modulation subject signal.

In the 8-10 conversion encoding, 8-bit data is converted into a 10-bit code. For example, from among 1,024 different codes of the 10-bit codes, those codes which include a number of "1s" and a number of "0s" which are equal to each other or as near to each other as possible are adopted as data codes so that they have a DC free characteristic. Some of those 10-bit codes which are not adopted as such data codes is used, for example, as a specific code indicative of an idle state or a packet delimiter. The scrambling process is used, for example, in a wireless LAN (IEEE802.11a).

The basic configuration 1 shown in FIG. 7A includes a reference carrier signal processor 8306 and a signal combining unit 8308.and carries out combination of an output signal of the modulation circuit serving as the first frequency conversion circuit, that is, a modulation signal, and a reference carrier signal. The basic configuration can be regarded as a universal configuration which is not influenced by the type of the reference carrier signal, the modulation method or the modulation circuit. However, depending upon the phase of the reference carrier signal, the combined reference carrier signal is sometimes detected as a DC offset component upon demodulation on the reception side and has an influence on the recovery of the baseband signal. In this instance, a countermeasure for suppressing the DC component is taken on the reception side. In other words, the reference carrier signal should have a phase relationship with which a DC offset component need not be removed upon demodulation.

The reference carrier signal processor 8306 adjusts the phase and the amplitude of a modulation carrier signal supplied thereto from the transmission side local oscillator 8304 as occasion demands and supplies a resulting signal as a reference carrier signal to the signal combining unit 8308. The present basic configuration 1 is adopted, for example, where a method wherein essentially an output signal itself of the frequency mixer 8302 does not include a carrier signal whose frequency and phase are always fixed, that is, a method wherein the frequency and/or the phase are modulated, or where a harmonic signal of the carrier signal used for the modulation or an quadrature carrier signal is used as the reference carrier signal.

In this instance, the harmonic signal of the carrier signal used for the modulation or the quadrature carrier signal can be used as the reference carrier signal and the amplitude and the phase of the modulation signal and the reference carrier signal can be adjusted individually. In other words, although the amplifier 8117 carries out gain adjustment paying attention to the amplitude of the modulation signal and also the amplitude of the reference carrier signal is adjusted thereupon simultaneously, only the amplitude of the reference carrier signal can be adjusted by the reference carrier signal processor 8306 so that a preferable amplitude for injection locking may be obtained.

While the basic configuration 1 includes the signal combining unit 8308 to combine a modulation signal and a reference carrier signal, this is not essential, but a modulation signal and a reference carrier signal may be sent from different antennas 8136_1 and 8136_2 to the reception side preferably through different millimeter wave signal transmission paths 9 so that interference may not occur like a basic configuration 2 shown in FIG. 7B. In the basic configuration 2, a reference carrier signal also whose amplitude is normally fixed can be signaled to the reception side, and the basic configuration 2 can be regarded as an optimum configuration from the point of view of facilitation in injection locking.

The basic configurations 1 and 2 are advantageous in that the amplitude and the phase of a carrier signal used for the modulation, or in other words, a modulation signal to be signaled, and a reference carrier signal can be adjusted individually. Accordingly, they can be regarded suitable to make the phases of a modulation axis on which transmission subject information is to be placed and an axis of a reference carrier signal to be used for injection locking, that is, a reference carrier axis, not the same phase but different phases from each other so that a DC offset may not appear in the demodulation output.

Where an output signal itself of the frequency mixer 8302 can include a carrier signal whose frequency or phase is always fixed, a basic configuration 3 shown in FIG. 7C which does not include any of the reference carrier signal processor 8306 and the signal combining unit 8308 can be adopted. Only it is necessary to signal only a modulation signal modulated in the millimeter waveband by the frequency mixer 8302 to the reception side and handle the carrier signal included in the modulation signal as a reference carrier signal. Thus, there is no necessity to further add a reference carrier signal to an output signal of the frequency mixer 8302 and send a resulting signal to the reception side. For example, in the case of a method which modulates the amplitude such as, for example, the ASK method, this basic configuration 3 can be adopted. At this time, preferably a DC free process is carried out for the reference carrier signal.

However, also in the amplitude modulation or the ASK, the frequency mixer 8302 is formed positively as a circuit of the carrier suppression type such as, for example, a balanced modulation circuit or a double-balanced modulation circuit such that also a reference carrier signal is sent together with an output signal, that is, a modulation signal, of the circuit of the carrier suppression type as in the case of the basic configurations 1 and 2.

It is to be noted that, also in regard to a method which modulates the phase or the frequency, it seems a possible idea to signal only a modulation signal modulated (frequency-converted) into a millimeter waveband signal by the modulation functional unit 8300, which uses, for example, quadrature modulation, as in the case of a basic configuration 4 shown in FIG. 7D. However, whether or not injection locking can be established on the reception side relates also to the injection level, that is, the amplitude level, of the reference carrier signal inputted to the oscillation circuit of the injection locking type, the modulation method, the data rate, the carrier frequency and so forth. Therefore, the possible countermeasure described above is restricted in the application range.

In all of the basic configurations 1 to 4, a mechanism can be adopted which receives information based on a result of injection locking detection on the reception side and adjusts the phase of the modulation carrier frequency or the phase of a millimeter wave, which particularly is used for an injection signal on the reception side such as, for example, a reference carrier signal or a modulation signal, or of the reference carrier signal. It is not essential to carry out transmission of information from the reception side to the transmission side using a millimeter wave, but such transmission may be carried out by an arbitrary method irrespective of wired or wireless transmission.

In all of the basic configurations 1 to 4, the transmission side local oscillator 8304 is controlled to adjust the frequency of the modulation carrier signal and the reference carrier signal.

In the basic configurations 1 and 2, the reference carrier signal processor 8306 or the amplifier 8117 is controlled to adjust the amplitude or the phase of the reference carrier signal. It is to be noted that, while it seems a possible idea to adjust, in the basic configuration 1, the amplitude of the reference carrier signal by means of the amplifier 8117 which adjusts the transmission power, in this instance, there is a difficult point that also the amplitude of the modulation signal is adjusted together.

In the basic configuration 3 suitable for a method which modulates the amplitude such as analog amplitude modulation or digital ASK, either the DC component with respect to the modulation subject signal is adjusted or the modulation degree is controlled to adjust the carrier frequency component in the modulation signal, which corresponds to the amplitude of the reference carrier signal. For example, a case is studied wherein a signal which corresponds to a transmission subject signal to which a DC component is added is modulated. In this instance, where the modulation degree is fixed, the DC component is controlled to adjust the amplitude of the reference carrier signal. On the other hand, where the DC component is fixed, the modulation degree is controlled to adjust the amplitude of the reference carrier signal.

However, in this instance, the signal combining unit 8308 need not be used, but only if only a modulation signal outputted from the frequency mixer 8302 is signaled to the reception side, then it is outputted automatically as a signal in which a modulation signal obtained by modulating a carrier signal with a transmission subject signal and the carrier signal used for the modulation are mixed. The reference carrier signal is placed inevitably on an axis same as the modulation axis on which the transmission subject signal of the modulation signal is placed. In other words, the reference carrier signal is transmitted in phase with the modulation axis. On the reception side, the carrier frequency component in the modulation signal is used as the reference carrier signal for injection locking. Although details are hereinafter described, when viewed on a phase plane, the modulation axis on which the transmission subject information is placed and the axis of the carrier frequency component, that is, a reference carrier signal, to be used for injection locking, have the same phase, and a DC offset arising from the carrier frequency component or reference carrier signal appears in the demodulation output.

[Demodulation Functional Section]

FIGS. 8A to 8D show a basic configuration of the demodulation functional unit 8400 and peripheral circuits. Referring to FIGS. 8A to 8D, the demodulation functional unit 8400 of the present embodiment includes a reception side local oscillator 8404, to which an injection signal is supplied to acquire an output signal corresponding to the carrier signal used for the modulation on the transmission side. Typically, an oscillation output signal synchronized with the carrier signal used on the transmission side is acquired. Then, a received millimeter wave modulation signal and a carrier signal for demodulation, which is a demodulation carrier signal and is hereinafter referred to as recovered carrier signal, based on the output signal of the reception side local oscillator 8404 are multiplied or synchronously detected by the frequency mixer 8402 to acquire a synchronous detection signal. This synchronous detection signal is subjected to removal of high frequency components thereof by the filter processor 8410 to obtain a waveform or a baseband signal of the input signal sent from the transmission side.

Where the frequency mixer 8402 carries out frequency conversion, that is, down conversion or demodulation, through synchronous detection, for example, such advantages can be achieved that a superior bit error characteristic is obtained and that, if the synchronous detection is expanded to quadrature detection, then phase modulation or frequency modulation can be applied.

When a recovered carrier signal based on an output signal of the reception side local oscillator 8404 is to be supplied to and demodulated by the frequency mixer 8402, it is necessary to take phase displacement into consideration, and it is essential to provide a phase adjustment circuit in the synchronous detection system. This is because a received modulation signal and an oscillation output signal to be outputted from the reception side local oscillator 8404 by injection locking have a phase difference therebetween as disclosed, for example, in L. J. Paciorek, "Injection Lock of Oscillators," Proceeding of the IEEE, Vol. 55, No. 11, November 1965, pp. 1723-1728 (hereinafter referred to as Reference Document C).

In the present example, a phase amplitude adjuster 8406 which has not only a function of the phase adjustment circuit but also a function of adjusting the injection amplitude is provided in the demodulation functional unit 8400. The phase adjustment circuit may be provided for any of the injection signal to the reception side local oscillator 8404 and the output signal of the reception side local oscillator 8404 or may be applied to both of them. The reception side local oscillator 8404 and the phase amplitude adjuster 8406 cooperate to configure a carrier signal generating unit on the demodulation side, that is, a second carrier signal generating unit, which generates a demodulation carrier signal synchronized with the modulation carrier signal and supplies the demodulation carrier signal to the frequency mixer 8402.

As indicated by broken lines in FIGS. 8A to 8D, a DC component suppressor 8407 is provided at the succeeding stage to the frequency mixer 8402. The DC component suppressor 8407 removes a DC offset component which may possibly be included in the synchronous detection signal in response to the phase of the reference carrier signal combined into the modulation signal, in particular, when the modulation signal and the phase carrier signal are in an in-phase state.

Here, if, based on the Reference Document C, the free-running oscillation frequency of the reception side local oscillator 8404 is represented by fo (ωo), the center frequency of the injection signal (in the case of the reference carrier signal, the frequency of the same) by fi (ωi), the injection voltage to the reception side local oscillator 8404 by Vi, the free-running oscillation voltage of the reception side local oscillator 8404 by Vo and the Q value, that is, the quality factor, by Q, then where the lock range is indicated by a maximum pull-in frequency range Δfomax, this is defined by the following expression (A):

$$\Delta f_o\text{max} = f_o/(2*Q)*(V_i/V_o)*1/\text{sqrt}(1-(V_i/V_o)^2) \tag{A}$$

From the expression (A), it can be recognized that the Q value has an influence on the lock range, and as the Q value decreases, the lock range expands.

From the expression (A), it can be recognized that, although the reception side local oscillator 8404 which acquires an oscillation output signal by injection locking can be locked or synchronized with a component in the maximum pull-in frequency range Δfomax in the injection signal, it cannot be locked with any other component than the maximum pull-in frequency range Δfomax and has a band-pass effect. For example, where a modulation signal having a frequency band is supplied to the reception side local oscillator 8404 so as to obtain an oscillation output signal from the reception side local oscillator 8404 through injection locking, an oscillation output signal synchronized with an average frequency of the modulation signal, that is, with the frequency of the carrier signal, is obtained while any other component than the maximum pull-in frequency range Δfomax is removed.

Here, when an injection signal is to be supplied to the reception side local oscillator 8404, it seems a possible idea to supply a received millimeter wave signal as an injection signal to the reception side local oscillator 8404 as in the case of the basic configuration 1 described hereinabove with reference to FIG. 8A. In this instance, presence of many frequency components of the modulation signal in the maximum pull-in frequency range Δfomax is not preferable, but it is preferable that fewer frequency components exist. The reason why the representation that it is preferable that fewer frequency components exist is based on the fact that, even if some frequency components exist, if the signal input level or frequency is adjusted, then injection locking is possible. In short, since also frequency components unnecessary for injection locking may possibly be supplied to the reception side local oscillator 8404, it is concerned about that it is difficult to establish injection locking. However, if the transmission side modulates a modulation subject signal after it suppresses low-frequency components of a modulation subject signal in advance by DC free encoding or the like so that no modulation signal component exists in the proximity of the carrier frequency, then the basic configuration 1 may be used.

Further, it seems a possible idea to provide a frequency separator 8401 such that a modulation signal and a reference carrier signal are frequency-separated from a received millimeter wave signal and supply the separated reference carrier signal component as an injection signal to the reception side local oscillator 8404 as in the case of the basic configuration 2 described hereinabove with reference to FIG. 8B. Since the injection signal is supplied after frequency components unnecessary for injection locking are suppressed in advance, injection locking can be established readily.

The basic configuration 3 shown in FIG. 8C corresponds to a configuration where the transmission side adopts the basic configuration 2 shown in FIG. 7B. In the basic configuration 3, a modulation signal and a reference carrier signal are received through different antennas 8236_1 and 8236_2, preferably by different millimeter wave signal transmission paths 9 so that interference may not occur. In the basic configuration 3 of the reception side, a reference carrier signal also whose amplitude is fixed can be supplied to the reception side local oscillator 8404, and therefore, the basic configuration 3 of the reception side is considered as an optimum system from the point of view of facilitation in establishment of injection locking.

The basic configuration 4 shown in FIG. 8D corresponds to a case wherein the transmission side adopts the basic configuration 4 described hereinabove with reference to FIG. 7D where the transmission side is configured so as to modulate the phase or the frequency. Although the basic configuration 4 of the reception side is similar in configuration to the basic configuration 1, the configuration of the demodulation functional unit 8400 actually is a demodulation circuit which is ready for phase modulation or frequency modulation such as an quadrature detection circuit.

A millimeter signal received by the antenna 8236 is supplied to the frequency mixer 8402 and the reception side local oscillator 8404 through a distributor or branching filter not shown. The reception side local oscillator 8404 outputs, since injection locking functions, a recovered carrier signal synchronized with the carrier signal used for the modulation on the transmission side.

Here, whether or not injection locking can be established on the transmission side, that is, whether or not a recovered carrier signal synchronized with the carrier signal used for the modulation on the transmission side can be acquired, depends also upon the injection level, that is, upon the amplitude level of the reference carrier signal to be inputted to the oscillation circuit of the injection locking type, the modulation method, the data rate, the carrier frequency and so forth. Further, it is essential to reduce the number of injection-lockable components in the band from the modulation signal. To this end, the modulation signal is preferably converted into a DC-free code on the transmission side so that the center or average frequency of the modulation signal is substantially equal to the carrier frequency and the center or average phase is substantially equal to zero, that is, to the origin on the phase plane.

For example, P. Edmonson et al., "Injection Locking Techniques for a 1-GHz Digital Receiver Using Acoustic-Wave Devices," IEEE transactions on Ultrasonics, Ferroelectrics, and Frequency Control, Vol. 39, No. 5, September 1992, pp. 631-637 (hereinafter referred to as Reference Document D) discloses an example wherein a modulation signal itself modulated by the BPSK (Binary Phase Shift Keying) method is used as an injection signal. In the BPSK method, an injection signal to the reception side local oscillator 8404 undergoes a phase variation by 180 degrees in response to symbol time T of an input signal. In such a case, to establish injection locking by the reception side local oscillator 8404, where the maximum pull-in frequency range of the reception side local oscillator 8404 is represented by Δfomax, it is necessary for the symbol time T to satisfy T<1/(2Δfomax), for example. Although this signifies that the symbol time T must be set short with a margin, that it is better for the symbol time T to be short in this manner signifies that it is better to raise the date rate, and this is convenient to an application which is directed to high speed data transfer.

Meanwhile, Tarar M. A.; Zhizhang Chen, "A Direct Down-Conversion Receiver for Coherent Extraction of Digital Baseband Signals Using the Injection Locked Oscillators," Radio and Wireless Symposium, 2008 IEEE, Volume, Issue, 22-24, January 2008, pp. 57-60 (hereinafter referred to as Reference Document E) discloses an example wherein a modulation signal itself modulated by the 8PSK (8-Phase Shift Keying) method is used as an injection signal. Also in the Reference Document E, it is described that, if the conditions of the injection voltage and the carrier frequency are same, then a higher data rate facilitates injection locking. This likewise is convenient to an application directed to high speed data transfer.

In any of the basic configurations 1 to 4, the lock range can be controlled by controlling the injection voltage Vi or the free-running oscillation frequency fo based on the expression (A). In other words, it is essential to adjust the injection voltage Vi or the free-running oscillation frequency fo so that injection locking can be established. For example, an injection locking controller 8440 is provided at the succeeding stage to the frequency mixer 8402, in the example shown in FIGS. 8A to 8D, at the succeeding stage to the DC component suppressor 8407, such that the state of injection locking is decided based on a synchronous detection signal, which is a baseband signal, acquired by the frequency mixer 8402 and a component of the subject of adjustment is controlled based on a result of the decision so that injection locking can be established.

Thereupon, one or both of techniques including a technique of coping with the control on the reception side and a technique of coping with the control on the transmission side by supplying information necessary for the control, which includes not only the control information but also detection signals from which the control information is derived and so forth, to the transmission side. The technique of coping with the control on the reception side has a difficult point in terms of the power consumption and the interference resisting property because, if a millimeter signal, particularly a reference carrier signal component thereof, is not transmitted with a certain degree of strength, then injection locking cannot be established on the reception side. However, the technique is advantageous in that only the reception side can cope with the control.

In contrast, although the technique of coping with the control on the transmission side requires transmission of information from the reception side to the transmission side, it has such advantages that a millimeter wave signal can be transmitted with the lowest power with which injection locking can be established on the reception side and the power consumption can be reduced and that the interference resisting property is improved.

Where the injection locking method is applied to signal transmission within a housing or to signal transmission between different apparatus, the following advantages can be achieved. For the transmission side local oscillator 8304, the required specification for the stability of the frequency of a carrier signal to be used for modulation can be moderated. As apparent from the expression (A) given hereinabove, it is necessary for the reception side local oscillator 8404 on the side on which injection locking is carried out to have such a low Q value that the reception side local oscillator 8404 can follow up a frequency variation on the transmission side.

This is convenient where the entire reception side local oscillator 8404 including a tank circuit which has an inductance component and a capacitance component is formed on a CMOS device. While the reception side local oscillator 8404 on the reception side may have a low Q value, this similarly applies also to the transmission side local oscillator 8304 on the transmission side. In particular, the transmission side local oscillator 8304 may have low frequency stability and a low Q value.

It is estimated that refinement of CMOS devices further advances in the future and the operation frequency of them further increases. In order to implement a small-sized transmission system in a higher frequency band, it is demanded to use a high carrier frequency. Since the injection locking method of the present example can moderate required specifications for the oscillation frequency stability, a carrier signal of a higher frequency can be used readily.

That the frequency stability may be low, or in other words, that the Q value may be low although the frequency is high, signifies that, in order to implement a carrier signal whose frequency is high and also whose stability is high, it is not necessary to use a frequency multiplication circuit of high stability, a PLL circuit for carrier synchronization or a like circuit. Thus, even if the frequency is higher, a communication function can be implemented simply and readily with a small circuit scale.

Since the reception side local oscillator 8404 acquires a recovered carrier signal synchronized with the carrier signal used on the transmission side and supplies the recovered carrier signal to the frequency mixer 8402 to carry out synchronous detection, a band-pass filter for wavelength selection need not be provided at the preceding stage to the frequency mixer 8402. The selection operation of a reception frequency is in fact to carry out control to cause the local oscillation circuits for transmission and reception to be fully synchronized with each other, that is, to make it possible to establish injection locking. Therefore, selection of a reception frequency is easy. Where a millimeter waveband signal is used, also the time required for injection locking may be shorter than that where a lower frequency is used. Thus, a selection operation of a reception frequency can be completed in short time.

Since the local oscillation circuits for transmission and reception are fully synchronized with each other, a variation component of the carrier frequency on the transmission side is cancelled, and consequently, various modulation methods such as phase modulation can be applied readily. For example, in digital modulation, phase modulation such as QPSK (Quadrature Phase Shift Keying) modulation and 16QAM (Quadrature Amplitude Modulation) modulation is known widely. The phase modulation methods involve quadrature modulation between a baseband signal and a carrier. In the quadrature modulation, input data are converted into baseband signals of the I phase and the Q phase, to which quadrature modulation is applied. In particular, carrier signals on the I axis and the Q axis are modulated individually with an I phase signal and a Q phase signal, respectively. Injection locking can be applied not only to such 8PSK modulation as disclosed in the Reference Document E but also to such quadrature modulation methods as QPSK or 16QAM, and a modulation signal can be converted into quadrature signals to raise the data transmission rate.

If the injection locking is applied, then where synchronous detection is used together, the influence of the problem of interference is less likely to be had even where a plurality of transmission and reception pairs carry out independent transmission at the same time as in a case wherein multi-channel transmission or full duplex bidirectional transmission is to be carried out even if a band-pass filter for wavelength selection is not used on the reception side.

[Relationship Between Injection Signal and Oscillation Output Signal]

FIG. 9 illustrates a phase relationship of signals in injection locking. In particular, FIG. 9 illustrates a basic phase relationship where an injection signal (here a reference carrier signal) is in phase with a carrier signal used for the modulation.

The reception side local oscillator 8404 can operate in two modes including an injection locking mode and an amplifier mode. Where the injection locking method is adopted, the injection locking mode is adopted as a basic operation mode, but in a special case, the amplifier mode is used. The special case is a case wherein, where a reference carrier signal is used as the injection signal, the carrier signal used for the modulation and the reference carrier signal have different phases from each other (typically have phases quadrature to each other).

When the reception side local oscillator 8404 operates in the injection locking mode while it is in a free-running state and is outputting a free-running oscillation output signal Vo, a received reference carrier signal Sinj and an oscillation output signal Vout outputted from the reception side local oscillator 8404 by injection locking have a phase difference therebetween. In order for the frequency mixer 8402 to orthogonally detect the reference carrier signal Sinj, it is necessary to correct the phase difference. As can be seen from FIG. 9, the phase shift amount by which the phase amplitude adjuster 8406 carries out phase adjustment so that the oscillation output signal Vout of the reception side local oscillator 8404 may be brought into an in-phase state with a modulation signal SI is "θ−φ" as seen from FIG. 9.

In other words, the phase amplitude adjuster 8406 should carry out phase shifting so that the phase difference "θ−φ" between the phase of the oscillation output signal Vout of the reception side local oscillator 8404 when the reception side local oscillator 8404 operates in the injection locking mode and the phase of the oscillation output signal Vout when the reference carrier signal Sinj is used for injection locking of the reception side local oscillator 8404 may be canceled. Incidentally, the phase difference between the reference carrier signal Sinj to the reception side local oscillator 8404 and the free-running oscillation output signal Vo of the reception side local oscillator 8404 is θ, and the phase difference between the oscillation output signal Vout of the reception side local oscillator 8404 and the free-running oscillation output signal Vo of the reception side local oscillator 8404 when injection locking is applied is Φ.

<Relationship Between Multi-Channel Transmission and Injection Locking>

Figure 10A:
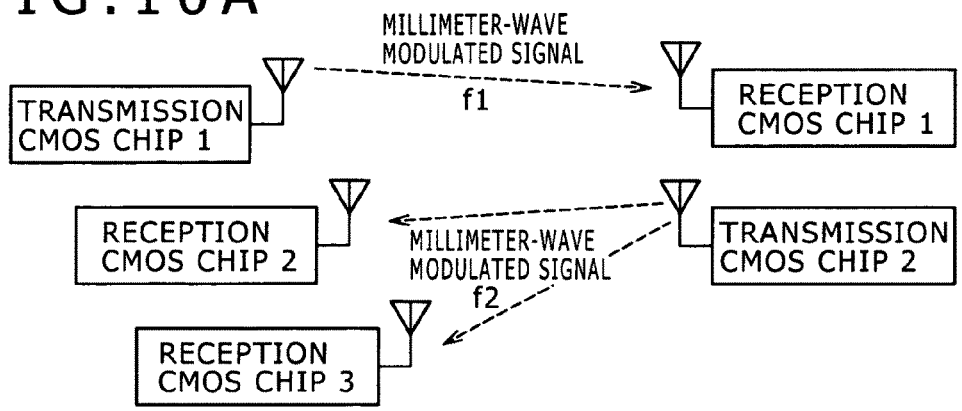
FIGS. 10A to 10D are diagrammatic views illustrating a relationship between multi-channeling and injection locking.

FIGS. 10A to 10D illustrate a relationship between multi-channel transmission and injection locking. As one of techniques for achieving multi-channel transmission, it seems a possible idea to apply space division multiplexing as described hereinabove with reference to FIGS. 3A to 5. However, also it seems a possible idea, as shown in FIG. 10A, to use different carrier frequencies between communication transmission and reception pairs. That is, multi-channel transmission can be implemented by a frequency division multiplexing.

Also full duplex bidirectional transmission can be implemented readily if different carrier frequencies are used, and also it is possible to implement a situation in which a plurality of semiconductor chips (such as a set of the transmission-side signal generating unit 110 and the reception-side signal generating unit 220 and a set of the transmission side signal generation unit 210 and the reception-side signal generating unit 120) communicate independently with each other within a housing of an electronic apparatus.

[Basic Configuration and Problems]

Figure 10B:
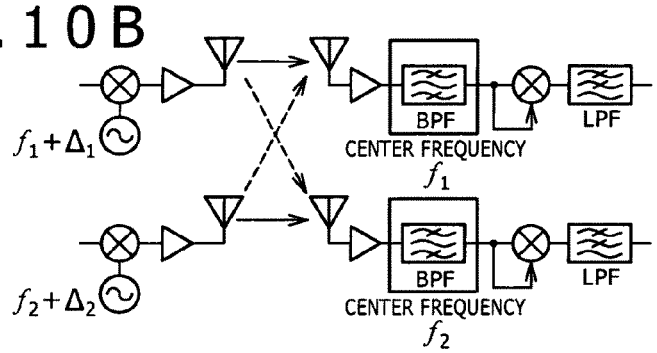
Figure 10C:
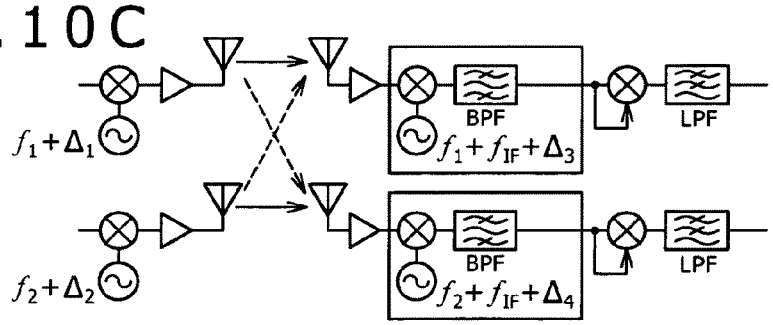
Figure 10D:
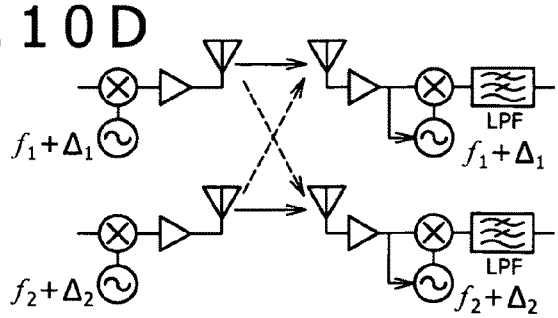

Here, it is assumed that two transmission and reception pairs are communicating simultaneously with and independently of each other as seen in FIGS. 10B to 10D. In FIGS. 10B to 10D, Δ1, Δ2, Δ3 and Δ4 denote frequency components which fluctuate in time.

Here, if a square detection method is applied as seen in FIG. 10B, a band-pass filter (BPF) of the RF band for the frequency selection on the reception side is required in order to achieve multi-channel transmission in the frequency multiplexing method as described hereinabove. However, it is not easy to implement a steep band-pass filter in a small size, and a variable band-pass filter is required in order to change the selected frequency. Since the square detection method can extract only amplitude information, the applicable modulation method is restricted to ASK, OOK and so forth, and also it is difficult to render a modulation signal to be in quadrature to raise the data transmission rate.

Where a PLL for carrier synchronization is not provided on the reception side for miniaturization, for example, it seems a possible idea to apply down conversion into an intermediate frequency (IF) to carry out square detection as seen in FIG. 10C. In this instance, a signal to be received can be selected without a band-pass filter of the RF band by additionally providing a block for the frequency conversion into a sufficiently high intermediate frequency. However, this requires a circuit for the frequency conversion into the IF band, a band-pass filter for the IF band and so forth, and the circuitry is completed by those circuits. Not only the frequency variation component $\Delta$ on the transmission side but also a frequency component (a frequency variation component $\Delta$) which varies in time in the down conversion on the reception side, has an influence. Therefore, only a modulation method which extracts amplitude information (such as, for example, ASK or OOK) can be applied so that the influence of the frequency variation component $\Delta$ can be ignored.

In contrast, if the injection locking method is applied as seen in FIG. 10D, then since the transmission side local oscillator 8304 and the reception side local oscillator 8404 are synchronized fully with each other, various modulation methods can be implemented readily. Also a PLL for carrier synchronization is unnecessary and the circuit scale may be small, and also selection of a reception frequency is facilitated. In addition, since an oscillation circuit for a millimeter waveband can be implemented using a tank circuit having a time constant lower than that where a lower frequency is applied, also the time required for injection locking can be made shorter than that where a lower frequency is applied. Thus, the oscillation circuit for a millimeter waveband can be suited to a high transmission. In this manner, by applying the injection locking method, the transmission speed can be raised readily and the number of input/output terminals can be reduced in comparison with those of ordinary signal transmission between chips by a baseband signal. Also it is possible to configure a small antenna for a millimeter wave on a chip, and furthermore, it is possible to provide a very high degree of freedom to the method of extraction of a signal from a chip. Furthermore, since the frequency variation component on the transmission side is canceled by injection locking, various modulation methods such as phase modulation (such as, for example, quadrature modulation) can be applied.

Also where multi-channel transmission by frequency division multiplexing is implemented, if the reception side recovers a signal synchronized with a carrier signal used for the modulation on the transmission side and carries out frequency conversion by synchronous detection, then even if the carrier signal suffers from a frequency variation $\Delta$, the transmission signal can be recovered without being influenced by the frequency variation (that is, by interference). As seen from FIG. 10D, a band-pass filter as a frequency selection filter does not have to be placed at the preceding stage to the frequency conversion circuits (down converters).

When the injection locking method is adopted to achieve such multi-channel transmission, if no countermeasure is taken, then the reception side must prepare an injection locking circuit for each of the channels.

It is to be noted that such a situation that, where the reception side includes a plurality of channels, an injection locking circuit must be prepared for each of the channels occurs not only upon multi-channeling but also upon broadcast communication or the like in which simultaneous communication is carried out between one channel on the transmission side and the plural channels on the reception side.

Therefore, in the wireless transmission system 1 of the present embodiment, it is taken into consideration that, where the reception side includes a plurality of channels preferably where the injection locking method is adopted, the channel should have no trouble even if an injection locking circuit is not prepared for each channel.

As a basic approach, in order to achieve reduction of the number of injection locking circuits on the reception side, not all of the channels adopt the injection locking method but at least one channel does not adopt the injection locking method. In each channel which does not adopt the injection locking method, carrier signals generated by the local oscillators 8304 and 8404 and synchronized with the carrier signal are used to carry out modulation and demodulation. Although, in space division multiplexing, a carrier signal of the same frequency can be used in all channels, in frequency division multiplexing, carrier signals of different frequencies must be used for different channels. Therefore, another carrier signal of a different frequency synchronized with the carrier signal generated by the local oscillator 8304 or 8404 is generated and used for synchronous detection. Naturally, also in space division multiplexing, it is not excluded to use a carrier signal of a different frequency as in the case of frequency division multiplexing. In the following, details are described.

<Wireless Transmission System: First Embodiment>

Figure 11:
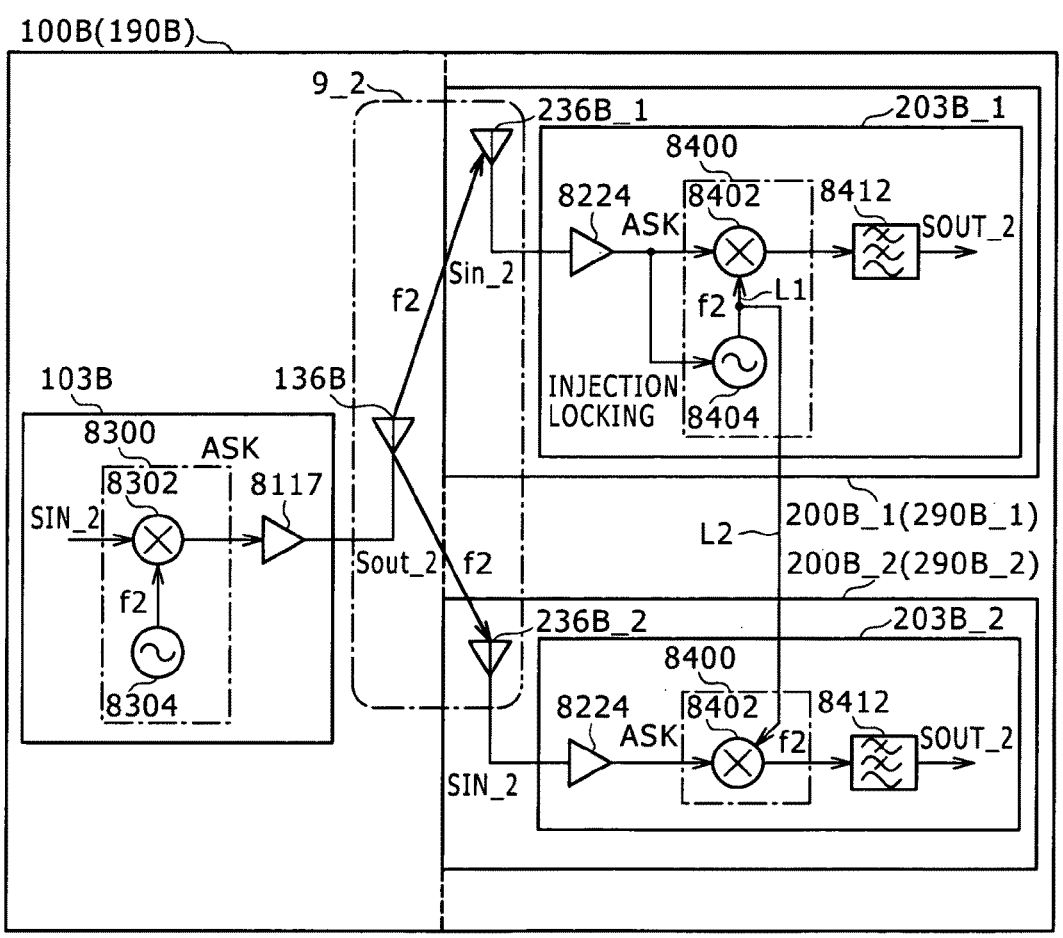
FIG. 11 is a diagram showing a wireless transmission system according to a first embodiment.

FIG. 11 shows a wireless transmission system of a first embodiment.

In the wireless transmission system 1B of the first embodiment, where the reception side uses a plurality of channels, injection locking is applied to one of the channels and, in the other channels, a carrier signal synchronized with that of the channel to which the injection locking is applied is used to carry out demodulation by synchronous detection. It is to be noted that, in space division multiplexing, in an extreme case, the synchronized carrier signal may have the same frequency. The first embodiment is different from a second embodiment hereinafter described in an example of an application to broadcast communication where the transmission side uses one channel and the reception side uses a plurality of channels. In the first embodiment, any modulation method may be applied similarly as in the second embodiment. In the following description, it is assumed that the ASK method is applied.

The wireless transmission system 1B of the first embodiment has a system configuration wherein the injection locking method described above is applied to carry out signal transmission using the millimeter waveband among three semiconductor chips 103B, 203B_1 and 203B_2 formed by a CMOS process within a housing of one electronic apparatus or between a plurality of electronic apparatus. To put it plainly, two special communication pairs wherein the transmission side includes one communication unit and the reception side includes two communication units are formed in a set such that 1:2 signal transmission is carried out.

Typically, the first communication pair is formed from the semiconductor chip 103B on the transmission side and the semiconductor chip 203B_1 on the reception side, and the second communication pair is formed from the same semiconductor chip 103B on the transmission side and the different semiconductor chip 203B_2 on the reception side. Thus, broadcast or simultaneous communication is carried out from the single semiconductor chip 103B on the transmission side to the two semiconductor chips 203B_1 and 203B_2 on the reception side. While the reception side in the wireless transmission system 1B shown in FIG. 11 includes two semiconductor chips, it may otherwise include three or more semiconductor chips. It is to be noted that the carrier frequency f2 to be used is included in the millimeter wave of 30 GHz to 300 GHz.

In the case of signal transmission within one housing, it may be considered that the semiconductor chip 103B and the semiconductor chips 203B_1 and 203B_2 are mounted on the same board. Or it may be considered otherwise that a housing 190B on the first communication device 100B side and housings 290B_1 and 290B_2 on the second communication devices 200B_1 and 200B_2 side are formed commonly as a single housing. On the other hand, in the case of signal transmission between an electronic apparatus which includes the first communication device 100B and another electronic apparatus which includes the two second communication devices 200B_1 and 200B_2, it may be considered that the housing 190B on the first communication device 100B side and the housings 290B_1 and 290B_2 on the second communication devices 200B_1 and 200B_2 side are mounted or installed at positions individually indicated by broken lines in FIG. 11. In the following, where components on the reception side are referred to collectively, the suffixes _1 and _2 are omitted as occasion demands.

The housing 190B or 290B may be a case of armoring or an appearance, for example, of a digital recording and reproduction apparatus, a ground wave television receiver, a camera, a hard disk apparatus, a game machine, a computer or a wireless communication apparatus.

For example, in the wireless transmission system 1B, in order to transmit a signal for which high speed and large amount data transmission is demanded such as a movie image signal or a computer image signal, the signal is converted into a transmission signal Sout_2 whose carrier frequency f2 belongs to the millimeter waveband of 30 GHz to 300 GHz and transmitted as such along a millimeter wave signal transmission path 9_2.

The millimeter wave signal transmission path 9_2 is formed from a free space in the housings 190B and 290B, a dielectric transmission path constructed in such free space, a waveguide pipe and/or a waveguide. The waveguide includes a slot line and/or a microstrip line. The millimeter wave signal transmission path 9_2 may be any transmission path which can transmit the transmission signal Sout_2 of a millimeter wave therealong. Also the dielectric substance itself such as a resin member filled in the inside of the housings 190B and 290B configures the millimeter wave signal transmission path 9_2.

Since a millimeter wave can be blocked readily and is less likely to leak to the outside, it allows use of a carrier signal of the carrier frequency f2 whose stability is low. This leads also to increase of the degree of freedom in design of propagation channels between the semiconductor chips 103B and 203B_1 or between the semiconductor chips 103B and 203B_2. For example, by designing a sealing member structure or package structure for sealing the semiconductor chips 103B and 203B and the propagation channels together using a dielectric material, good signal transmission of higher reliability can be achieved in comparison with millimeter wave signal transmission in a free space.

For example, the inside of the housings 190B and 290B may be formed as a free space to configure a free space transmission path between the antennas 136B and 236B, or the inside may entirely be filled with a dielectric material such as a resin material. In those cases, preferably the housings 190B and 290B are each formed like a case whose inner side is coated with a resin member in addition to a shield case surrounded on outer six faces thereof with metal plates so that the transmission signal Sout_2 in the millimeter waveband may not leak to the outside. The housings 190B and 290B may otherwise be formed like a case whose inner side is coated with a metal member in addition to a case surrounded on outer six faces thereof with resin members. In any case, there is a tendency that, where the injection locking method is applied, the transmission amplitude is increased in comparison with that where the injection locking method is not applied, and therefore, a shield countermeasure should be taken taking such tendency into consideration.

Preferably, the inside of the housings 190B and 290B is formed as a free space while a dielectric transmission path, a hollow waveguide or a waveguide structure is applied between the antennas 136B and 236B_1 or between the antennas 136B and 236B_2 to form a millimeter wave confining structure or waveguide structure for allowing a millimeter wave to be transmitted therealong while confining the millimeter wave signal to the inside of the transmission path. Where the millimeter wave confining structure is used, a signal in the millimeter waveband can be transmitted with certainty between the antennas 136B and 236B_1 or between the antennas 136B and 236B_2 without being influenced by reflection by the housings 190B and 290B. In addition, a signal in the millimeter waveband (transmission signal Sout_2) outputted from the antenna 136B can be transmitted to the antenna 236B side while confining the millimeter wave signal to the millimeter wave signal transmission path 9_2. Therefore, wasteful transmission can be reduced or eliminated, and consequently, transmission power can be suppressed. Since, also where the injection locking method is applied, the transmission power can be reduced significantly, electromagnetic interference (EMI) is not provided to the outside. Therefore, the metal shield structure may be omitted from the housings 190B and 290B.

The antennas 136B and 236B for a millimeter wave can be configured on the semiconductor chips 103B and 203B of a very small size, respectively, because the wavelength is short. Since the antennas 136B and 236B can be formed in a reduced size, they can be provided with a very high degree of freedom in the manner of radiation of the transmission signal Sout_2 from the antennas 136B and the manner of extraction of a reception signal Sin_2 from the antennas 236B.

It is assumed that the transmission side local oscillator 8304 and the reception side local oscillator 8404 including a tank circuit as described above are entirely formed on the same one of the semiconductor chip 103B on the transmission side and one of the semiconductor chips 203B on the reception side without using a tank circuit provided to the outside as in the related art.

For example, the semiconductor chip 103B includes a modulation functional unit 8300, which in turn includes a frequency mixer 8302 and a transmission side local oscillator 8304, and an amplifier 8117. The amplifier 8117 is connected to an antenna 136B which forms part of the transmission path coupler 108. The semiconductor chip 103B on the transmission side modulates a carrier signal of the carrier frequency f2 generated in the transmission side local oscillator 8304 by the ASK method based on the transmission-subject signal SIN_2 to frequency-convert the reception signal Sin_2 into a transmission signal Sout_2 of a millimeter wave. The transmission signal Sout_2 is supplied to the millimeter wave signal transmission path 9_2 through the antenna 136B and arrives at the two antennas 263B_1 and 236B_2 on the reception side.

Only one of the plural semiconductor chips 203B on the reception side, in FIG. 11, only the semiconductor chip 203B_1, has a configuration ready for injection locking. However, all of the remaining semiconductor chips, in FIG. 11, the semiconductor chip 203B_2, is not ready for injection locking. All of the remaining conductor chips, that is, the semiconductor chip 203B_2, receives a recovered carrier signal from the one semiconductor chip 203B_1 ready for injection locking and carries out synchronous detection based on the recovered carrier signal.

In particular, the semiconductor chip 203B_1 includes an amplifier 8224, a demodulation functional unit 8400, which in turn includes a frequency mixer 8402 and a reception side local oscillator 8404, and a low-pass filter 8412, and the amplifier 8224 is connected to the antenna 236B_1 which forms part of the transmission path coupler 208. The semiconductor chip 2038_1 uses a millimeter wave signal, which is the transmission signal Sout_2=reception signal Sin_2, sent thereto from the semiconductor chip 103B of the transmission side as an injection signal into the reception side local oscillator 8404, and the reception side local oscillator 8404 acquires a recovered carrier signal based on the injection locking. The frequency mixer 8402 uses the recovered carrier signal to demodulate the reception signal Sin_2. The demodulated signal is passed through the low-pass filter 8412 to recover a transmission-subject signal SOUT_2 which corresponds to the transmission-subject signal SIN_2. In short, the semiconductor chips 103B and 203B_1 carry out signal transmission in the millimeter waveband through the millimeter wave signal transmission path 9_2 between the antennas 136B and 236B_1.

On the other hand, the semiconductor chip 203B_2 receives the recovered carrier signal recovered by the injection locking method on the semiconductor chip 203B_1, and the frequency mixer 8402 demodulates the reception signal Sin_2 using the recovered carrier signal. The demodulated signal is passed through the low-pass filter 8412 to recover the transmission-subject signal SOUT_2 corresponding to the transmission-subject signal SIN_2.

Since the semiconductor chip 103B in the housing 190B and the semiconductor chips 203B in the housings 290B have specified, typically fixed, arrangement positions, a positional relationship of the semiconductor chip 103B and the semiconductor chips 203B and an environmental condition of the transmission channels between them such as, for example, a reflection condition, can be specified in advance. Therefore, it is easy to design the transmission channels between the transmission side and the reception side. Further, if a sealing structure for sealing the transmission side and the reception side and the propagation channel are designed together using a dielectric material, then good transmission of higher reliability than that of free space transmission can be achieved.

The environment of a propagation channel does not vary frequently, and also the control by an injection locking controller 8440 for allowing injection locking does not need to be carried out so dynamically, adaptively and frequently as in the case of ordinary wireless communication. Therefore, the overhead by the control can be reduced in comparison with that in ordinary wireless communication. This contributes to implementation of the wireless transmission system 1B, which carries out high speed and large amount data signal transmission in a small size and with low power consumption.

Further, if, upon production or designing, a wireless transmission environment is calibrated and a dispersion of individual pieces is grasped, then the injection locking controller 8440 can refer to the data to carry out various kinds of setting so that injection locking can be carried out. Decision of an injection locking state and repetition of variation of various set values in accordance with a result of the decision can be eliminated, and various kinds of setting for making it possible to carry out injection locking are simplified.

In the example of the system configuration of the first embodiment wherein the transmission side includes one channel and the reception side includes a plurality of channels, broadcast communication is implemented by the millimeter wave signal transmission path 9_2 which configures 1:2 transmission channels between the semiconductor chip 103B on the transmission side and the semiconductor chips 203B_1 and 203B_2 on the reception side. Thereupon, if synchronism can be established in one of the channels, then synchronism can be established in all channels. Therefore, by carrying out synchronous detection in all of the channels based on the recovered carrier signal acquired by the injection locking, a reception signal can be demodulated. On the reception side, only one channel must be ready for injection locking, and an injection locking circuit need not be prepared for each channel. Therefore, there is an advantage that the system configuration can be made compact.

It is to be noted that, since a recovered carrier signal is passed to a different chip, in the example of FIG. 11, to the semiconductor chip 203B_2 side, depending upon the length of a wiring line L2 to the semiconductor chip 203B_2, an influence of phase delay is concerned. Therefore, it is preferable to take a countermeasure by minimizing the line length of the wiring line L2 or by making the line lengths of the wiring lines L1 and L2 between the reception side local oscillator 8404 for injection locking and the frequency mixers 8402 of the chips equal to each other. Further, where phase delay matters, it seems a possible idea to additionally provide a mechanism for carrying out phase adjustment. Those points apply similarly also to the other embodiments hereinafter described.

<Wireless Transmission System: Second Embodiment>

Figure 12:
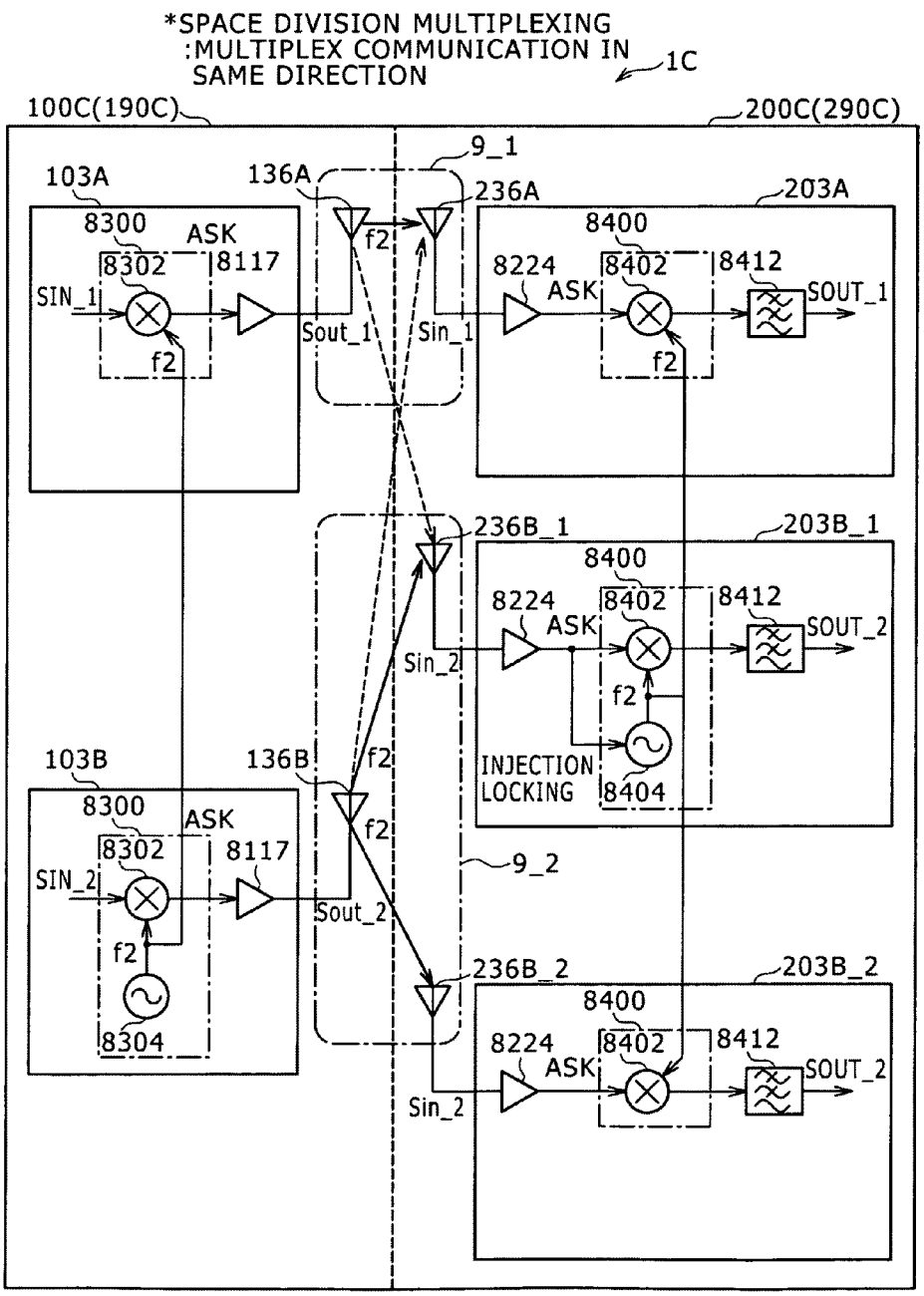
FIG. 12 is a diagram showing a wireless transmission system according to a second embodiment.

FIG. 12 shows a wireless transmission system according to a second embodiment. In the wireless transmission system 1C of the second embodiment, where both of the transmission side and the reception side include a plurality of channels, injection locking is carried out in one channel, and, on both of the transmission side and the reception side, the remaining channels carry out modulation and demodulation using the carrier signals synchronized with the carrier signal generated by the local oscillators 8304 and 8404. Particularly, the second embodiment is different from the first embodiment in an example of application of multi-channeling wherein also the transmission side includes a plurality of channels. Meanwhile, the second embodiment is different from a third embodiment in multi-channeling by application not of frequency division multiplexing but of space division multiplexing. In the second embodiment, any modulation method may be applied similarly as in the first embodiment. In the following description, it is assumed that the ASK method is applied.

In particular, the wireless transmission system 1C of the second embodiment is configured such that N (N is a positive integer equal to or greater than 2) transmitters are arranged on the transmission side and M (M is a positive integer equal to or greater than 2) receivers are arranged on the reception side and the same carrier frequencies are used in the transmitters and the receivers. In order to carry out multiplex transmission using the same frequency, the space division multiplexing described hereinabove with reference to FIGS. 3A to 5 is applied. In FIG. 12, a set wherein 1:1 signal transmission is carried out between the semiconductor chip 103A and the semiconductor chip 203A and another set wherein 1:2 signal transmission is carried out between the semiconductor chip 103B and the semiconductor chips 203B_1 and 203B_2, which corresponds to the configuration of the first embodiment, are included.

In the case of signal transmission within one housing, it should be considered that the semiconductor chips 103A and 103B and the semiconductor chips 203A, 203B_1 and 203B_2 are mounted on the same board. However, in the case of signal transmission between different apparatus, for example, an electronic apparatus which includes the second communication device 200C in which the semiconductor chips 203A, 203B_1 and 203B_2 are accommodated is placed on an electronic apparatus which includes the first communication device 100C in which the semiconductor chips 103A and 103B are accommodated such that the housing 190C on the first communication device 100C side and the housing 290C on the second communication device 200C side are mounted or placed at positions individually indicated by broken lines in FIG. 12.

Among the antennas for transmission and reception, those of the set wherein 1:1 signal transmission is carried out form a millimeter wave signal transmission path 9_1 of the first communication channel while those of the set wherein 1:2 signal transmission is carried out and which adopts the configuration of the first embodiment form a millimeter wave signal transmission path 9_2 of the second communication channel. Since space division multiplexing is applied, the inter-antenna distance between the antennas of the different sets is assured to such a degree with which the signal interference level between the millimeter wave signal transmission paths 9_1 and 9_2 remains within a permissible range as described with reference to FIGS. 4A to 4C.

Between the semiconductor chips 103A and 203A, the carrier frequency f2 is used to carry out signal transmission in the millimeter waveband through the millimeter wave signal transmission path 9_1. At the portion at which the configuration of the first embodiment is adopted, the carrier frequency f2 is used to carry out broadcast communication with the millimeter waveband through the millimeter wave signal transmission path 9_2 between the semiconductor chip 103B and the semiconductor chips 203B_1 and 203B_2. In short, in the present second embodiment, a 1:1 transmission system and a 1:2 transmission system exist together. In this instance, by setting the same carrier frequency f2 in the communication channels and applying space division multiplexing, signal transmission by the transmission systems is implemented without being influenced by interference.

Here, since the carrier signal of the same carrier frequency f2 is used by both sets, from among the plural semiconductor chips 103 on the transmission side, only one, in FIG. 12, only the semiconductor chip 103B, has a configuration ready for generation of a carrier signal while all of the remaining semiconductor chips, in FIG. 12, the semiconductor chip 103A, is not ready for generation of a carrier signal. All of the remaining semiconductor chips, in FIG. 12, the semiconductor chip 103A, receives a carrier signal from the semiconductor chip 103B which is ready for generation of a carrier signal and carries out frequency conversion, that is, up conversion, based on the received carrier signal.

Only one of the plural semiconductor chips 203 on the reception side, in the figure, only the semiconductor chip 203B_1, has a configuration ready for injection locking. However, all of the remaining semiconductor chips, in the figure, the semiconductor chips 203A and 203B_2, are not ready for injection locking. All of the remaining conductor chips, that is, the semiconductor chips 203A and 203B_2, receive a recovered carrier signal from the one semiconductor chip 203B_1 ready for injection locking and carries out synchronous detection based on the recovered carrier signal.

In the second embodiment, where both of the transmission side and the reception side have a system configuration which includes a plurality of channels, only one channel on the reception side may be ready for injection locking similarly as in the first embodiment. Consequently, the second embodiment is advantageous in that an injection locking circuit need not be prepared for each channel and the system configuration can be made compact. Since the different sets use the same frequency, also on the transmission side, only one channel may be ready for generation of a carrier signal. Consequently, there is an advantage that the transmission side local oscillator 8304 need not be prepared for each channel and the system configuration can be made compact.

<Wireless Transmission System: Third Embodiment>

FIGS. 13 to 15B show wireless transmission systems according to a third embodiment. In the wireless transmission system 1D of the third embodiment, where both of the transmission side and the reception side include a plurality of channels, injection locking is carried out in one channel, and, on both of the transmission side and the reception side, the remaining channels carry out modulation and demodulation using the carrier signals synchronized with the carrier signal generated by the local oscillators 8304 and 8404. Particularly, the third embodiment is different from the second embodiment in multi-channeling by application not of space division multiplexing but of frequency division multiplexing. In the third embodiment, any modulation method may be applied similarly as in the first embodiment. In the following description, it is assumed that the ASK method is applied.

Figure 13:
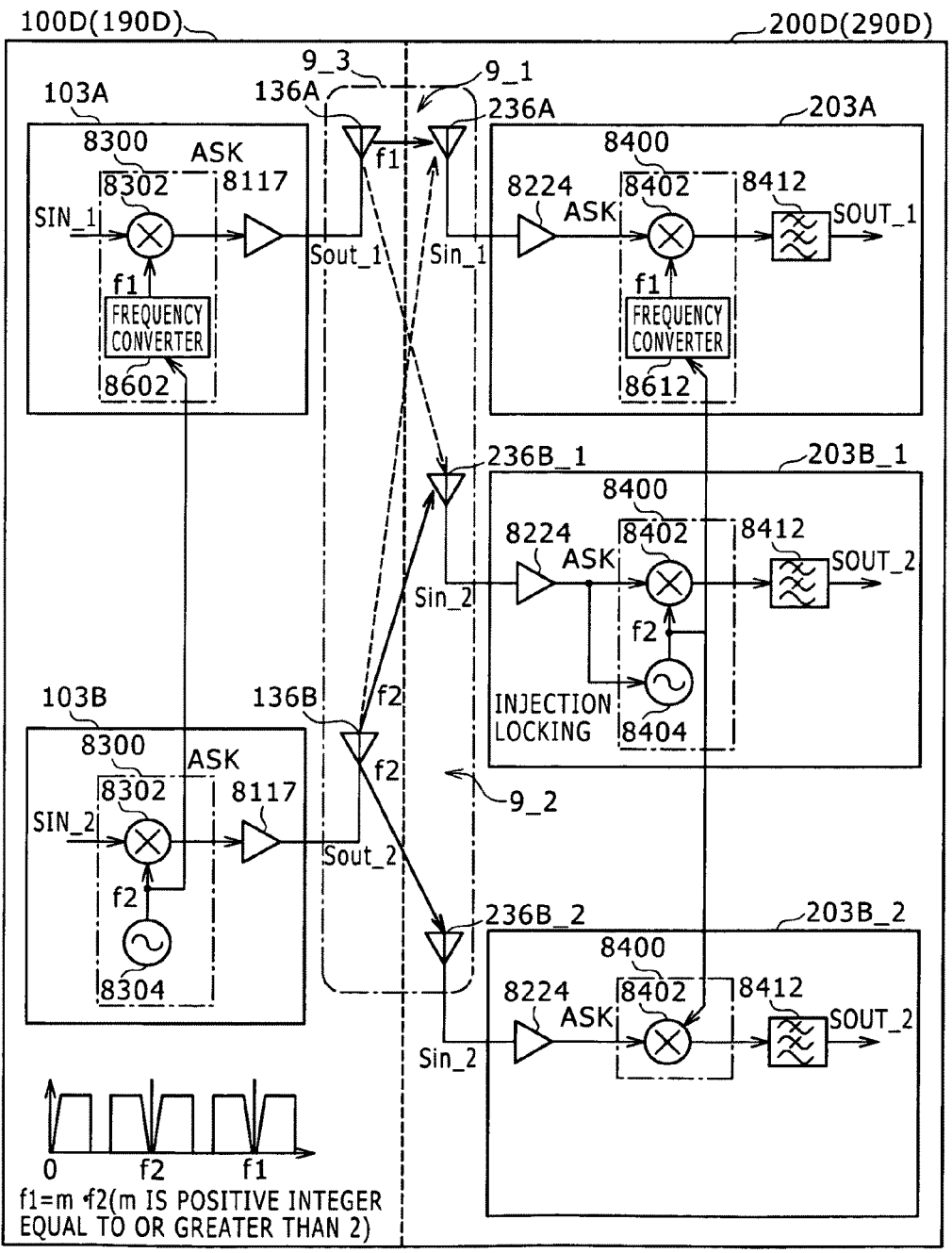
FIG. 13 is a diagram showing a wireless transmission system according to a first example of a third embodiment.

Incidentally, in a first example shown in FIG. 13, both of the transmission side and the reception side use antennas (and amplifiers) for individual channels and the carrier frequency f1 has a relationship of an integral number of times the carrier frequency f2. In a second example shown in FIG. 14, both of the transmission side and the reception side use antennas (and amplifiers) for individual channels and the carrier frequency f1 has a relationship other than the relationship of an integral number of times the carrier frequency f2. In a third example shown in FIG. 15A, both of the transmission side and the reception side use common antennas (and amplifiers). In a fourth example shown in FIG. 15B, both of the transmission side and the reception side have a one-chip configuration including a plurality of transmission-side signal generating units 110 or a plurality of reception-side signal generating units 220 for which different antennas are provided.

Although the third embodiment has a basic system configuration same as that of the second embodiment; it is modified for application of frequency division multiplexing. In particular, N (N is a positive integer equal to or greater than 2) sets of transmitters are disposed on the transmission side while M (M is a positive integer equal to or greater than 2) sets of receivers are disposed on the reception side. The transmitters and the receivers use individually different carrier frequencies f1 and f2 for transmission. In order to use carrier signals of different frequencies to carry out multiplex transmission, the frequency division multiplexing described hereinabove with reference to FIGS. 2A to 2C is applied. The examples of the third embodiment shown in FIGS. 13 to 15B include a set which carries out 1:1 signal transmission between the semiconductor chip 103A and the semiconductor chip 203A and another set which carries out 1:2 signal transmission between the semiconductor chip 103B and the semiconductor chips 203B_1 and 203B_2, which has the configuration of the first embodiment.

In the third embodiment, the carrier frequency f1 which is used by the set which carries out 1:1 signal transmission, that is, the set of the semiconductor chips 103A and the 203A, is included in the millimeter waveband of 30 GHz to 300 GHz, and also the carrier frequency f2 which is used by the set which carries out 1:2 signal transmission and adopts the configuration of the first embodiment, that is, the set of the semiconductor chip 103B and the semiconductor chips 203B_1 and 203B_2, is included in the millimeter waveband from 30 GHz to 300 GHz. However, the carrier frequencies f1 and f2 are spaced away from each other by an amount with which modulation signals of them do not interfere with each other. In the following, differences between the first and second embodiments are described.

Since carrier signals which are synchronized with each other although they have the carrier frequencies f1 and f2 different from each other are used by the sets, only one of the plural semiconductor chips 103 on the transmission side, in FIGS. 13 to 15B, the semiconductor chip 103B, has a configuration ready for generation of a carrier signal. However, all of the remaining semiconductor chips, in FIGS. 13 to 15B, the semiconductor chip 103A, is not ready for generation of a carrier signal. All of the remaining semiconductor chips, in FIGS. 13 to 15B, the semiconductor chip 103A, includes an auxiliary carrier signal generator 8602 and receives a carrier signal from the semiconductor chip 103B which is ready for generation of a carrier signal. Based on the received carrier signal, the auxiliary carrier signal generator 8602 generates another carrier signal of a different frequency, in the present example, of the carrier frequency f1, synchronized with the received carrier signal. Thereafter, frequency conversion, that is, up conversion, is carried out.

The relationship of the carrier frequency f1 to the carrier frequency f2 may be m times (m is an integer equal to or greater than 2) similarly as in the case of the first example or may be 1/n time (n is an integer equal to or greater than 2) or m/n times (m and n are positive integers equal to or greater than 2 and m n).

In the case wherein the relationship is m times, that is, an integral number of times, or m/n times (arbitrary multiple), the auxiliary carrier signal generator 8602 may be formed using a frequency multiplication circuit which uses a PLL circuit or the like. In the case wherein the relationship is 1/n time, that is, an integral submultiple, the auxiliary carrier signal generator 8602 may be formed using a frequency dividing circuit.

Only one of the plural semiconductor chips 203 on the reception side, in the figure, only the semiconductor chip 203B_1, has a configuration ready for injection locking. However, all of the remaining semiconductor chips, in the figure, the semiconductor chips 203A and 203B_2, are not ready for injection locking. All of the remaining conductor chips, that is, the semiconductor chips 203A and 203B_2, receive a recovered carrier signal from the one semiconductor chip 203B_1 ready for injection locking and carries out synchronous detection based on the recovered carrier signal.

Here, while the semiconductor chip 203B_2 which uses the carrier frequency f2 is similar to that in the second embodiment, the semiconductor chip 203A which uses the carrier frequency f1 includes an auxiliary carrier signal generator 8612, and receives a recovered carrier signal from the semiconductor chip 203B_1 which is ready for injection locking. Then, based on the recovered carrier signal, the auxiliary carrier signal generator 8612 generates another recovered carrier signal of another frequency, in the present example, of the carrier frequency f1, synchronized with the recovered carrier signal, and then the semiconductor chip 203B_2 carries out frequency conversion, that is, down conversion.

Where the relationship of the carrier frequency f1 to the carrier frequency f2 is m times or m/n times, the auxiliary carrier signal generator 8612 should be formed using a frequency multiplication circuit utilizing a PLL circuit or the like. Where the relationship is 1/n time, the auxiliary carrier signal generator 8612 may be formed using a frequency dividing circuit.

On both of the transmission side and the reception side, where the frequency multiplication circuit and the frequency dividing circuit are compared with each other, generally the frequency dividing circuit is compact in circuit configuration. Accordingly, it is considered that the system configuration is most compact if all of the other sets can be formed using a frequency dividing circuit. In this instance, in the set which is ready for injection locking, the highest frequency from among the carrier frequencies used in the sets is used.

Incidentally, if the relationship of the carrier frequency f1 to the carrier frequency f2 is not m times, that is, not a plural number of times, then a problem that the phase of a recovered carrier signal to be generated by the reception side local oscillator 8404 does not become unique occurs. The problem is hereinafter referred to as phase uncertainty. For a countermeasure against the phase uncertainty, when the relationship of the carrier frequency f1 to the carrier frequency f2 is not m times or not an integral number of times, a phase correction unit 8630 is provided on the reception side as in the case of the second example shown in FIG. 14. Details of the phase correction unit 8630 are hereinafter described in the later description of a different embodiment.

In the first and second examples, the antennas for transmission and reception are coupled to each other by a single millimeter wave signal transmission path 9_3. Functionally, portions between which 1:1 signal transmission is carried out form a millimeter wave signal transmission path 9_1 of the first communication channel while portions which adopt the configuration of the first embodiment form a millimeter wave signal transmission path 9_2 of the second communication channel. Since the single millimeter wave signal transmission path 9_3 is used, for example, a radio wave of the carrier frequency f1 of the millimeter wave signal transmission path 9_1 can be transmitted to the millimeter wave signal transmission path 9_2 side, and a radio wave of the carrier frequency f2 of the millimeter wave signal transmission path 9_2 can be transmitted to the millimeter wave signal transmission path 9_1 side.

At the portion at which 1:1 signal transmission is carried out, signal transmission is carried out in the millimeter waveband through the millimeter wave signal transmission path 9_1 between the semiconductor chips 103A and 203A using the carrier frequency f1. At the portion at which the configuration of the first embodiment is adopted, broadcast communication is carried out in the millimeter waveband through the millimeter wave signal transmission path 9_2 between the semiconductor chip 103B and the semiconductor chips 203B_1 and 203B_2 using the carrier frequency f2 which is not equal to the carrier frequency f1. In other words, both of a 1:1 transmission system and a 1:2 transmission system exist together. In this instance, by setting the different carrier frequencies f1 and f2 to the different communication channels, individual signal transmission is implemented without being influenced by interference.

For example, it is assumed that, while the semiconductor chip 203B_1 receives a transmission signal Sout_2 of the carrier frequency f2, which is a reception signal Sin_2, and is injection-locked with the transmission signal Sout_2, also a transmission signal Sout_1 of the carrier frequency f1 arrives as indicated by a broken arrow mark in FIGS. 13 and 14. In this instance, the semiconductor chip 203B_1 is not injection-locked with the carrier frequency f1, and even if the transmission signal Sout_1 of the carrier frequency f1 is subjected to synchronous detection using a recovered carrier signal and is passed through the low-pass filter 8412 and then subjected to demodulation processing by the semiconductor chip 203B_1, components of the transmission subject signal SIN_1 are not recovered. In other words, even if a modulation signal of the carrier frequency f1 is received while the semiconductor chip 203B_1 is injection-locked with the carrier frequency f2, the injection locking is not influenced by interference of a component of the carrier frequency f1.

Further, it is assumed that, while the semiconductor chip 203A receives a transmission signal Sout_1 of the carrier frequency f1, which is a reception signal Sin_1, and is injection-locked with the transmission signal Sout_1, also a transmission signal Sout_2 of the carrier frequency f2 arrives as indicated by a broken line arrow mark in FIGS. 13 and 14. In this instance, although the semiconductor chip 203A can carry out synchronous detection also with the carrier frequency f2, since the transmission signal Sout_2 is passed through the low-pass filter 8412 to cut components of the transmission signal Sout_2, components of the transmission subject signal SIN_2 are not recovered. In other words, even if the semiconductor chip 203A receives a modulation signal of the carrier frequency f2, it is not influenced by interference of a component of the carrier frequency f2.

Figure 15A:
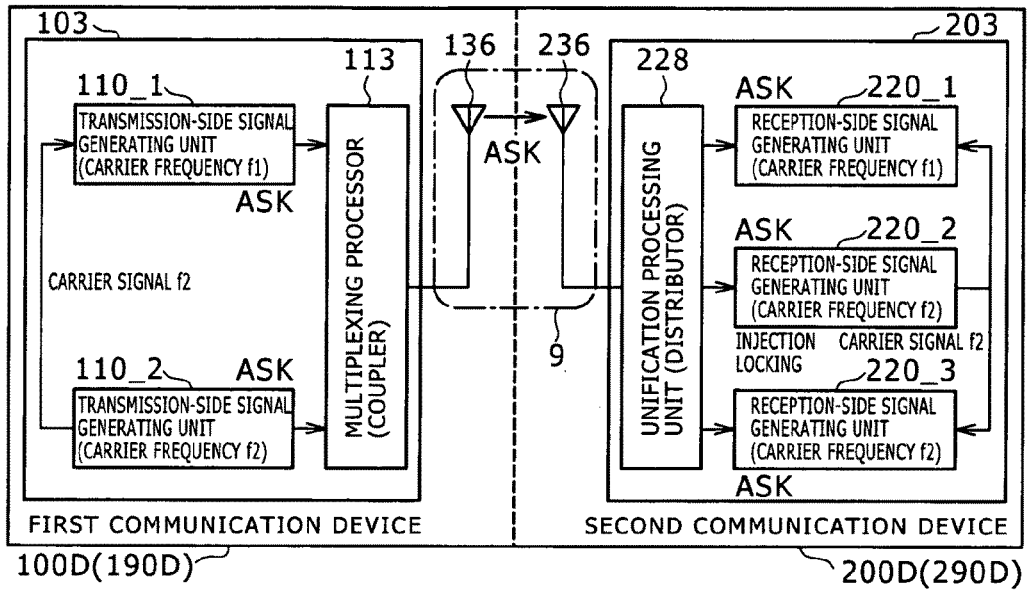
FIG. 15A is a diagram showing a wireless transmission system according to a third example of the third embodiment.

In the third example shown in FIG. 15A, N sets of transmission-side signal generating units 110 are accommodated in the semiconductor chips 103 on one side, that is the transmission side, while M sets of reception-side signal generating units 220 are accommodated in the semiconductor chips 203 on the other side, that is the reception side, and frequency division multiplexing is applied to allow simultaneous signal transmission in the same direction from the transmission-side signal generating units 110 to the reception-side signal generating units 220. As described hereinabove, the injection locking method is applied to only one channel, in the example shown, to the channel between the transmission-side signal generating unit 110_2 and the reception-side signal generating unit 220_2.

Although the transmission-side signal generating units 110 on the transmission side have a one-chip configuration wherein they are accommodated in the same chip, this is not essential. Similarly, although the reception-side signal generating units 220 on the reception side have a one-chip configuration wherein they are accommodated in the same chip, this is not essential either. However, where the wiring line length for the free-running oscillation frequency of the carrier frequency f2 is considered, both of the transmission side and the reception side preferably have a one-chip configuration.

Though not shown, the transmission-side signal generating unit 110_1 includes a auxiliary carrier signal generator 8602, which generates a carrier signal of the carrier frequency f1 based on a carrier signal of the carrier frequency f2 from the transmission-side signal generating unit 110_2.

Millimeter wave signals of the carrier frequencies f1 and f2 generated by the transmission-side signal generating units 110_1 and 110_2, respectively, are integrated into a signal of one channel by a coupler which is an example of the multiplexing processor 113. The signal of one channel is transmitted to the millimeter wave signal transmission path 9 through the antenna 136 of the transmission path coupler 108. The antenna 236 on the reception side receives the millimeter wave signal transmitted thereto through the millimeter wave signal transmission path 9 and disintegrates the millimeter wave signal into signals of three channels by means of a distributor which is an example of the unification processing unit 228. The signals of three channels are supplied individually to the reception-side signal generating units 220_1, 220_2 and 220_3.

The reception-side signal generating unit 220_2 generates a recovered carrier signal injection-locked with the carrier signal of the carrier frequency f2 used for the modulation by the transmission-side signal generating unit 110_2 to demodulate the received millimeter wave signal of the carrier frequency f2. Though not shown, the reception-side signal generating unit 220_1 includes an auxiliary carrier signal generator 8612, which generates a carrier signal of the carrier frequency f1 based on the recovered carrier signal of the carrier frequency f2 from the reception-side signal generating unit 220_2 to carry out synchronous detection. The reception-side signal generating unit 220_3 carries out synchronous detection based on the recovered carrier signal of the carrier frequency f2 from the reception-side signal generating unit 220_2.

Since the third example uses such a mechanism as described above, it can implement frequency division multiplex transmission of transmitting different signals in the same direction without giving rise to a problem of interference using the two sets of carrier frequencies f1 and f2 similarly as in the first and second examples.

Figure 15B:
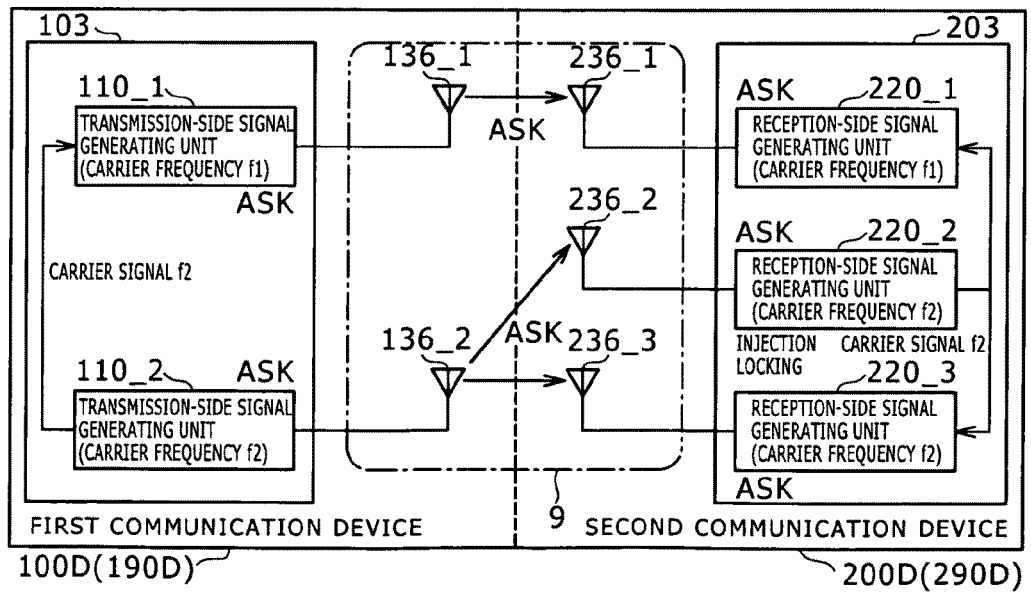
FIG. 15B is a diagram showing a wireless transmission system according to a fourth example of the third embodiment.

In the fourth example shown in FIG. 15B, N sets of transmission-side signal generating units 110 are accommodated in the semiconductor chip 103 on one side, that is the transmission side, while M sets of reception-side signal generating units 220 are accommodated in the semiconductor chip 203 on the other side, that is the reception side, and signal transmission can be carried out in the same direction from the transmission-side signal generating units 110 to the reception-side signal generating units 220 applying frequency division multiplexing. In this regard, the fourth example is common to the third example.

The fourth example is different from the third example in that the transmission and reception circuits use different antennas from each other. In particular, the semiconductor chip 103 does not include the multiplexing processor 113, and antennas 136_1 and 136_2 are connected to the transmission-side signal generating units 110_1 and 110_2, respectively. Meanwhile, the semiconductor chip 203 does not include the unification processing unit 228, and antennas 236_1, 236_2 and 236_3 are connected individually to the reception-side signal generating units 220_1, 220_2 and 220_3, respectively.

The third and fourth examples are different from each other in that each of the transmission and reception circuits uses an individually independent antenna but is not different in operation in regard to application of frequency division multiplex transmission. However, in the third example, since the multiplexing processor 113 and the unification processing unit 228 for the millimeter waveband which exhibit low loss and a high performance are required, it is considered that the fourth example which does not require them is more realistic.

The third embodiment is advantageous in that, where both of the transmission side and the reception side have a system configuration of a plurality of channels, only one channel may be ready for injection locking on the reception side similarly as in the first and second embodiments and therefore an injection locking circuit need not be prepared for each channel and consequently the system configuration can be made compact. However, since different frequencies are used by the different sets, both of the transmission side and the reception side require a configuration for generating a carrier signal of a frequency different from a carrier frequency used for injection locking, particularly the auxiliary carrier signal generator 8602 or 8612.

[Frequency Relationship of m/n]

Figure 16:
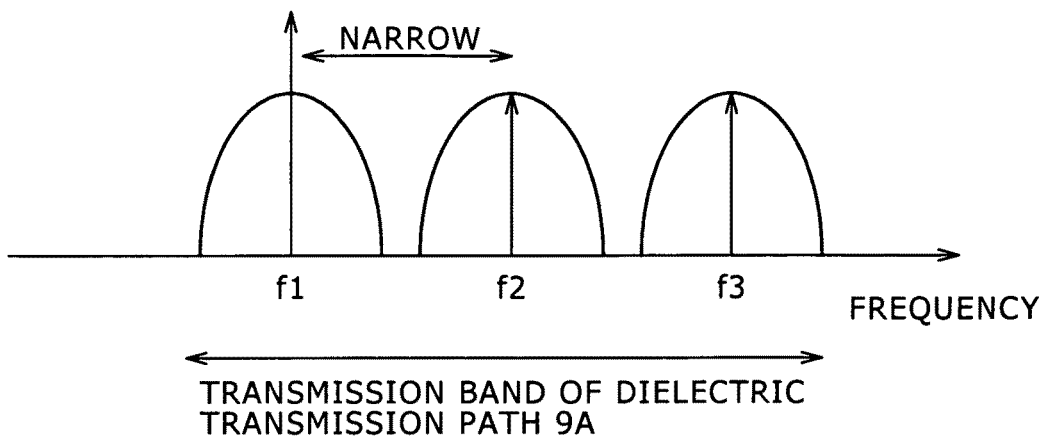
FIG. 16 is a diagram illustrating an effect given by a frequency relationship set to m/n in the wireless transmission system of the second example of the third embodiment.

FIG. 16 illustrates an effect given by a frequency relationship set to m/n in the wireless transmission system 1D of the second example of the third embodiment.

When multiplex transmission is carried out using frequency multiplexing, if the frequency relationship of the channels is set to m times, that is, to an integral number of times, or to 1/n time, that is, to an integral multiple, then it is necessary to make an overall use region of the millimeter wave signal transmission path 9 considerably wide as can be recognized from the description of frequency multiplexing given hereinabove with reference to FIGS. 2A to 2C. Although this necessity can be satisfied by the free space transmission path 9B, a transmission path whose bandwidth is limited like the dielectric transmission path 9A may not satisfy the necessity.

On the other hand, if the transmission rate per one channel is lowered and the frequency relationship is set to m/n so that the carrier frequencies may come close to each other, then the entire use band can be narrowed. This makes it possible for a plurality of channels to be transmitted even along a transmission path whose bandwidth is limited like the dielectric transmission path 9A.

<Modification to First to Third Embodiments>

Figure 17:
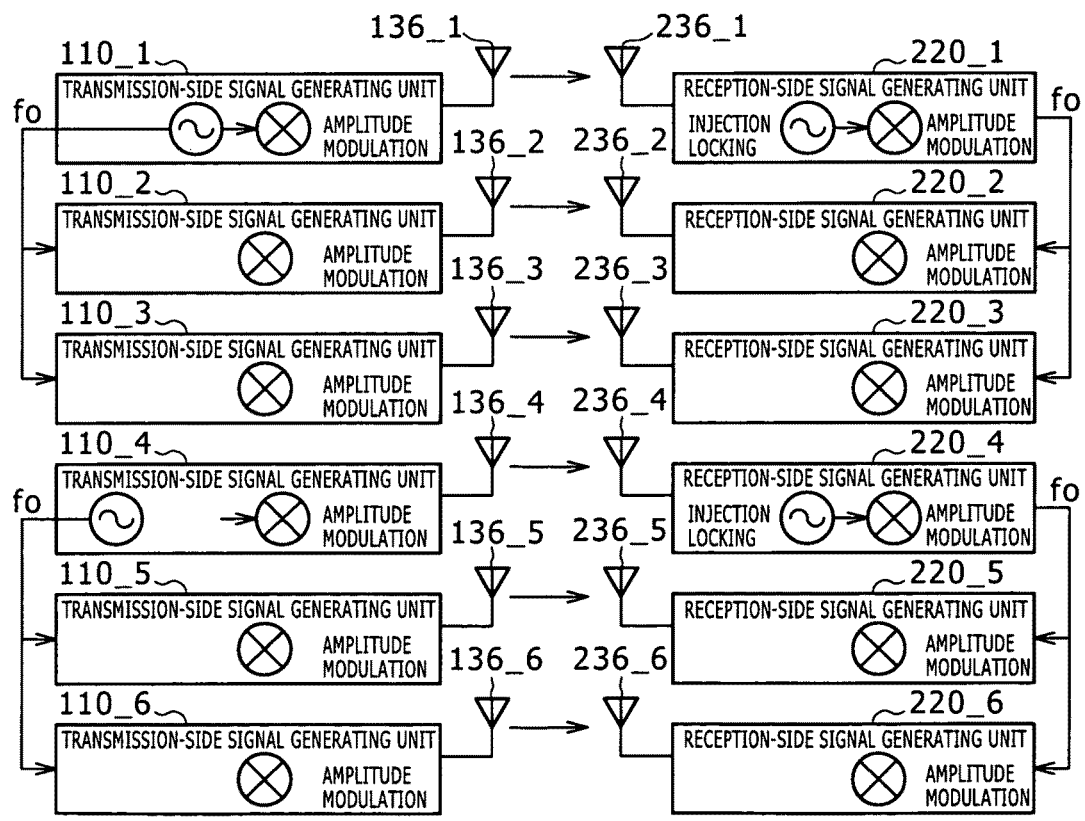
FIG. 17 is a diagram illustrating a modification to the system according to the first to third embodiments.

FIG. 17 shows a modification to the systems of the first to third embodiments. In this modification, "although an injection locking circuit is not prepared for each of the channels of the reception side, the injection locking circuit is provided not for one channel but for a plurality of channels."

In the second and third embodiments, signal transmission in a plurality of transmission channels in the same direction is applied as an example of multiplexing transmission. However, multiplexing transmission can be carried out in the opposite directions. In such a case, to a transmission device including a plurality of transmission units and reception units, the technique in the second or third embodiment can be applied.

For example, though not shown, it may seem a possible idea to arrange an equal number of transmitters and receivers in a pair of semiconductor chips for bidirectional communication and use different carrier frequencies in different sets of the transmitters and receivers to carry out full duplex bidirectional communication. Further, where a plurality of sets of semiconductor chips carry out full duplex bidirectional communication, the mechanism of the second and third embodiments described hereinabove wherein only one channel is ready for injection locking on the reception side may be applied similarly. If synchronism can be established in the one channel, then synchronism can be established in all of the channels. Therefore, a reception signal can be demodulated if synchronous detection is carried out for the channels based on a recovered carrier signal acquired by injection locking.

In the first to third embodiments, where the reception side includes a plurality of channels, only one channel is ready for injection locking, and in all of the other channels, synchronous detection is carried out for each channel based on a recovered carrier signal acquired by the injection locking by the one channel but it is not essential. In short, only it is necessary for the number of channels for which an injection locking circuit is prepared to be smaller than the number of channels on the reception side, and the other channels for which the injection locking circuit is not prepared should be configured such that they carry out synchronous detection based on a recovered carrier signal acquired by the injection locking. In short, where the number of channels on the reception side is represented by P and the number of those channels for which an injection locking circuit is prepared is represented by Q, the system should be configured so as to satisfy a relationship of P>Q. Further, for the remaining "P−Q" channels, synchronous detection should be carried out based on a recovered carrier signal acquired by the injection locking. Also in this instance, the system is configured such that, "where the injection locking method is adopted, if the reception side has a plurality of channels, the injection locking circuit is not prepared for each channel."

For example, in the configuration shown in FIG. 17, six channels are divided into two groups of 3 channels, and from among the first to third channels (from among channels having reference characters _1 to _3), only one channel (the channel of the reference character _1) is ready for injection locking. On the other hand, from among the fourth to sixth channels (from among channels having reference characters _4 to _6), only one channel (the channel of the reference character _4) is ready for injecting locking.

In the present example, preferably the transmission-side signal generating units 110 of the first to third channels on the transmission side have a one-chip configuration wherein they are accommodated in the same chip, and preferably the transmission-side signal generating units 110 of the fourth to sixth channels have a one-chip configuration wherein they are accommodated in the same chip. Also on the corresponding reception side, preferably the reception-side signal generating units 220 of the first to third channels have a one-chip configuration wherein they are accommodated in the same chip, and preferably the reception-side signal generating units 220 of the fourth to sixth channels have a one-chip configuration wherein they are accommodated in the same chip. Naturally, such configurations are not essential.

In order to make the number of channels which have an injection locking circuit smaller than the total number of channels to make the system configuration compact, it is an optimum configuration that only one of the channels has an injection locking circuit. However, where the wiring line length for a recovered carrier signal for carrying out injection locking based on a recovered carrier signal acquired by injection locking in another channel is taken into account, the configuration that only one channel has an injection locking circuit may not possibly be appropriate in terms of the layout. In such an instance, the configuration shown in FIG. 17 is effective.

<Relationship Between an Amplitude Modulation Signal and Other Modulation Signals>

Figure 19A:
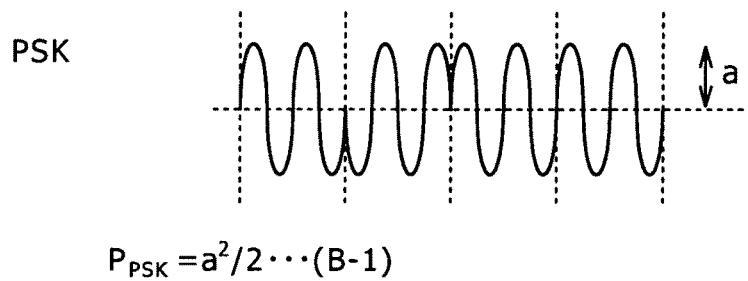
FIGS. 19A to 19C are diagrammatic views (No. 1) illustrating a relationship in transmission power between the ASK method and the PSK method.
Figure 19B:
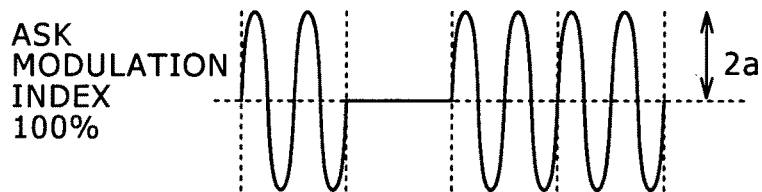
Figure 19C:
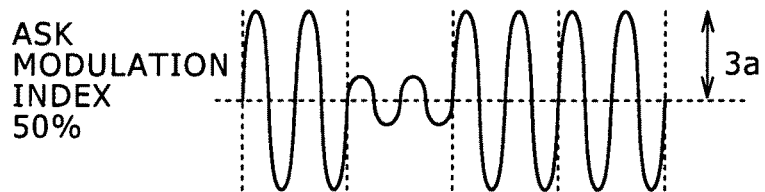
Figure 20A:
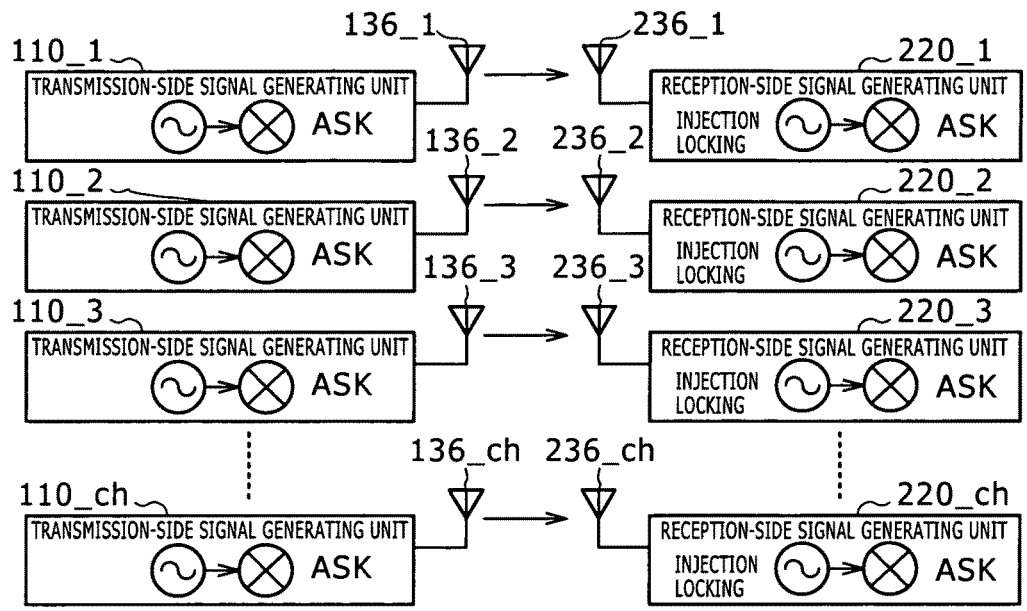
FIGS. 20A to 20B are diagrammatic views (No. 2) illustrating a relationship in transmission power between the ASK method and the PSK method.
Figure 20B:
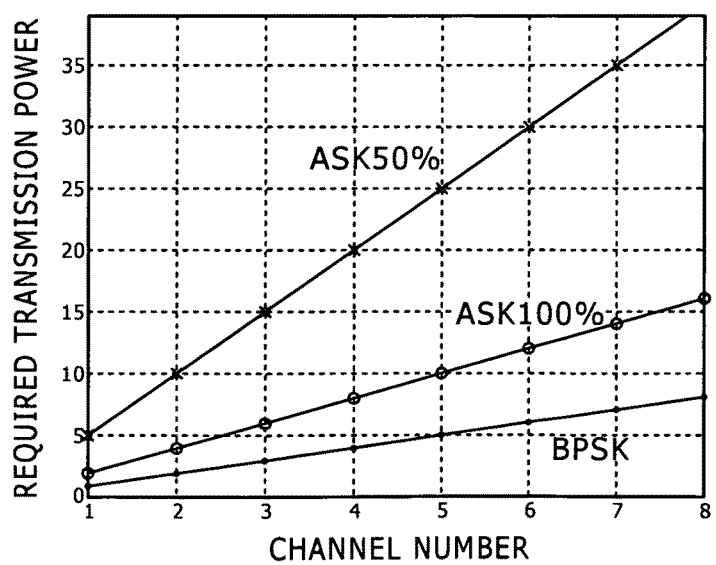
Figure 21A:
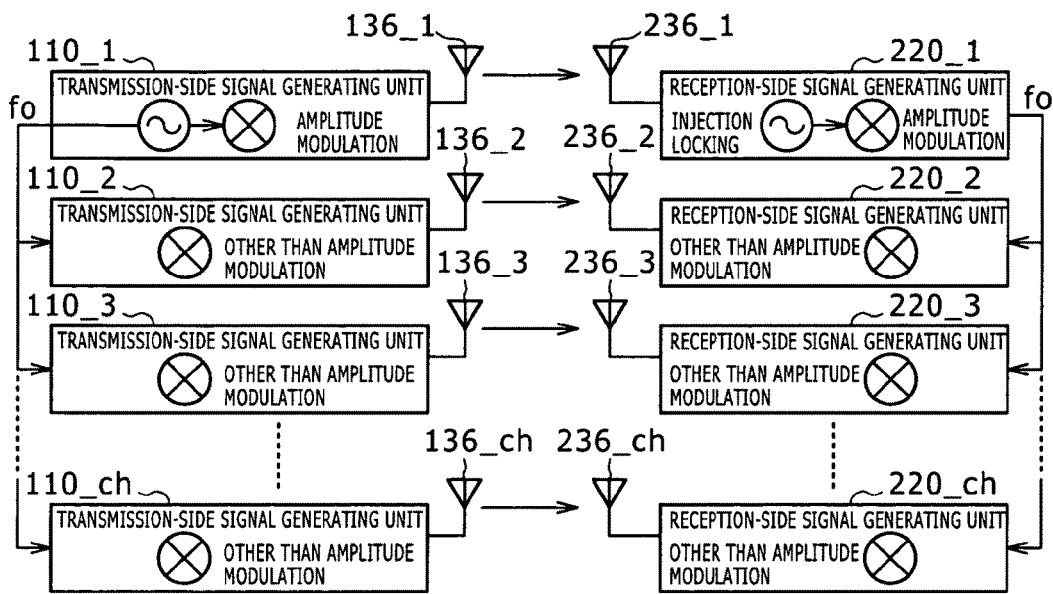
FIGS. 21A and 21B are block diagrams showing a basic mechanism for achieving reduction of the transmission power where multiplex transmission is carried out.
Figure 21B:
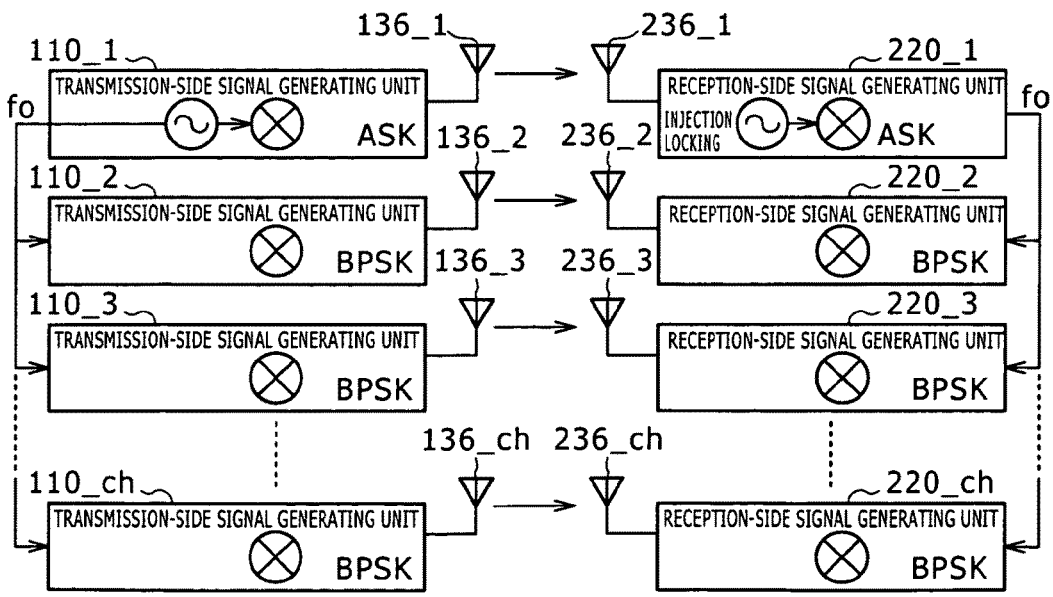

FIGS. 18A to 21B illustrate a relationship between an amplitude modulation signal and other modulation signals. In particular, FIGS. 18A to 18E illustrate an amplitude modulation signal where a carrier signal and a reference carrier signal have the same frequency and the same phase in the ASK method. FIGS. 19A to 20B illustrates a relationship in transmission power between the ASK method and the PSK method. FIGS. 21A and 21B illustrate a basic mechanism of the present embodiment for achieving transmission power reduction where multiplexing transmission is carried out.

[Amplitude Modulation Signal]

With the ASK method, the amplitude of a carrier signal is modulated with a transmission-subject signal. It should be considered that one of an I-phase signal and a Q-phase signal is used on a phase plane represented by an I axis and a Q axis and the signal amplitude of a modulation signal is given within a range from 0 to +F. Modulation with two values of 0 and +F is the simplest modulation, and where the modulation degree is 100%, the modulation becomes the OOK. It is considered that normalization of "F" becomes "1," and ASK of binary values is implemented.

Figure 18A:
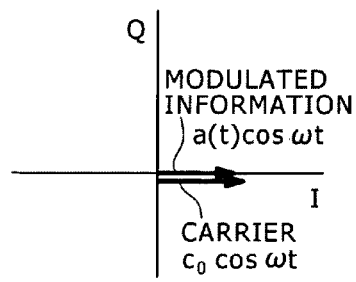
FIGS. 18A to 18E are diagrammatic views illustrating an amplitude modulation signal where both of a carrier signal and a reference carrier signal in the ASK method have a same frequency and a same phase.
Figure 18E:
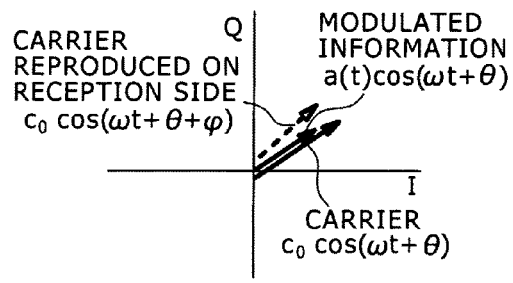

Here, a case is examined wherein a signal having a same frequency and a same phase as those of a carrier signal used for the modulation is used as a reference carrier signal. For example, as shown in FIG. 18A, when it is intended to transmit information placed on the I axis, also the reference carrier signal is placed in the same phase (on the I axis).

Incidentally, where the phases of the carrier signal used for the modulation and the reference carrier signal are made the same phase, for example, the following technique can be adopted.

Figure 18B:
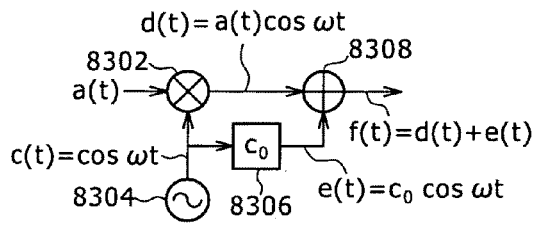

The first example shown in FIG. 18B is an example of a technique for applying the basic configuration 1 shown in FIG. 7A. To the frequency mixer 8302, a transmission-subject signal $a(t)$ and a transmission signal $c(t)=\cos \omega$ are supplied. The frequency mixer 8302 uses a balanced modulation circuit or a double balanced modulation circuit to carry out suppressed-carrier amplitude modulation to generate the carrier signal $d(t)=a(t)\cos \omega t$ and supplies the carrier signal $d(t)=a(t)\cos \omega t$ to the signal combining unit 8308. The transmission-subject signal $a(t)$ is a binary signal of 0 and +1. The reference carrier signal processor 8306 controls the amplitude of the carrier signal $c(t)=a(t)\cos \omega t$ outputted from the transmission side local oscillator 8304 to Co (within a range from 0 to 1) to generate a reference carrier signal $e(t)=Co\cos \omega t$ and supplies the reference carrier signal $e(t)$ to the signal combining unit 8308. The signal combining unit 8308 carries out signal combination of $d(t)+e(t)$ to generate a transmission signal $f(t)$. Co=0 is equivalent to 100% modulation.

Figure 18C:
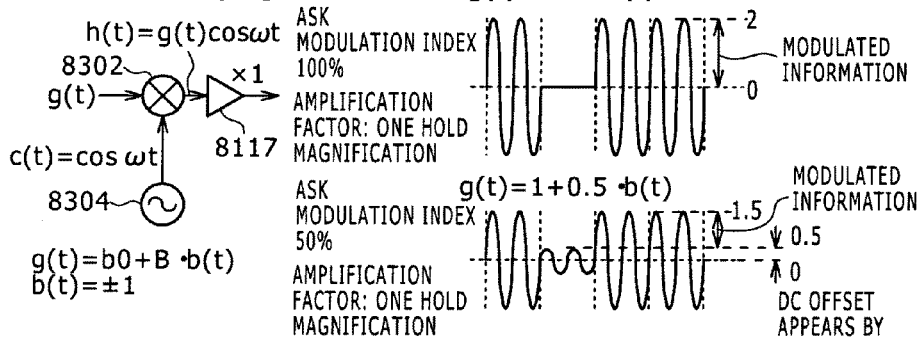
Figure 18D:
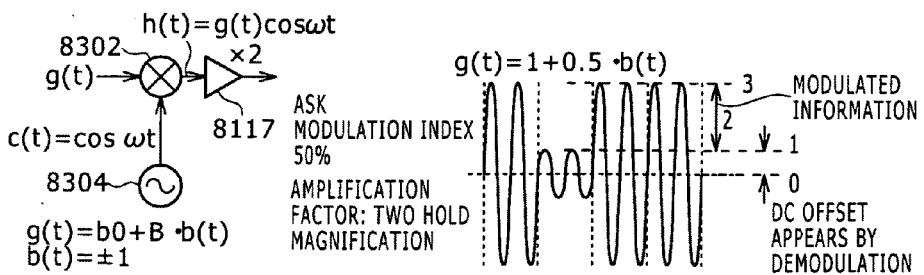

A second example shown in FIG. 18C and a third example shown in FIG. 18D are examples of a technique of applying the basic configuration 3 shown in FIG. 7C. The frequency mixer 8302 has a circuit configuration wherein suppressed-carrier amplitude modulation is not applied and carries out amplitude modulation with a signal $g(t)$ obtained by adding a DC component b0 to a transmission-subject signal $b(t)$ to generate a signal $h(t)=g(t)\cos \omega t$. The transmission-subject signal $b(t)$ can assume two values of −1 and +1.

As regards the modulation degree (percentage modulation), two approaches are available including an approach that it is handled with a value $Ma=Vs/Vc$ where Vc is the amplitude of the carrier signal and Vs is the amplitude of the transmission-subject signal, and another approach that it is handled with a value $M=(x-y)/(x+y)$ where x and y are a maximum value and a minimum value, respectively, of a result of the amplitude modulation (amplitude modulation wave). In the present specification, the former is adopted, and therefore, the amplitude B of the transmission-subject signal $b(t)$ corresponds to the modulation degree (percentage modulation).

Here, in the second example shown in FIG. 18C, while the DC component b0 is fixed to 1, the modulation degree B is controlled within the range from 0 to 1 to adjust the amplitude of the reference carrier signal (the amplitude within a period within which $b(t)=-1$). The amplification factor adjusted by the amplifier 8117 is one fold.

The third example shown in FIG. 18D is a case wherein, in regard to the state in 50% modulation in the second example shown in FIG. 18C, the amplification factor is adjusted by the amplifier 8117 to obtain signal quality same as that upon 100% modulation. In the second example, the difference between the amplitude within a period of $b(t)=-1$ and the amplitude within a period of $b(t)=+1$ is modulation information, and upon 100% modulation, the modulation information is 2.0, but upon 50% modulation, the modulation information is 1.0. Therefore, if no countermeasure is taken, then the signal quality upon 50% modulation deteriorates from that upon 100% modulation. In order to improve the signal quality upon 50% modulation to a level same as that upon 100% modulation, the amplification factor should be increased to twice by the amplifier 8117. In this instance, the amplitude within the period of $b(t)=-1$ becomes 1.0, and the amplitude within the period of $b(t)=+1$ becomes 3.0.

It is to be noted that, even where the amplification factor of the amplifier 8117 in the second example or the third example is one fold, the waveform state of the third example shown in FIG. 18D can be generated also by controlling the modulation degree B to "1" and controlling the DC component b0 within the range from 1 to 2 (in this instance, to "2,") to adjust the amplitude of the reference carrier signal (that is, the amplitude within the period within which $b(t)=-1$). In this mode, according to the manner of handling of the modulation degree described hereinabove, it can be regarded that the modulation degree is 100%.

In all of the first to third examples, when it is tried to transmit information placed only on one axis, also the reference carrier signal has the same phase, that is, the I axis. In this example, as can be recognized from FIG. 18E, a DC offset component appears on the reception side.

For example, if it is assumed that the I axis represents a real number component and the Q axis represents an imaginary number component and, in the first example, the amplitude of the transmission-subject signal $a(t)$ varies between 0 and +1, then a reception signal point comes to 0 and +1 on the I axis. If also the reference carrier wave is placed on the I axis, then the signal point becomes "0+Co" and "+1+Co." Consequently, a DC component corresponding to +Co is placed.

If, in the second example or the third example, the transmission-subject signal $b(t)$ assumes −1 and +1, then the reception signal point comes to −1 and +1 on the I axis. If also the reference carrier wave is placed on the I axis similarly, then the signal point comes to "−1+Co" and "+1+Co." Consequently, a DC component corresponding to +Co is placed. This is an approach wherein, where the BPSK is applied, also the modulation-subject signal is modulated after it is worked by signal processing in advance so that also the reference carrier wave is placed on the I axis in order to make the BPSK equivalent to the ASK.

In order to solve this problem, it seems a possible idea to provide the DC component suppressor 8407 for suppressing a DC offset component on the reception side. However, this idea is disadvantageous in that the dispersion differs among different apparatus and individual adjustment in accordance with the magnitude of the DC offset is required and that such suppression of a DC offset component is influenced by a temperature drift.

As a method of solving this problem without providing the DC component suppressor 8407 on the reception side, it seems a possible idea to place a reference carrier signal on a phase axis different from the phase axis on which transmission information is placed, that is, different from the phase axis of the modulation signal, preferably on a phase spaced apart most.

For example, in the case of the ASK mode wherein transmission information is placed only on one of the I axis and the Q axis, it seems a possible idea to make, on the transmission side, the reference carrier signal and the modulation information orthogonal to each other. In other words, in place of carrying out biaxial modulation of an I phase signal and a Q phase signal, only one of the I axis and the Q axis is used for signal transmission while the other remains in a non-modulated state and the non-modulated signal is used as the reference carrier signal.

The relationship between the transmission information or modulation information and the reference carrier signal and between the I axis and the Q axis described above may be reversed. For example, on the transmission side, the transmission information is placed on the I axis side while the reference carrier signal is placed on the Q axis side. On the contrary, the transmission information may be set to the Q axis side while the reference carrier signal is set to the I axis side.

[Transmission Power]

As can be recognized from the foregoing description regarding injection locking in FIGS. 6A to 18E, injection locking is effective to wireless signal transmission within an apparatus or between difference apparatus. Further, where the injection locking method is adopted, a method of modulating the amplitude like the ASK method is suitable as the modulation method from a point of view of easiness in establishment on the reception side. For example, if the ASK method is used for injection locking, then there are such advantages that the configuration of the reception circuit is simplified in that a filter is not required and that the reception characteristic is less likely to be degraded.

However, the method of modulating the amplitude (including ASK method) has a difficult point that the transmission power is higher than that of any other modulation method. Where it is intended to achieve multi-channel transmission or multiplexing transmission, increase of the required transmission power appears conspicuously. Thus, a solution to this problem is demanded.

For example, FIGS. 19A to 19C illustrate examples of modulation signals of the ASK method (100% modulation and 50% modulation) and the BPSK method, and a relationship of the required transmission power.

Where the amplitude of the BPSK is represented by a, the transmission power necessary to obtain the same signal point distance (same ber) is represented by the expression (B-1) as seen in FIG. 19A. In contrast, in order to obtain signal quality same as that by the BPSK, according to the ASK method (100% modulation), the maximum amplitude is 2 a and the required transmission power is represented by the expression (B-2) as seen in FIG. 19B. Accordingly, in the ASK method (100% modulation), transmission power as high as two times that of the BPSK method is required.

Similarly, in the ASK method (50% modulation), the carrier wave amount becomes a where the maximum amplitude is 3 a, and the required transmission power is represented by the expression (B-3) as seen in FIG. 19C. Accordingly, in the ASK method (50% modulation), transmission power as high as five times that of the BPSK method is required.

As can be recognized from this, in order to obtain the same signal quality, the ASK requires higher transmission power than the BPSK method irrespective of the modulation degree. This makes a more significant problem as the number of channels for multiplexing transmission increases.

For example, FIGS. 20A and 20B illustrate a relationship between the number of channels upon multiplexing transmission and the required transmission power for the BPSK method, the ASK method (100% modulation), and the ASK method (50% modulation).

As is understood from FIGS. 19A to 19C and 20A and 20B, if all signals are transmitted by multiplexing transmission by the ASK to increase the channel number, then the difference in required transmission power increases in comparison with that in an alternative case wherein all signals are transmitted by multiplexing transmission by the BPSK to increase the number of channels. Particularly if the modulation rate is low, then the power difference appears conspicuously.

While comparison between the ASK (100% and 50%) and the BPSK is made here, in a relationship not only with the BPSK but also with any other PSK such as QPSK or 8PSK or with an amplitude phase modulation method such as QAM, in order to achieve the same quality, the amplitude modulation such as the ASK requires high transmission power. In contrast, not only with a method which modulates the phase but also with a method which modulates the frequency, the method of modulating only the amplitude exhibits high transmission power.

Therefore, in the present embodiment, it is intended to achieve reduction of the required transmission power upon multiplexing transmission. According to simple supposition from the foregoing description, in order to obtain the same signal quality, since a method which modulates only the amplitude requires higher transmission power than that required by any other method than the method which modulates only the amplitude, it seems a first possible idea to use any other method than the method which modulates only the amplitude to form all channels. However, only in terms of the facilitation in establishment of injection locking, the method which modulates only the amplitude is more advantageous, and it is not preferable to use any other method than the method which modulates only the amplitude to form all channels.

Therefore, in the present embodiment, not all channels are formed using any other method than the method which modulates only the amplitude but the method which modulates only the amplitude and some other method are used in a mixed state and besides a method by which the transmission power may be lower than that by the method which modulates only the amplitude is adopted while the "same signal quality is obtained." As a criterion for the signal quality, a known criterion such as an error rate may be adopted.

As a method other than the method which modulates only the amplitude, a method which modulates only the phase, another method which modulates both of the amplitude and the phase, a further method which modulates only the frequency and so forth are available. However, from the point of view of simplicity and easiness in circuit configuration, the priority degree for adoption should be determined in the order of the method which modulates only the phase, the method which modulates both of the amplitude and the phase, and the method which modulates only the frequency. For example, when digital modulation is intended, it is preferable to adopt the PSK or the QAM.

For example, in the present embodiment, where the injection locking method is adopted, upon multiplexing transmission, a method which modulates only the amplitude and by which injection locking can be established readily, typically the ASK, is adopted for one channel, and for the other channels, any other modulation method than the method which modulates only the amplitude is adopted as seen in FIG. 21A.

As a typical example, as shown in FIG. 21A, the ASK is used for transmission by one channel while the BPSK which requires low transmission power is used for transmission by the other channels. Consequently, where multiplexing transmission is carried out by space division multiplexing, frequency division multiplexing or the like, increase of the required transmission power can be suppressed while the injection locking method remains utilized.

Preferably, as with the second and third embodiments (and the modifications thereof), injection locking is applied to one channel or to a number of channels smaller than the number of channels of the reception side while carrier signals synchronized with the injection locking are used to carry out modulation and demodulation. In this instance, in space division multiplexing, in an extreme case, the carrier signals may have the same frequency. Naturally, it is not essential to use a combination with the second or third embodiment (or the modifications thereof), but all channels of the reception side may individually adopt the injection locking method.

Although the transmission-side signal generating units 110 on the transmission side have a one-chip configuration wherein they are accommodated in the same chip, this is not essential. Similarly, although the reception-side signal generating units 220 on the reception side have a one-chip configuration wherein they are accommodated in the same chip, this is not essential either. However, where the wiring line length for the free-running oscillation frequency fo is considered, both of the transmission side and the reception side preferably have a one-chip configuration.

Incidentally, where it is intended only to reduce the required transmission power, it seems a possible idea to apply any other method than the method which modulates only the amplitude to all channels. However, where use together with the injection locking method is intended, the method which adopts only the amplitude should be applied to at least one channel because it can easily establish injection locking. In this instance, preferably the present embodiment is combined with the second or third embodiment or with a modification to the second or third embodiment to achieve decrease of the scale regarding the injection locking circuit.

<Wireless Transmission System: Fourth Embodiment>

Figure 22:
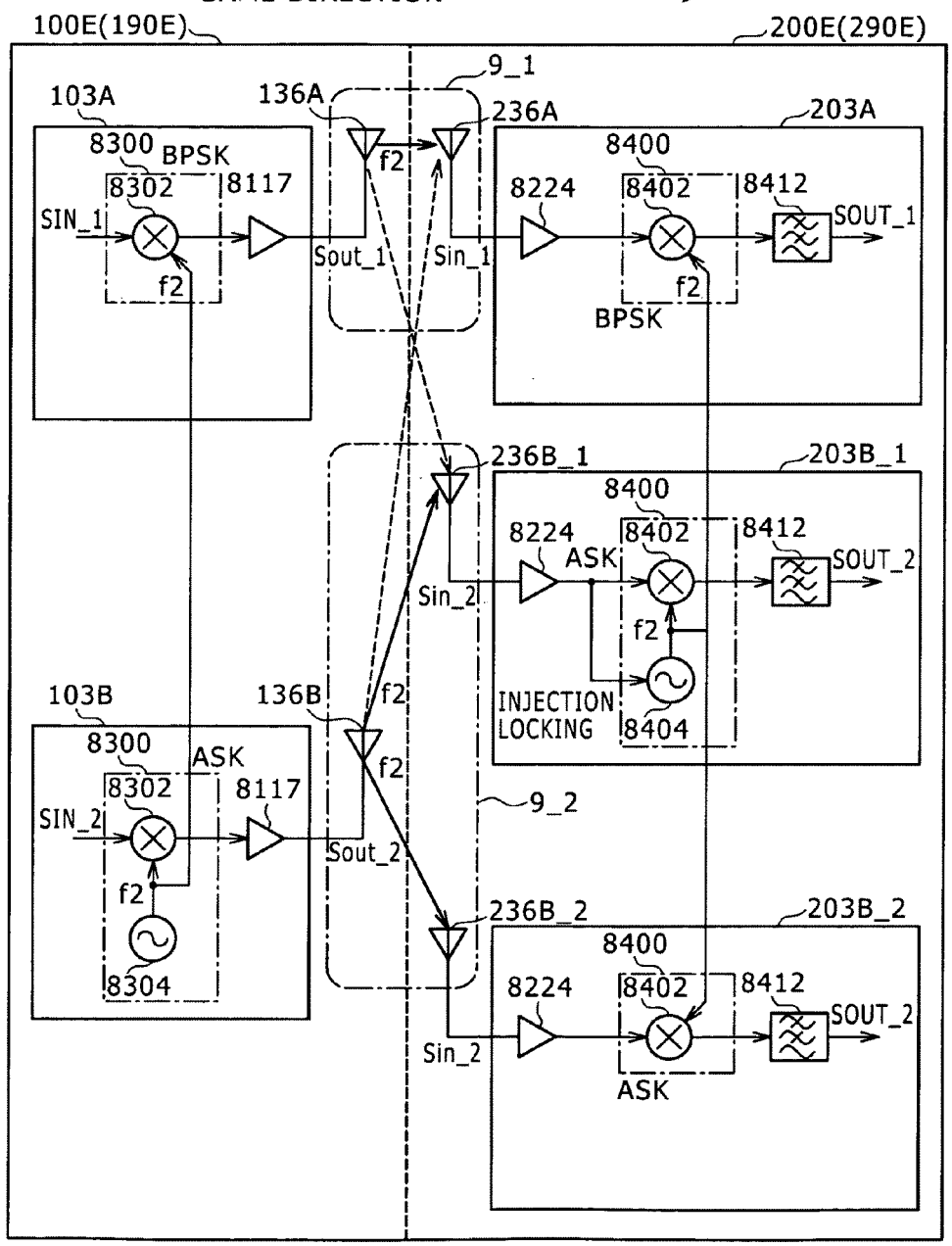
FIG. 22 is a diagram showing a wireless transmission system according to a first example of a fourth embodiment.
Figure 23:
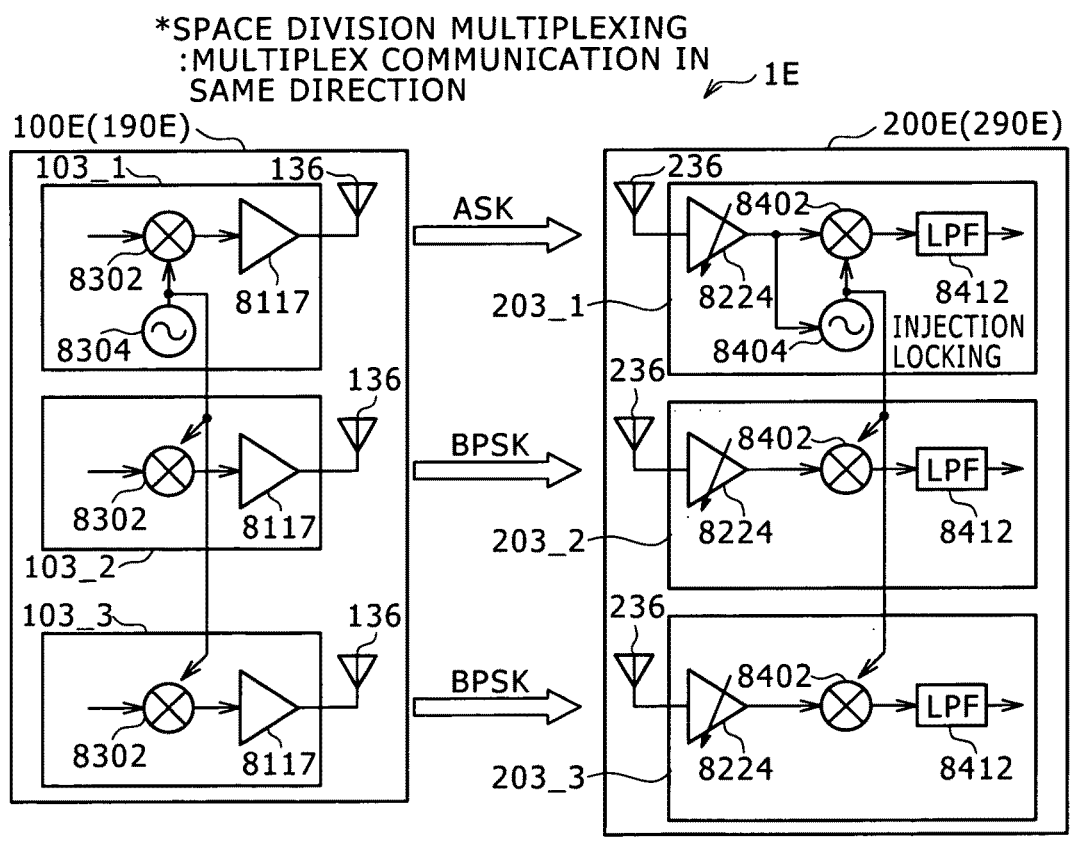
FIG. 23 is a diagram showing a wireless transmission system according to a second example of the fourth embodiment.

FIGS. 22 and 23 show a wireless transmission system of a fourth embodiment. Here, a first example shown in FIG. 22 is a modification to the second embodiment. A second example shown in FIG. 23 has a system configuration which includes three sets for 1:1 signal transmission between the transmission and reception sides.

In the wireless transmission system 1E of the fourth embodiment, where both of the transmission side and the reception side use a plurality of channels, one channel adopts the ASK modulation while the other channels adopt a modulation method other than the ASK and injection locking is applied to the channel of the ASK while the remaining channels use a carrier signal synchronized with the carrier signal generated by the local oscillator 8304 or 8404 to carry out modulation or demodulation on both of the transmission side and the reception side. Further, similarly to the second embodiment, the wireless transmission system 1E applies not frequency division multiplexing but space division multiplexing to achieve multi-channeling.

While the fourth embodiment has a general system configuration same as that of the second embodiment, as can be recognized from contrast between them, the fourth embodiment is different from the second embodiment in that not any modulation may be used for each channel but the ASK method is adopted only for the injection locking while a modulation method other than the ASK method, here, the BPSK method, is used for the remaining channels. Except the difference, the fourth embodiment is similar to the second embodiment, and therefore, overlapping description thereof is omitted herein to avoid redundancy.

<Wireless Transmission System: Fifth Embodiment>

Figure 24:
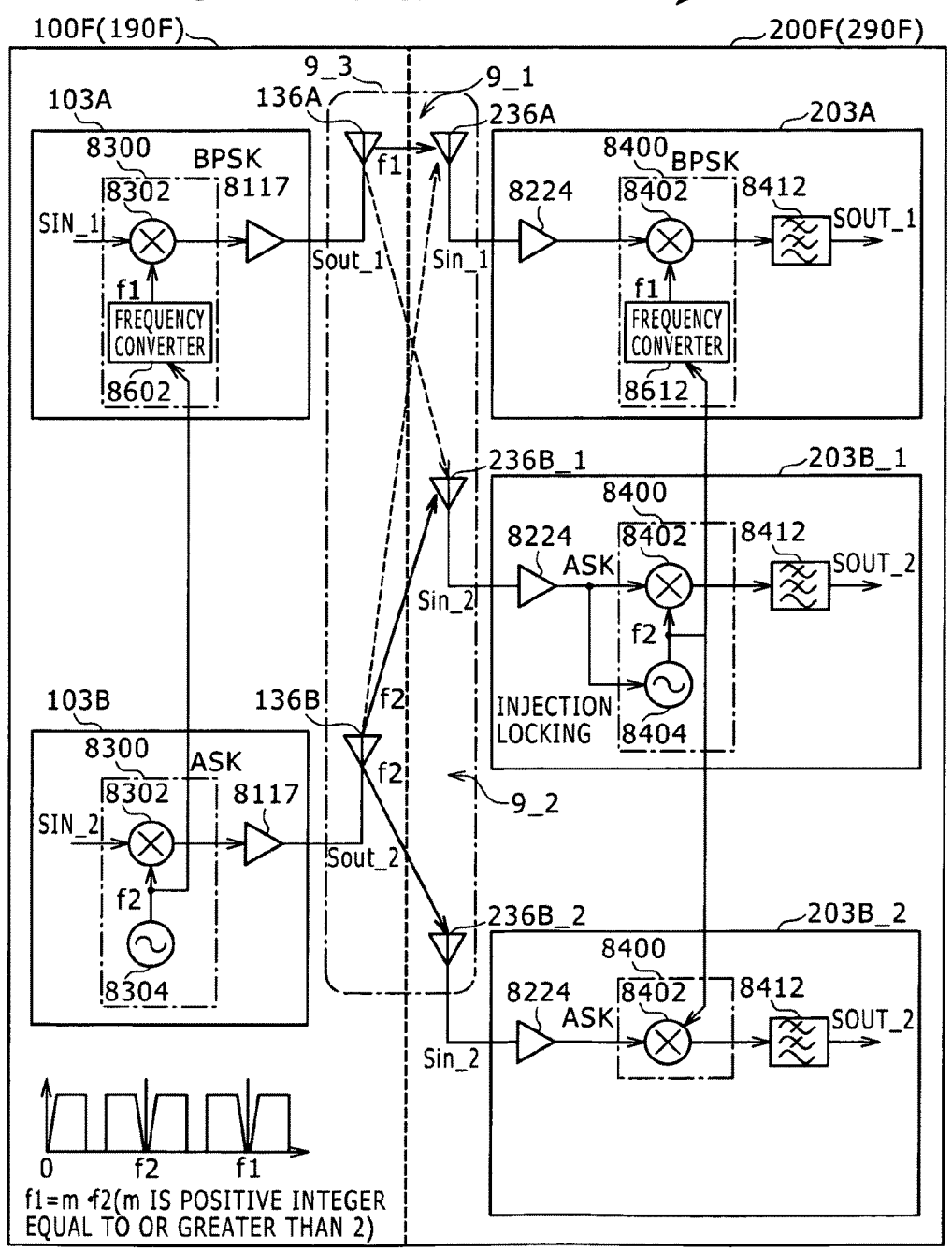
FIG. 24 is a diagram showing a wireless transmission system according to a first example of a fifth embodiment.
Figure 25:
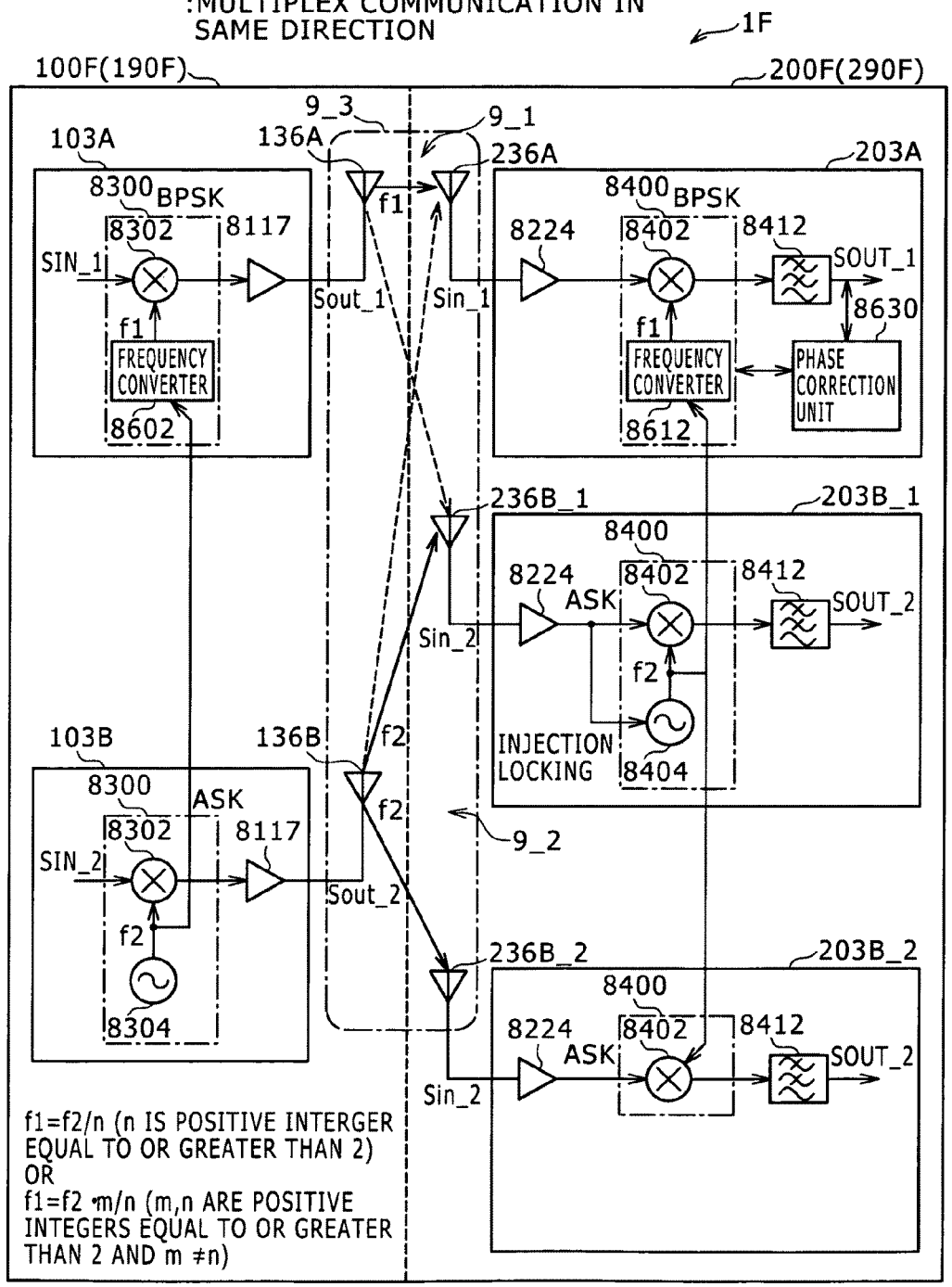
FIG. 25 is a diagram showing a wireless transmission system according to a second example of the fifth embodiment.
Figure 26:
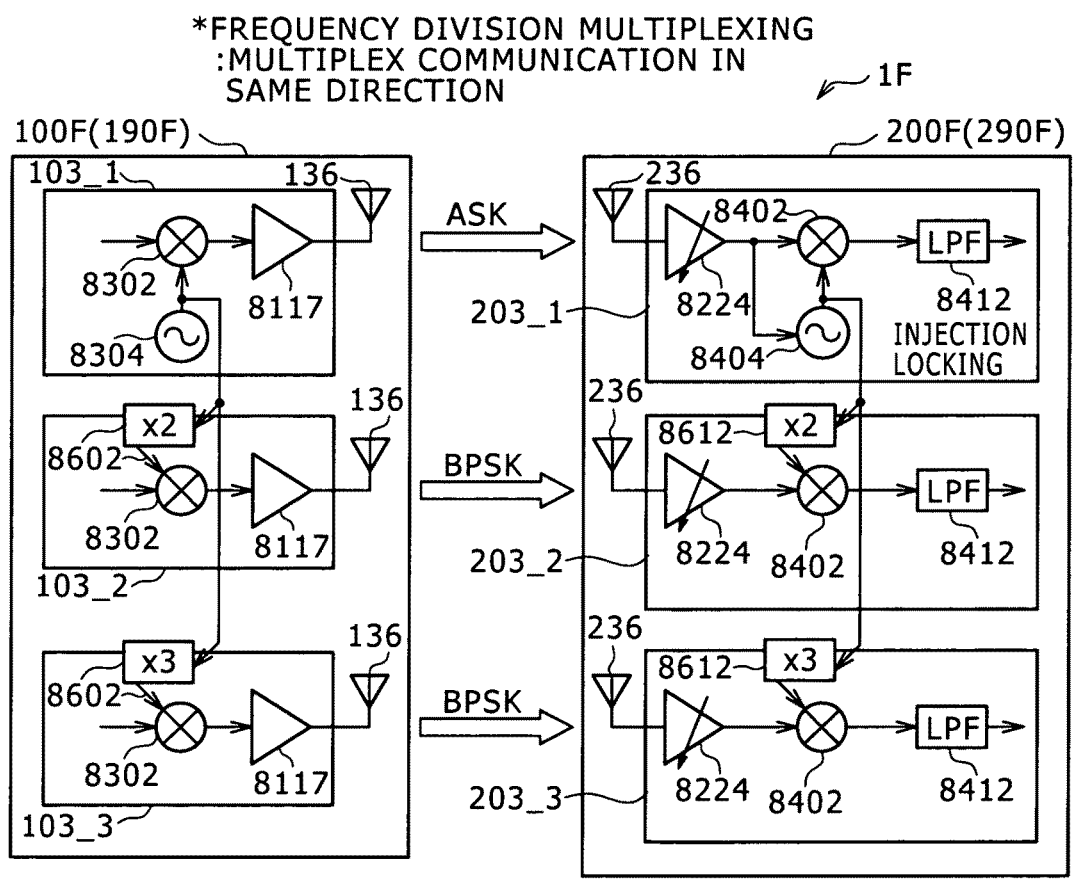
FIG. 26 is a diagram showing a wireless transmission system according to a third example of the fifth embodiment.
Figure 27:
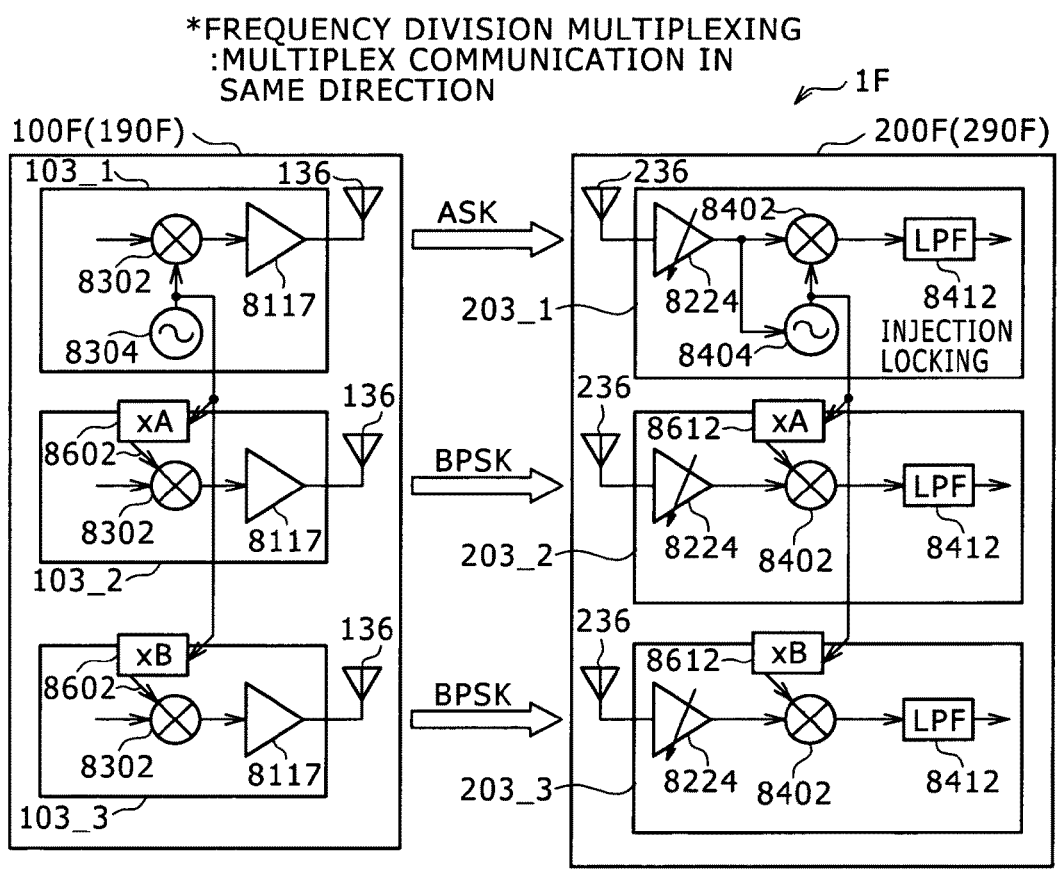
FIG. 27 is a diagram showing a wireless transmission system according to a fourth example of the fifth embodiment.

FIGS. 24 to 27 show a wireless transmission system of a fifth embodiment. Here, a first example shown in FIG. 24 is a modification to the first example of the third embodiment. A second example shown in FIG. 25 is a modification to the second example of the third embodiment. A third example shown in FIG. 26 is a modification to the first example shown in FIG. 24 wherein the carrier frequency has a relationship of m times, that is, an integral number of times, to that for injection locking. Further, the third example shown in FIG. 26 includes three sets for 1:1 signal transmission and reception. A fourth example shown in FIG. 27 is a modification to the second example shown in FIG. 25 wherein the carrier frequency does not have a relationship of m times, that is, a plural number of times, that for injection locking. Further, the fourth example shown in FIG. 27 has a system configuration which includes three sets for 1:1 signal transmission and reception. Though not shown, it is possible to adopt a configuration wherein antennas (and amplifiers) are integrated into a single channel as in the case of the third example of the third embodiment.

In the wireless transmission system 1F of the fifth embodiment, where both of the transmission side and the reception side use a plurality of channels, one channel adopts the ASK modulation while, on both of the transmission side and the reception side, the other channels adopt a modulation method other than the ASK and injection locking is applied to the channel of the ASK while the remaining channels use a carrier signal synchronized with the carrier signal generated by the local oscillator 8304 or 8404 to carry out modulation or demodulation on both of the transmission side and the reception side. Further, similarly to the third embodiment, the wireless transmission system 1F applies not space division multiplexing but frequency division multiplexing to achieve multi-channeling.

While the fifth embodiment has a general system configuration same as that of the third embodiment, as can be recognized from contrast between them, the fifth embodiment is different from the third embodiment in that not any modulation may be used for each channel but the ASK method is adopted only for the injection locking while a modulation method other than the ASK method, here, the BPSK method, is used for the remaining channels. Except the difference, the fifth embodiment is similar to the third embodiment, and therefore, overlapping description thereof is omitted herein to avoid redundancy.

[Power Reduction Effect]

Figure 28A:
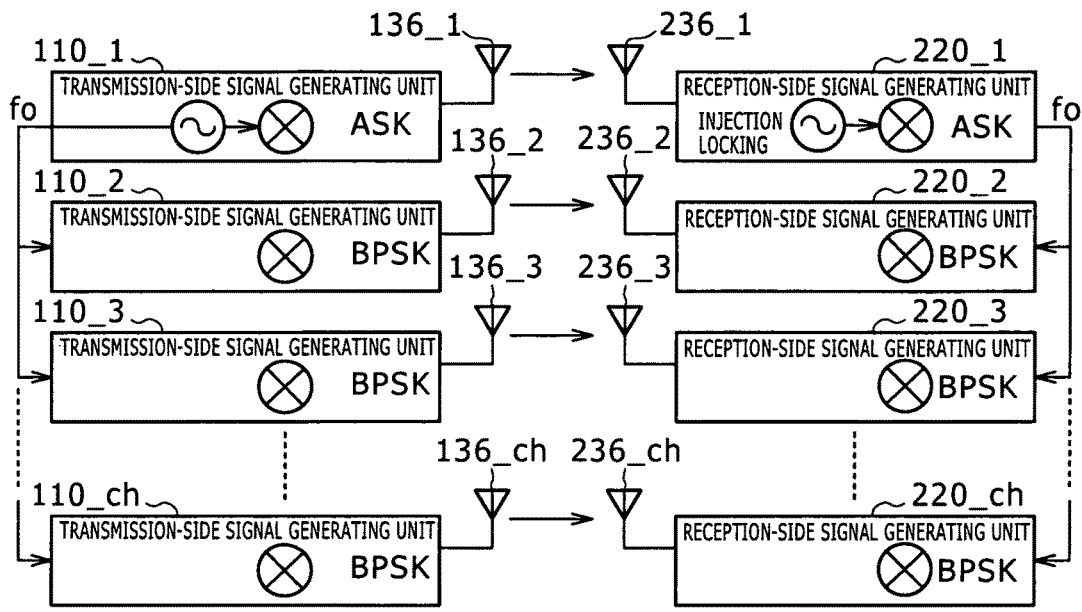
FIGS. 28A and 28B are diagrams illustrating a power reduction effect by the wireless transmission systems of the fourth and fifth embodiments.
Figure 28B:
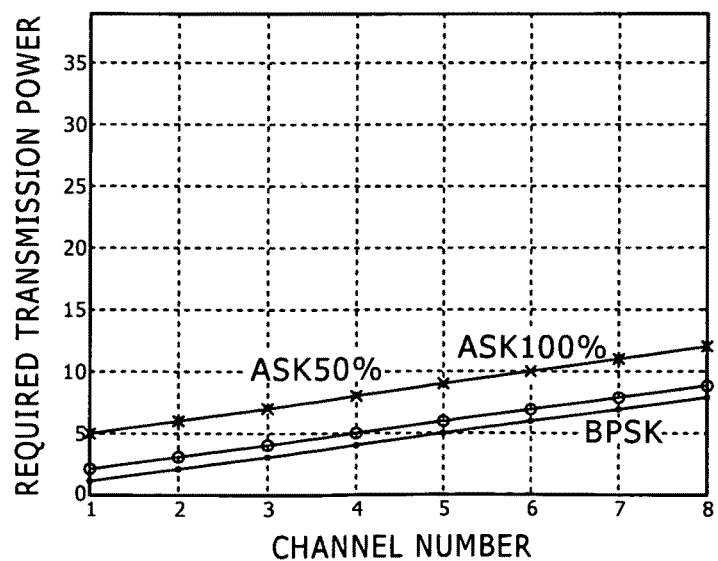

FIGS. 28A and 28B illustrate a power reduction effect by the wireless transmission systems 1E and 1F of the fourth and fifth embodiments. Here, as shown in FIG. 28A which is same as FIG. 21B, one channel uses the ASK for transmission and the other channels use the BPSK, whose transmission power is lower, for transmission.

In the fourth and fifth embodiments, an increasing amount of transmission power per one channel when multi-channeling is applied is equal to an increasing amount in the case of the BPSK, and the difference in required transmission power does not increase. Consequently, when multiplex transmission is carried out by space division multiplexing or frequency division multiplexing, increase of the required transmission power can be suppressed while the advantages of the injection locking method are made the most of.

<Modification to Fourth and Fifth Embodiments>

Figure 29:
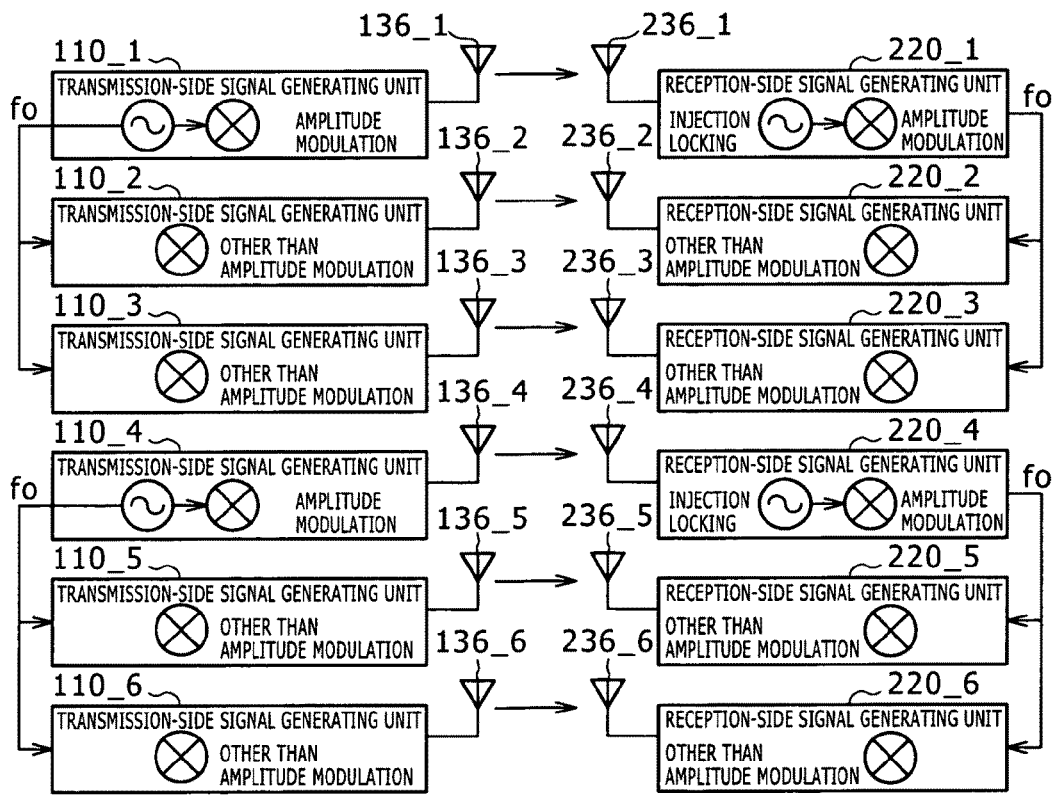
FIG. 29 is a diagram illustrating a modification to the system according to the fourth and fifth embodiments.

FIG. 29 illustrates a modification corresponding to fourth and fifth embodiments. In this modification, upon multiplexing transmission, "although amplitude modulation is not applied to all channels, not one but a plurality of channels adopt amplitude modulation."

While, in the fourth and fifth embodiments, upon multiplexing transmission, only one channel adopts the amplitude modulation method and all of the remaining channels adopt any other than the amplitude modulation method, this is not essential. In short, only it is necessary for the number of channels which adopt the amplitude modulation method to be smaller than the total number of channels upon multiplexing transmission, and those transmission channels which do not adopt the amplitude modulation method may adopt a method other than the amplitude modulation method such as a phase modulation method such as, for example, the PSK or an amplitude phase modulation method such as, for example, the QAM which requires lower transmission power than the amplitude modulation method. In particular, where the total number of channels is represented by S and the number of those channels which adopt the amplitude modulation method by T, a system configuration which satisfies the relationship of S>T should be adopted, and for the remaining "S−T" transmission channels, any other modulation method than the amplitude modulation method which requires lower transmission power than the amplitude modulation method should be adopted. Also in this instance, the system has the configuration wherein, "upon multiplexing transmission, not all channels adopt the amplitude modulation but some channel adopts a modulation method whose required transmission power is lower than that of the amplitude modulation method such as phase modulation or amplitude phase modulation."

For example, in the configuration shown in FIG. 29, six channels are divided into two groups of 3 channels, and from among the first to third channels, that is, from among channels having reference characters _1 to _3, only one channel, that is, the channel of the reference character _1, is ready for the amplitude modulation method (the ASK method, in digital) and injection locking. On the other hand, from among the fourth to sixth channels, that is, from among channels having reference characters _4 to _6, only one channel, that is, the channel of the reference character _4, is ready for the amplitude modulation method (the ASK method, in digital) and injecting locking. The remaining channels which do not adopt the amplitude modulation method adopt a method other than the amplitude modulation method (such as the BPSK method, in digital) which requires lower required transmission power than that of the amplitude modulation method.

In the present example, preferably the transmission-side signal generating units 110 of the first to third channels on the transmission side have a one-chip configuration wherein they are accommodated in the same chip, and preferably the transmission-side signal generating units 110 of the fourth to sixth channels have a one-chip configuration wherein they are accommodated in the same chip. Also on the corresponding reception side, preferably the reception-side signal generating units 220 of the first to third channels have a one-chip configuration wherein they are accommodated in the same chip, and preferably the reception-side signal generating units 220 of the fourth to sixth channels have a one-chip configuration wherein they are accommodated in the same chip. Naturally, such configurations are not essential.

In order to make the number of those channels which adopt an amplitude modulation method such as, for example, the ASK which requires high required transmission power smaller than the total number of channels to reduce the total required transmission power upon multiplexing transmission, it is an optimum configuration that only one of the channels has the amplitude modulation method. However, for example, where use together with the injection locking method is considered, if the wiring line length for a recovered carrier signal for carrying out simultaneous detection based on a recovered carrier signal acquired by injection locking in another channel is taken into account, the configuration that only one channel uses the ASK method and has an injection locking circuit may not possibly be appropriate in terms of the layout. In such a case, the configuration shown in FIG. 29 is effective.

<Phase Correction Unit>

FIGS. 30A to 32B illustrate phase uncertainty which occurs when the relationship of the carrier frequencies of the channels is not m times, that is, not a plural number of times, in the third embodiment or the fifth embodiment wherein frequency division multiplexing is applied and a phase correction unit 8630 provided as a countermeasure against the phase uncertainty.

[Phase Uncertainty]

FIGS. 30A to 31B illustrate a relationship of the carrier frequencies of the channels and a relationship of presence or absence of occurrence of the phase uncertainty in the third embodiment or the fifth embodiment wherein frequency division multiplexing is applied.

When the relationship of the carrier frequencies of the channels is set to m times, that is, to a plural number of times, the lowest frequency in all channels is used for injection locking. Accordingly, the remaining channels use frequencies equal to integral numbers of times the lowest frequency. In short, in this instance, the reception side local oscillator 8404 is injection-locked with a low frequency, and the remaining higher frequencies are produced from the synchronized low frequency by the auxiliary carrier signal generator 8612.

Figure 30A:
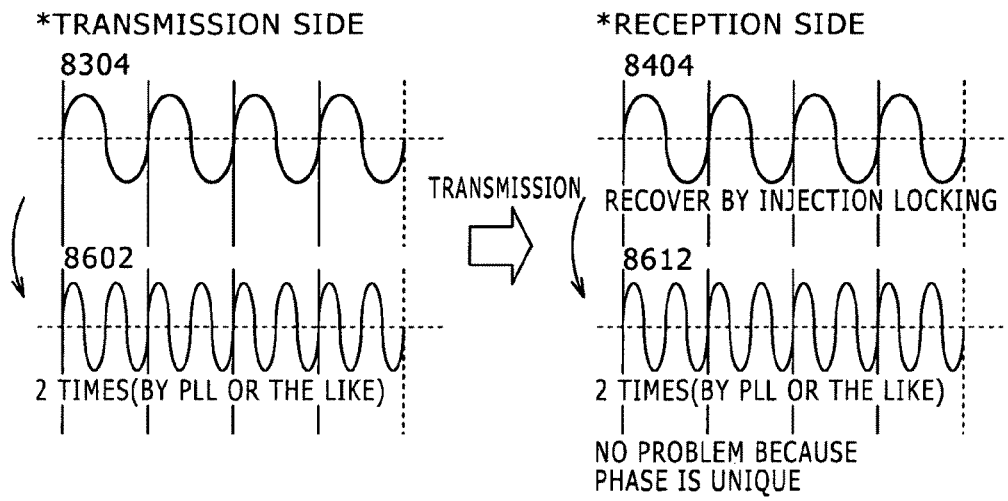
FIGS. 30A and 30B are waveform diagrams illustrating a relationship between a carrier frequency relationship in an m-time state and a 1/n-time state of channels in the third or fifth embodiment in which the frequency division multiplexing is applied and the phase uncertainty.

For example, FIG. 30A illustrates the relationship of the carrier frequencies of the channels which it is two times as an example of m times. In the case of the relationship of the carrier frequencies of the channels illustrated in FIG. 30A, a carrier signal of a frequency equal to two times is generated by the auxiliary carrier signal generator 8612. In this instance, since the phase is unique, the problem of uncertainty does not arise.

On the other hand, where the relationship of the carrier frequencies of the channels is set to 1/n time, that is, to an integral submultiple, the highest frequency in all channels is used for injection locking. Accordingly, the remaining channels use frequencies equal to integral submultiples of the highest frequency. In short, in this instance, the reception side local oscillator 8404 uses a high frequency for injection locking, and for the remaining channels, the auxiliary carrier signal generator 8612 generates lower frequencies from the synchronized high frequency. In this instance, n choices are available with regard to how to take a phase, and besides, information regarding which one of the choices should be selected is not available. Therefore, the problem of uncertainty arises on the reception side.

Figure 30B:
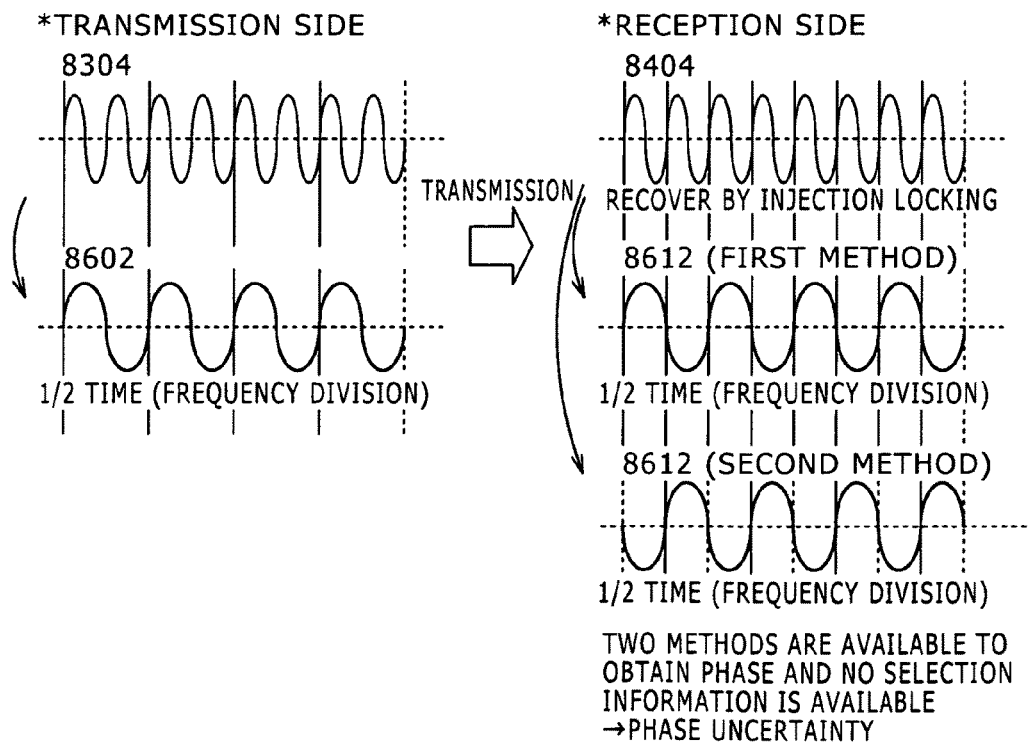

For example, FIG. 30B illustrates the relationship of the carrier frequencies of the channels when it is 1/2 time as an example of 1/n time. In the case of the relationship of the carrier frequencies of the channels illustrated in FIG. 30B, since a carrier signal of a frequency equal to 1/2 time is generated by the auxiliary carrier signal generator 8612, two choices are available with regard to how to take a phase, and besides, information regarding which one of the choices should be selected is not available. Therefore, the problem of uncertainty arises on the reception side.

Also when the relationship of the carrier frequencies of the channels is set to m/n times, a plurality of choices are available with regard to how to take a phase similarly as in the case wherein the relationship of the carrier frequencies of the channels is set to 1/n time, that is, to an integral submultiple. Besides, information regarding which one of the choices should be selected is not available. Therefore, the problem of uncertainty arises on the reception side.

Figure 31A:
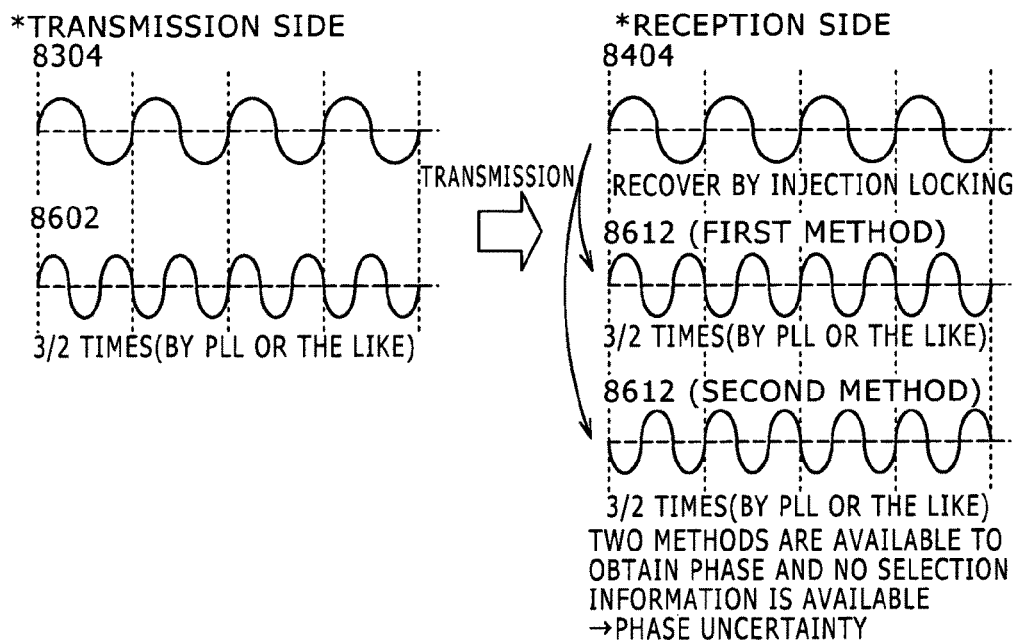
FIGS. 31A and 31B are waveform diagrams illustrating a relationship between a carrier frequency relationship in an m/n-time state of channels in the third or fifth embodiment in which the frequency division multiplexing is applied and the phase uncertainty.

For example, FIG. 31A illustrates the relationship of the carrier frequencies of the channels when it is 3/2 times as an example of m/n times (m>n). In the case of the relationship of the carrier frequencies of the channels illustrated in FIG. 31A, since a carrier signal of a frequency equal to 3/2 times is generated by the auxiliary carrier signal generator 8612, two choices are available with regard to how to take a phase as seen in FIG. 31A. Besides, information regarding which one of the two choices should be selected is not available. Therefore, the problem of uncertainty arises on the reception side.

Figure 31B:
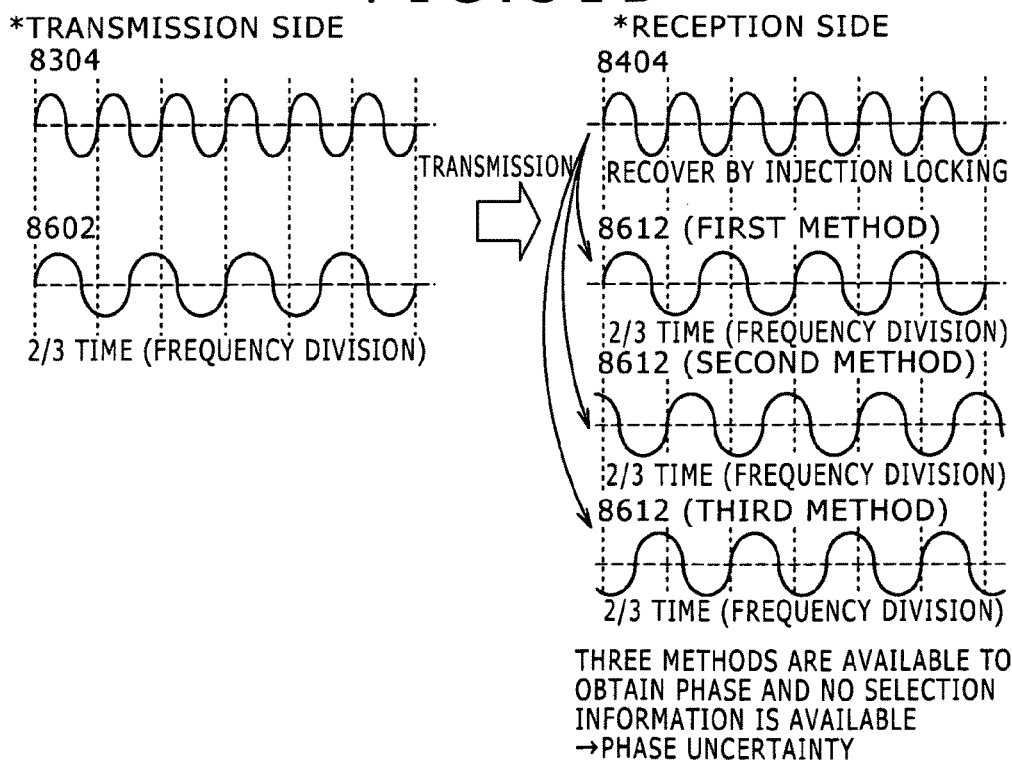

Meanwhile, FIG. 31B illustrates the relationship of the carrier frequencies of the channels when it is 2/3 times as an example of m/n times (m<n). In the case of the relationship of the carrier frequencies of the channels illustrated in FIG. 31B, since a carrier signal of a frequency equal to 2/3 times is generated by the auxiliary carrier signal generator 8612, three choices are available with regard to how to take a phase as seen in FIG. 31B. Besides, information regarding which one of the three choices should be selected is not available. Therefore, the problem of uncertainty arises on the reception side.

[Countermeasure Circuit Against the Phase Uncertainty]

Figure 32A:
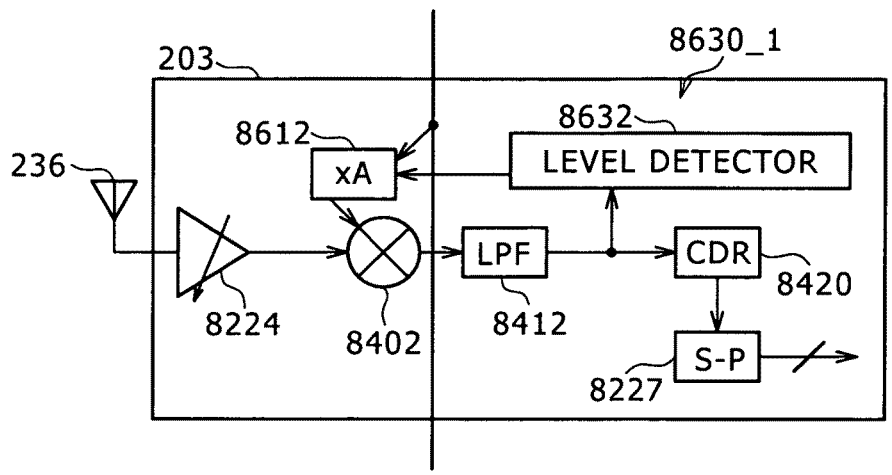
FIGS. 32A and 32B are diagrams showing examples of a configuration of the phase correction unit provided as a countermeasure against the phase uncertainty.
Figure 32B:
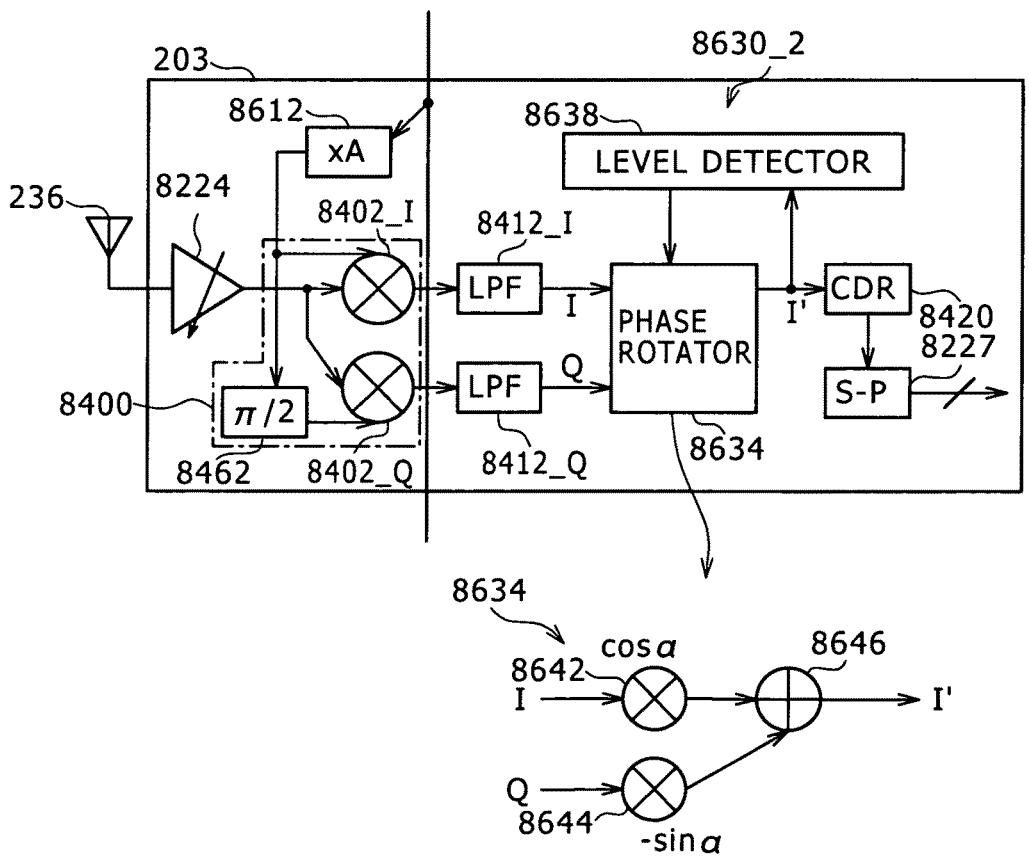

FIGS. 32A and 32B show examples of a configuration of the phase correction unit 8630 provided as a countermeasure against the phase uncertainty. Here, description is given of a case wherein one modulation axis as in the BPSK described hereinabove as a particular example in the description of the fourth and fifth embodiments is used.

A first example shown in FIG. 32A includes a phase correction unit 8630_1 of a first example at the succeeding stage to the low-pass filter 8412. The phase correction unit 8630_1 of the first example has a level detector 8632 for detecting the amplitude level of an output signal of the low-pass filter 8412. The phase correction unit 8630_1 controls the auxiliary carrier signal generator 8612, which is configured, for example, from a PLL, so that the amplitude level detected by the level detector 8632 may have a maximum value thereby to vary the phase of an output signal of the auxiliary carrier signal generator 8612 which is a carrier signal to the frequency mixer 8402.

A second example shown in FIG. 32B includes the demodulation functional unit 8400 whose detection method is changed to an quadrature detection method and further includes a phase correction unit 8630_2 of a second example at the succeeding state to the quadrature detection circuit. The demodulation functional unit 8400 includes a frequency mixer 8402_I for demodulating an I axis component, a frequency mixer 8402_Q for demodulating a Q axis component and a phase shifter 8462 for shifting the phase of a recovered carrier signal generated by the auxiliary carrier signal generator 8612 by 90 degrees or n/2, from which an quadrature detection circuit is configured. A recovered carrier signal generated by the auxiliary carrier signal generator 8612 is supplied to the frequency mixer 8402_I. Further, the recovered carrier signal generated by the auxiliary carrier signal generator 8612 is supplied to the frequency mixer 8402_Q after the phase thereof is shifted by n/2 by the phase shifter 8462.

A low-pass filter 8412_I for an I axis component is provided at the succeeding stage to the frequency mixer 8402_I, and a low-pass filter 8412_Q for a Q axis component is provided at the succeeding stage to the frequency mixer 8402_Q.

The phase correction unit 8630_2 includes a phase rotator 8634 for carrying out a phase rotating process using outputs (I, Q) of the low-pass filters 8412_I and 8412_Q of the quadrature detection, and a level detector 8638 for detecting the amplitude level of an output signal of the phase rotator 8634.

The phase rotator 8634 includes a first phase shifter 8642 (cos α) for adjusting the phase rotation amount α for an I axis component by gain adjustment for a signal I of the I axis component, a second phase shifter 8644 (−sin α) for adjusting the phase rotation amount α for a Q axis component by gain adjustment for a signal Q of the Q axis component, and a signal combiner 8646 for combining output signals of the phase shifters 8642 and 8644. An output signal I' of the phase rotator 8634, that is, of the signal combiner 8646, is a final demodulation signal.

The phase correction unit 8630_2 rotates the phase of the output signal by means of the phase rotator 8634 using the quadrature detection outputs (I, Q), and the resulting output, that is, the I' component, is detected by the level detector 8638. The level detector 8638 controls the phase rotator 8634 to vary the rotation amount so that the detected amplitude level of the input signal may be maximized.

Here, if the first and second examples are compared with each other in regard to the phase correction unit 8630, the first example is simpler in circuit configuration. On the other hand, while, in the first example, a plurality of phases are changed over by a high frequency circuit, in the second example, a plurality of phases are changed over by a baseband circuit. Therefore, the second example is more advantageous in terms of the difficulty.

<Applications>

In the following, product forms to which the wireless transmission systems 1 of the first to fifth embodiments described hereinabove are applied are described.

FIRST EXAMPLE

FIGS. 33A to 33E show a product form of a first example to which the wireless transmission system 1 of the present embodiment is applied. The product form of the first example is an application where signal transmission is carried out using a millimeter wave in a housing of one electronic apparatus. The electronic apparatus in this instance is an image pickup apparatus which incorporates a solid-state image pickup device.

The first communication device 100 or the semiconductor chip 103 thereof is mounted on a main board 602 which carries out signal transmission to and from a image pickup board 502 on which a solid-state image pickup device 505 is incorporated, and the second communication device 200 or the semiconductor chip 203 thereof is mounted on the image pickup board 502. The signal generators 107 and 207 and transmission path couplers 108 and 208 are provided on the semiconductor chips 103 and 203, respectively.

The solid-state image pickup device 505 and the image pickup driving unit correspond to an application functional unit of the LSI functional unit 204 in the wireless transmission system 1. An image processing engine corresponds to the application functional unit of the LSI functional unit 104 in the wireless transmission system 1, and an image processor for processing image pickup signal obtained by the solid-state image pickup device 505 is accommodated in the image processing engine.

A signal generator 207 and a transmission path coupler 208 are mounted on the image pickup board 502 in addition to the solid-state image pickup device 505 so as to implement the wireless transmission system 1. Similarly, a signal generator 107 and a transmission path coupler 108 are mounted on the main board 602 so as to implement the wireless transmission system 1. The transmission path coupler 208 on the image pickup board 502 side and the transmission path coupler 108 on the main board 602 side are coupled to each other by a millimeter wave signal transmission path 9. Consequently, signal transmission in the millimeter waveband is carried out bidirectionally between the transmission path coupler 208 on the image pickup board 502 side and the transmission path coupler 108 on the main board 602 side.

Figure 33A:
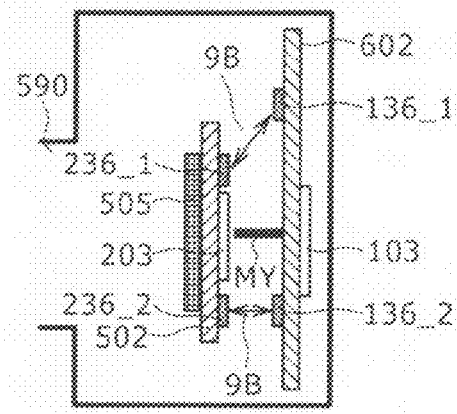
FIGS. 33A to 33E are schematic views showing a product form of a first example to which the wireless transmission system is applied.
Figure 33B:
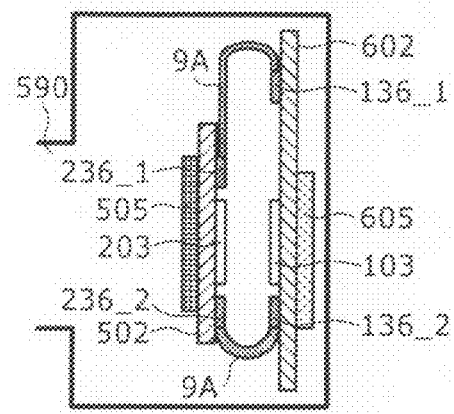
Figure 33C:
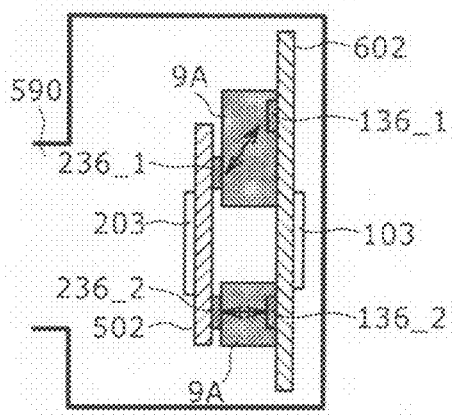
Figure 33D:
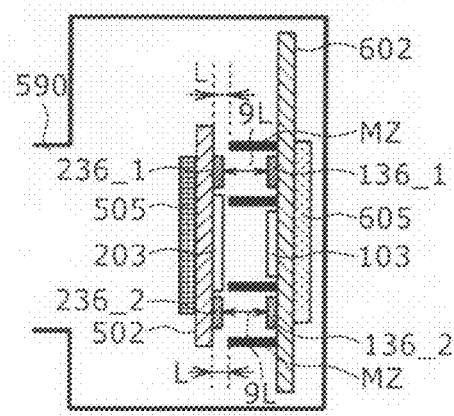
Figure 33E:
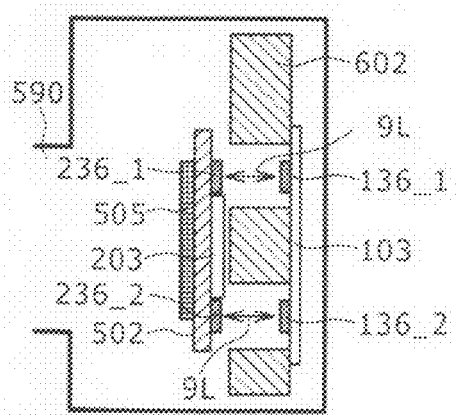

Although each millimeter wave signal transmission path 9 may be the free space transmission path 9B as shown in FIG. 33A, it preferably is formed as such a dielectric transmission path 9A as shown in FIG. 33B or 33C or as such a hollow waveguide 9L as shown in FIG. 33D or 33E.

By applying any of the first to fifth embodiments described hereinabove, for example, the first communication channel between the antennas 136_1 and 236_1 adopts the ASK method, and the reception side adopts the injection locking method. Meanwhile, in the second communication channel between the antennas 136_2 and 236_2, the BPSK method is adopted, and without adopting the injection locking, demodulation is carried out by synchronous detection based on a carrier signal obtained by the injection locking method on the reception side of the first communication channel. In short, the first communication channel applies the ASK which can easily adopt the injection locking while the second communication channel applies the BPSK with which transmission power reduction can be achieved but does not adopt the injection locking. Consequently, in millimeter wave transmission within an apparatus, the required transmission power can be reduced in comparison with that in an alternative case wherein the ASK is adopted by the two channels, and besides the circuit scale can be reduced in comparison with that in an alternative case wherein an injection locking circuit is provided in all channels.

SECOND EXAMPLE

Figure 34A:
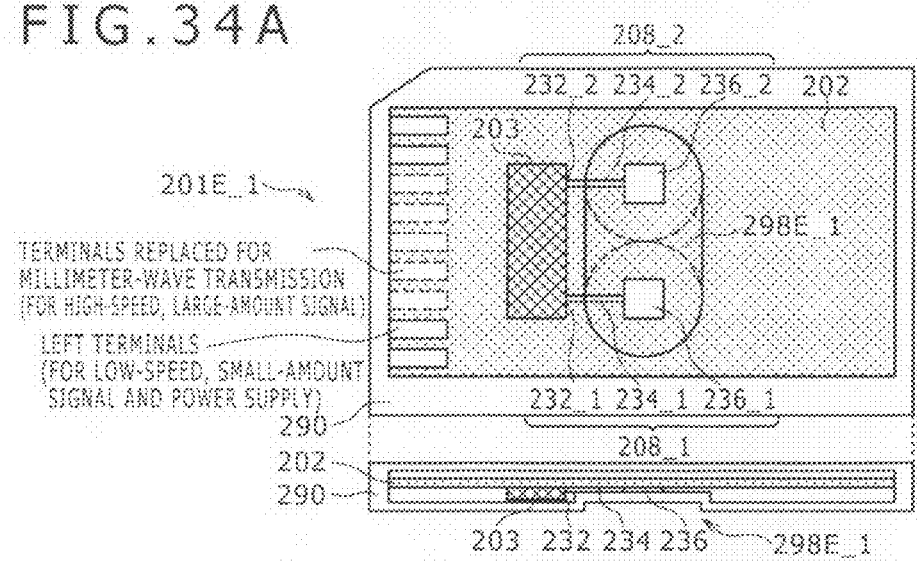
FIGS. 34A to 34C are schematic views showing a product form of a second example to which the wireless transmission system is applied.
Figure 34B:
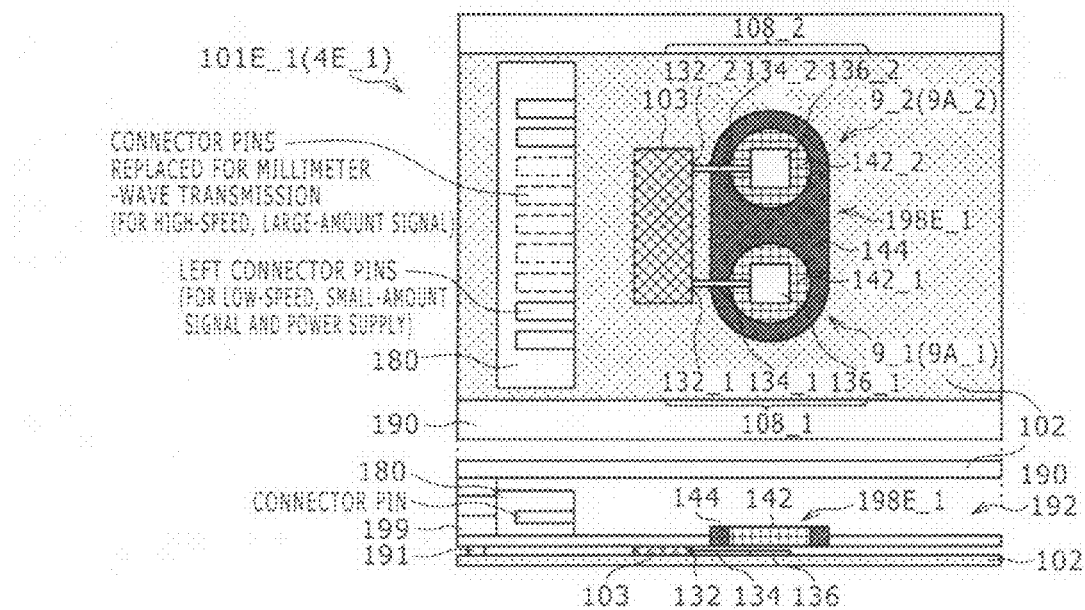
Figure 34C:
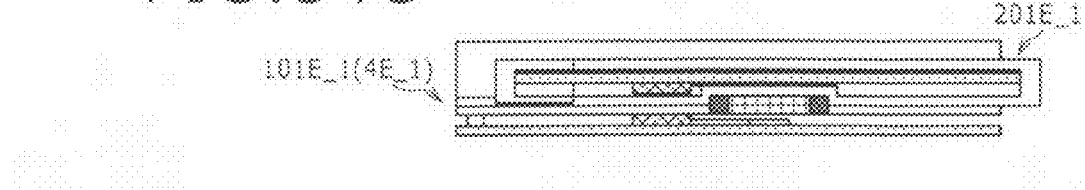

FIGS. 34A to 34C show a product form of a second example to which the wireless transmission system 1 of the present embodiment is applied. The product form of the second example is an application wherein signal transmission is carried out using a millimeter wave between a plurality of electronic apparatus which are in an integrated state. For example, one of the electronic apparatus may be mounted on the other electronic apparatus, for example, on the main frame side.

For example, a card type information processing device whose representative example is an IC card or a memory card in which a central processing unit (CPU), a nonvolatile memory device such as, for example, a flash memory and so forth are built is removably mounted on an electronic apparatus on the main frame side. The card type information processing device which is an example of a first electronic apparatus is hereinafter referred to also as "card type device," and the other electronic apparatus on the main frame side may be hereinafter referred to simply as electronic apparatus.

A slot structure 4E between an electronic apparatus 101E and a memory card 201E is a structure for removably mounting the memory card 201E on the electronic apparatus 101E and has a function as a fixation unit for the electronic apparatus 101E and the memory card 201E.

In the present example, since a plurality of sets of transmission path couplers 108 and 208 are used and a plurality of channels of millimeter wave signal transmission paths 9 are provided, also the millimeter wave transmission structure has a countermeasure for the plural channels of the millimeter wave signal transmission paths 9. The slot structure 4E_1 and the memory card 201E_1 have a plurality of channels each including a millimeter wave signal transmission path 9, which is a dielectric transmission path 9A, a millimeter wave transmission/reception terminal 232, a millimeter wave transmission path 234 and antennas 136 and 236. In the slot structure 4E_1 and the memory card 201E_1, the antennas 136 and 236 are disposed on the same board face and are juxtaposed horizontally. Consequently, a full duplex transmission system which carries out millimeter wave transmission for transmission and reception independently of each other is implemented.

An example of a structure of the electronic apparatus 101E_1 is shown as an opened-up plan view and an opened-up sectional view in FIG. 34B. On the semiconductor chip 103, millimeter wave transmission/reception terminals 132_1 and 132_2 for coupling to millimeter wave signal transmission paths 9_1 and 9_2, that is, dielectric transmission paths 9A_1 and 9A_2, are provided at positions spaced from each other. On one of the faces of the board 102, millimeter wave transmission paths 134_1 and 134_2 and antennas 136_1 and 136_2 connected to the millimeter wave transmission/reception terminals 132_1 and 132_2, respectively, are formed. The millimeter wave transmission/reception terminal 132_1, millimeter wave transmission path 134_1 and antenna 136_1 configure a transmission path coupler 108_1, and the millimeter wave transmission/reception terminal 132_2, millimeter wave transmission path 134_2 and antenna 136_2 configure another transmission path coupler 108_2.

Meanwhile, on the housing 190, two channels of cylindrical dielectric waveguide pipes 142_1 and 142_2 are disposed in parallel as a convex configuration 198E_1 such that they correspond to the antennas 136_1 and 136_2, respectively. The two channels of the dielectric waveguide pipes 142_1 and 142_2 are formed cylindrically in a conductor 144 formed as a unitary member and configure dielectric transmission paths 9A_1 and 9A_2, respectively. The conductor 144 prevents millimeter wave interference between the two channels of the dielectric transmission paths 9A_1 and 9A_2.

An example of a structure of the memory card 201E_1 is shown as an opened-up plan view and an opened-up sectional view in FIG. 34A. On the semiconductor chip 203 on a board 202, millimeter wave transmission/reception terminals 232_1 and 232_2 for coupling to a plurality of, two in FIG. 34A, channels of millimeter wave signal transmission paths 9_1 and 9_2, that is, dielectric transmission paths 9A_1 and 9A_2, are provided at positions spaced from each other. On one of the faces of the board 202, millimeter wave transmission paths 234_1 and 234_2 and antennas 236_1 and 236_2 connected to the millimeter wave transmission/reception terminals 232_1 and 232_2, respectively, are formed. The millimeter wave transmission/reception terminal 232_1, millimeter wave transmission path 234_1 and antenna 236_1 configure a transmission path coupler 208_1, and the millimeter wave transmission/reception terminal 232_2, millimeter wave transmission path 234_2 and antenna 236_2 configure another transmission path coupler 208_2.

On the memory card 201E_1, a concave configuration 298E_1 having a shape corresponding to a sectional shape of the convex configuration 198E_1, that is, the conductor 144, on the electronic apparatus 101E_1 side is connected to a housing 290. The concave configuration 298E_1 secures the memory card 201E_1 to the slot structure 4E_1 and positions the memory card 201E_1 for coupling for millimeter wave transmission to the dielectric transmission paths 9A_1 and 9A_2 provided on the slot structure 4E_1 similarly to the millimeter wave transmission structure in the first example.

While both of the millimeter wave signal transmission paths 9_1 and 9_2 here are formed as the dielectric transmission path 9A, for example, one of the millimeter wave signal transmission paths 9_1 and 9_2 may be formed as a free space transmission path or a hollow waveguide or both of them may be formed as a free space transmission path or a hollow waveguide.

In the present example, since space division multiplexing makes it possible to use the same frequency band at the same time, the communication speed can be raised and the simultaneity of bidirectional communication wherein signal transmission is carried out at the same time in the opposite directions can be secured. Since a plurality of millimeter wave signal transmission paths 9_1 and 9_2, that is, dielectric transmission paths 9A_1 and 9A_2, are configured, full duplex transmission can be achieved and enhancement in efficiency in data transmission and reception can be achieved.

Particularly in the present configuration example, since a fitting structure, that is, the slot structure 4A, is utilized to construct the millimeter wave signal transmission path 9, in the present example, the dielectric transmission path 9A, of a millimeter wave confining structure, that is, of a waveguide structure, no influence of reflection by a housing or other members is had, and a millimeter wave signal radiated from one antenna 136 can be transmitted to the other antenna 236 side while being confined to the dielectric transmission path 9A. Therefore, since waste of the radiated radio wave is reduced, also where the injection locking method is applied, the transmission power can be reduced.

While, also in the present second example, the first to fifth embodiments described hereinabove are applied, space division multiplexing is applied here to carry out multiplex transmission. For example, in the first channel between the antennas 136_1 and 236_1, the ASK method is adopted, and the injection locking method is adopted on the reception side. On the other hand, in the second communication channel between the antennas 136_2 and 236_2, the BPSK method is used and, without adopting the injection locking, demodulation is carried out by synchronous detection based on a carrier signal obtained by the injection locking method on the reception side of the first communication channel. In short, in the first communication channel, the ASK in which injection locking can be applied readily is adopted, but in the second communication channel, the BPSK by which reduction of the transmission power can be anticipated is adopted while no injection locking is applied. Consequently, in millimeter wave multiplex transmission between different apparatus having a mounting mechanism, the required transmission power can be reduced in comparison with that in an alternative case wherein the ASK is applied to both channels, and the circuit scale can be reduced in comparison with that in an alternative case wherein an injection locking circuit is provided in all channels.

THIRD EXAMPLE

Figure 35A:
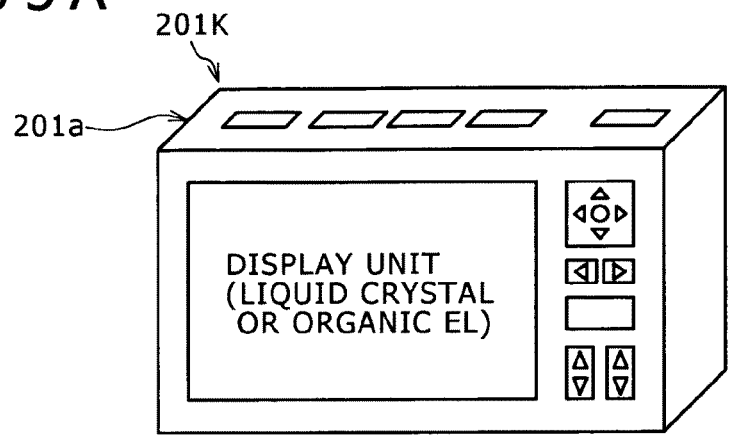
FIGS. 35A to 35C are schematic views showing a product form of a third example to which the wireless transmission system is applied.
Figure 35B:
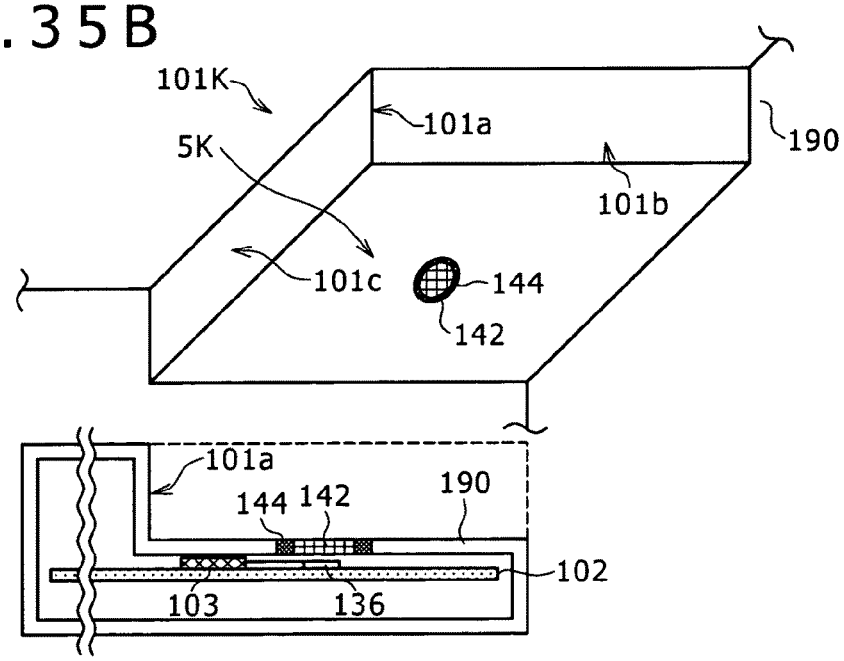
Figure 35C:
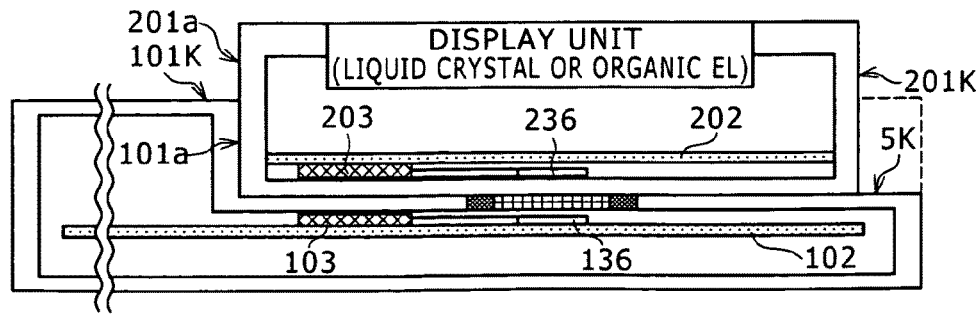

FIGS. 35A to 35C show a product form of a third example to which the wireless transmission system 1 of the present embodiment is applied, and particularly show an electronic apparatus of a modified form. Referring to FIGS. 35A to 35C, The wireless transmission system 1 includes a portable image reproduction apparatus 201K as an example of a first electronic apparatus and includes an image acquisition apparatus 101K as an example of a second electronic apparatus on the main frame side on which the image reproduction apparatus 201K is mounted. On the image acquisition apparatus 101K, a receiving table 5K on which the image reproduction apparatus 201K is to be mounted is provided at part of the housing 190. It is to be noted that the receiving table 5K may be replaced by the slot structure 4 as in the second example. The wireless transmission system 1 is similar to that of the product form of the second example in that signal transmission is carried out by wireless in the millimeter waveband between the two electronic apparatus where one of the electronic apparatus is mounted on the other one of the electronic apparatus. In the following, differences of the third example from the second example are described.

The image acquisition apparatus 101K has a substantially parallelepiped or box-like shape and cannot be regarded as a card type device. The image acquisition apparatus 101K may be any apparatus which acquires, for example, moving picture data and may be, for example, a digital recording and reproduction apparatus or a ground wave television receiver. The image reproduction apparatus 201K includes, as an application functional unit 205, a storage device for storing moving picture data transmitted thereto from the image acquisition apparatus 101K side and a functional unit which reads out moving picture data from the storage device and reproduces moving pictures on a display unit such as, for example, a liquid crystal display unit or an organic EL display unit. In regard to the structure, it may be considered that a memory card 201A is replaced by the image reproduction apparatus 201K and an electronic apparatus 101A is replaced by the image acquisition apparatus 101K.

A semiconductor chip 103 is accommodated in a lower housing 190 of the receiving table 5K similarly, for example, as in the second example of the millimeter wave product shown in FIGS. 34A to 34C, and an antenna 136 is provided at a certain position. A dielectric waveguide pipe 142 is provided at a portion of the housing 190 opposing to the antenna 136. The dielectric waveguide pipe 142 has an internal transmission path formed as a dielectric transmission path 9A configured from a dielectric material and is surrounded on an outer periphery thereof by a conductor 144. It is to be noted that it is not essential to provide the dielectric waveguide pipe 142, that is, the dielectric transmission path 9A, and the dielectric material of the housing 190 may be used as it is to form the millimeter wave signal transmission path 9. Those points are similar to those of the other structure examples described hereinabove. It is to be noted that, as described in the description of the second example, a plurality of antennas 136 may be juxtaposed on a plane and, before actual signal transmission, a millimeter signal for inspection may be signaled from the antenna 236 of the image reproduction apparatus 201K such that one of the antennas 136 which exhibits the highest reception sensitivity is selected.

In the housing 290 of the image reproduction apparatus 201K mounted on the receiving table 5K, a semiconductor chip 203 is accommodated and an antenna 236 is provided at a certain position similarly as in the second example of the millimeter wave product form described hereinabove with reference to FIGS. 34A to 34C. At a portion of the housing 290 which opposes to the antenna 236, a millimeter wave signal transmission path 9, that is, a dielectric transmission path 9A, is configured from a dielectric material. Those points are similar to those of the millimeter wave product of the second example.

By such a configuration as described above, when the image reproduction apparatus 201K is mounted on the receiving table 5K, it can be positioned for millimeter wave signal transmission. While the housings 190 and 290 are sandwiched between the antennas 136 and 236, since they are made of dielectric material, the housings 190 and 290 do not have a significant influence on the millimeter wave transmission.

The millimeter wave product form of the first example adopts not a fitting structure but a wall face abutting method such that, when the image reproduction apparatus 201K is mounted such that it is abutted with a corner 101a of the receiving table 5K, the antenna 136 and the antenna 236 are opposed to each other. Therefore, an influence of positional displacement can be eliminated with certainty.

When the image reproduction apparatus 201K is mounted in position on the receiving table 5K, the dielectric transmission path 9A is interposed between the transmission path couplers 108 and 208, particularly between the antennas 136 and 236. By confining a millimeter wave signal to the dielectric transmission path 9A, enhancement of the efficiency of high speed signal transmission can be anticipated. No influence of reflection by the housings or some other member is had, and a millimeter wave signal radiated from the antenna 136 can be confined to the dielectric transmission path 9A and transmitted to the other antenna 236. Therefore, since waste of a radiation radio wave is reduced, even where the injection locking method is applied, the transmission power can be reduced.

Also in this third example, the first to fifth embodiments described hereinabove are applied. Here, however, frequency division multiplexing is applied to carry out multiplex transmission, and only the first communication channel adopts the ASK method and besides the reception side adopts the injection locking method. Meanwhile, in all of the remaining communication channels, the BPSK method is adopted, and without adopting the injection locking, demodulation is carried out by synchronous detection based on a carrier signal obtained by the injection locking method on the reception side of the first communication channel. In particular, the first communication channel adopts the ASK with which injection locking can be carried out readily while all of the remaining communication channels apply the BPSK with which transmission power reduction can be achieved without adopting the injection locking. Consequently, in millimeter wave multiplex transmission between different apparatus having a receiving structure, the required transmission power can be reduced in comparison with that in an alternative case wherein all channels adopt the ASK, and the circuit scale can be reduced in comparison with that in an alternative case wherein an injection locking circuit is provided in all channels.

While preferred embodiments of the present invention have been described using specific terms, the technical scope of the present invention is not limited to the scope of the description of the embodiments. Various alterations or improvements can be applied to the embodiments without departing from the subject matter of the invention, and also forms which include such alterations or improvements are included in the technical scope of the present invention.

Further, the embodiments described hereinabove do not restrict the invention as set forth in the claims, and all combinations of the characteristics described in the description of the embodiment are not necessarily essential to the subject matter of the present invention. The embodiments described above include several inventions at various stages, and various inventions can be extracted based on suitable combinations of a plurality of features disclosed herein. Even if some features are deleted from among the various features disclosed herein, the configurations which do not include the deleted features can be extracted as inventions only if the intended effects are achieved.

For example, in the embodiments described hereinabove, the ASK method is used as a representative example of a method of modulating the amplitude, and the BPSK method is used as a representative example of a method other than the method of modulating the amplitude. However, this combination of the methods is a mere example. For example, the method other than the method of modulating the amplitude may be, for example, the QPSK method or the 8PSK method which use a plurality of modulation axes.

In such modifications as just described, where the relationship of the carrier frequencies of the channels upon frequency division multiplexing is 1/n or m/n, although the phase correction unit 8630 is applied as a countermeasure against the phase uncertainty, also where the QPSK method, the 8PSK method or the like which use a plurality of modulation axes is adopted, a countermeasure against the phase uncertainty is possible.

Figure 36A:
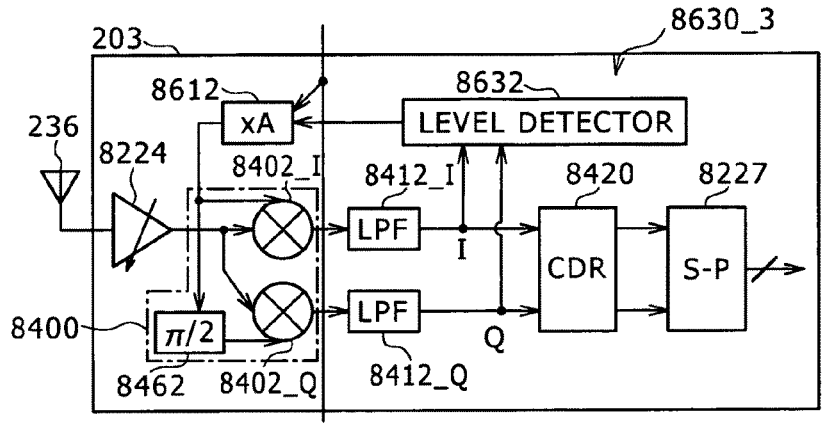
FIGS. 36A and 36B are diagrams showing a modification example (No. 1)

For example, in contrast to the first example shown in FIG. 32A, such a third example as shown in FIG. 36A may be used. First, the demodulation functional unit 8400 has a configuration similar to that described hereinabove with reference to FIG. 32B such that an quadrature detection circuit may be configured. Here, description of the configuration of the demodulation functional unit 8400 is omitted to avoid redundancy.

A phase rotator 8634 is provided at the succeeding stage to the low-pass filter 8412_I for an I-axis component and the low-pass filter 8412_Q for a Q-axis component. A clock recovering unit 8420 generates a reception data string for each of an output signal I' of an I-axis component and an output signal Q' of a Q-axis component outputted from the phase rotator 8634 and passes the generated reception data string to a serial-parallel converter 8227.

Figure 36B:
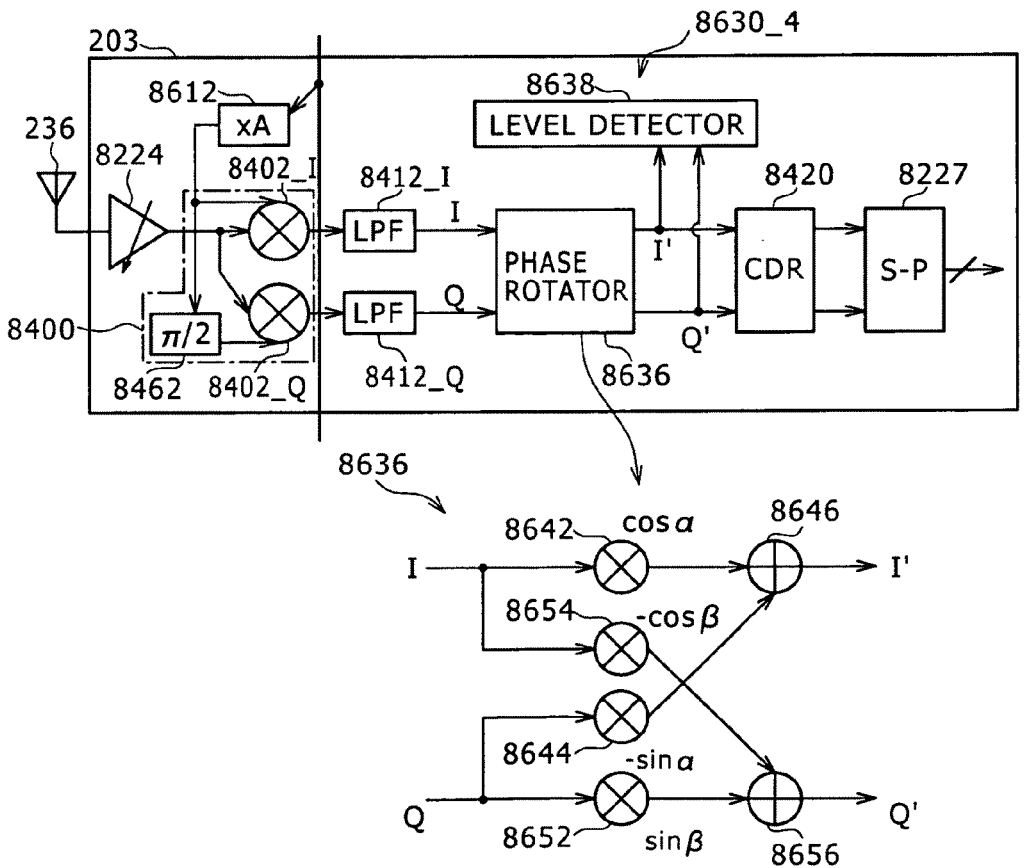

The input to a level detector 8632 of a phase correction unit 8630_3 of the third example may be any of a first configuration example which provides only an output signal of the low-pass filter 8412_I for an I-axis component, a second configuration example which provides only an output signal of the low-pass filter 8412_Q for a Q-axis component, and a third configuration example which provides both of an output signal of the low-pass filter 8412_I for an I-axis component and an output signal of the low-pass filter 8412_Q for a Q-axis component. In FIG. 36B, the third configuration example which uses both output signals is shown. Where both of the output signals are used, although the circuit scale is greater than that where only one of the outputs is used, the accuracy in adjustment is improved.

In any case, a known pattern should be transmitted for adjustment. For the known pattern, for example, where one of the output signals is used as in the first configuration example or the second configuration example, a signal only of a corresponding component should be used, but where both output signals are used as in the third configuration example, a signal of only one of the output signals, that is, a signal only of an I component or a signal only of a Q component should be used.

In the case wherein only one output signal is used, the phase correction unit 8630_3 controls the auxiliary carrier signal generator 8612, which may be configured, for example, from a PLL, so that the amplitude level detected by the level detector 8632 from the one output signal whose known pattern is transmitted for adjustment may be maximized thereby to vary the phase of the output signal of the auxiliary carrier signal generator 8612, that is, a carrier signal to the frequency mixer 8402.

On the other hand, in the case wherein both output signals are used, the phase correction unit 8630_3 should control the level detector 8632 such that, while the amplitude level detected by the level detector 8632 with regard to one component such as, for example, an I component, transmitted as the known pattern may be maximized while the amplitude level detected by the level detector 8632 with regard to the other component such as, for example, a Q component, not transmitted as the known pattern may be minimized, both amplitude levels may be balanced well. Or, attention may be paid to only one component transmitted as the known pattern such as, for example, to an I component such that the component is adjusted so that the amplitude level thereof detected by the level detector 8632 may be maximized. Or, attention may be paid to only the other component not transmitted as the known pattern such as, for example, to a Q component such that the component is adjusted so that the amplitude level thereof detected by the level detector 8632 may be minimized.

Meanwhile, in contrast to the second example shown in FIG. 32B, such a fourth example as shown in FIG. 36B may be used. Although a basic circuit configuration is similar to that of the second example shown in FIG. 32B, a phase rotator 8636 is used in place of the phase rotator 8634.

The phase rotator 8636 includes, for a channel of an I-axis component, a first phase shifter 8642, a second phase shifter 8644 and a signal combiner 8646 similarly to the second example. Meanwhile, as a configuration unique to the fourth example, a third phase shifter 8652 (sin β) for adjusting the phase rotation amount β with respect the Q-axis component by gain adjustment for the signal Q of the Q-axis component in the channel of the Q-axis component; a fourth phase shifter 8654 (−cos β) for adjusting the phase rotation amount β with respect to the I-axis component by gain adjustment for the signal I of the I-axis component and a signal combiner 8656 for combining output signals of the phase shifters 8652 and 8654 are provided. An output signal Q' of the phase rotator 8636, that is, of the signal combiner 8656, is a final demodulation signal regarding the Q-axis component.

In the phase correction unit 8630_4, the phase rotator 8636 rotates the phase of the output signal using quadrature detection outputs (I, Q), and an output of the phase rotator 8636 is detected by the level detector 8638. The level detector 8638 controls the phase rotator 8636 based on the amplitude level of the detected input signal to vary the amount of rotation.

Here, the input to the level detector 8638 of the phase correction unit 8630_4 of the fourth example may be any of a first configuration example which provides only an output signal I' for an I-axis component, a second configuration example which provides only an output signal Q' for a Q-axis component, and a third configuration example which provides both of an output signal I' for an I-axis component and an output signal Q' for a Q-axis component. In FIG. 36B, the third configuration example which uses both output signals is shown. Where both output signals I' and Q' are used, although the circuit scale is greater than that where only one of the outputs is used, the accuracy in adjustment is improved. The basic approaches just described are similar to those in the third example.

Further, if the foregoing description of the embodiments is taken into account, then, for example, the following invention is extracted in addition to the inventions according to the claims.

<Appendix 1>

A wireless transmission system, including:

a plurality of communication pairs each including a communication unit for transmission and a communication unit for reception; and a wireless signal transmission path adapted to allow wireless information transmission between the communication unit for transmission and the communication unit for reception;

a method other than a method which modulates only the amplitude being adopted as a modulation method to be used for communication between the communication unit for transmission and the communication unit for reception of each of the communication pairs, or a wireless transmission method for a wireless transmission system which includes a plurality of communication pairs each including a communication unit for transmission and a communication unit for reception, and a wireless signal transmission path adapted to allow wireless information transmission between the communication unit for transmission and the communication unit for reception, the wireless transmission method including:

a step of adopting a method other than a method which modulates only the amplitude as a modulation method to be used for communication between the communication unit for transmission and the communication unit for reception of each of the communication pairs.

Figure 37:
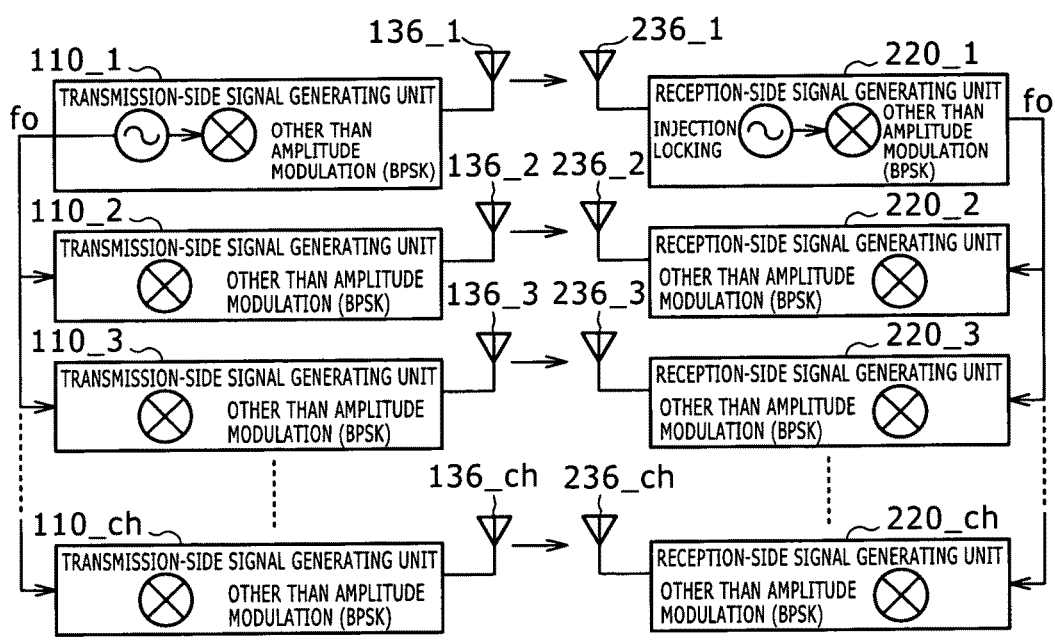
FIG. 37 is a diagram showing a modification example (No. 2).

FIG. 37 shows the configuration described in the appendix 1. According to the configuration of the appendix 1, upon multiplex transmission, a method such as, for example, the BPSK method, other than a method for modulating only the amplitude is applied to all channels. Therefore, the required transmission power can be reduced from that of the fourth or fifth embodiment which adopts the method of modulating only the amplitude for at least one channel.

However, in this instance, if use together with the injection locking method is intended, then there is a difficult point that it becomes difficult to establish injection locking on the reception side. In this regard, it can be recognized that, as a general system configuration, the fourth or fifth embodiment is optimum.

The present application contains subject matter related to that disclosed in Japanese Priority Patent Application JP 2009-223681 filed in the Japan Patent Office on Sep. 29, 2009, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. A wireless communication device, comprising:
a plurality of communication units for transmission adapted to modulate and transmit respective transmission subject signals;
said plurality of communication units for transmission including a first communication unit for transmission which is configured to use a first modulation that modulates only the amplitude and at least one other communication unit for transmission which is configured to use a second modulation that modulates at least one of the phase and the frequency and requires a transmission power lower than the first modulation, wherein:
the total number of the communication units for transmission is three or more,
the first communication unit for transmission is the only one of the communication units for transmission that is configured to use the first modulation, and
the first communication unit for transmission is the only one of the communication units for transmission that includes a local oscillator for generating a carrier frequency, the local oscillator being part of a same integrated circuit as the first communications unit for transmission.

2. The wireless communication device according to claim 1, wherein the second modulation modulates one of: (1) only the phase, and (2) both of the amplitude and the phase.

3. The wireless communication device according to claim 2, wherein the first modulation is an amplitude shift keying modulation, and all communication units for transmission other than the first communication unit for transmission use a phase shift keying modulation.

4. The wireless communication device according to claim 3, wherein the plurality of communication units for transmission are configured to engage in space division multiplexing.

5. The wireless communication device according to claim 3, wherein the plurality of communication units for transmission are configured to engage in time division multiplexing.

6. The wireless communication device according to claim 1, wherein the plurality of communication units for transmission are configured to transmit information in a millimeter waveband.

7. The wireless communication device of claim 1, wherein the plurality of communication units for transmission are included in a same integrated circuit.

\* \* \* \* \*